(12) United States Patent  
Caswell

(10) Patent No.: US 12,316,535 B2  
(45) Date of Patent: May 27, 2025

(54) METHODS AND SYSTEMS FOR INFRASTRUCTURELESS COMMUNICATION NETWORKS

(71) Applicant: DISH Wireless L.L.C., Littleton, CO (US)

(72) Inventor: Justin Wayne Caswell, Aurora, CO (US)

(73) Assignee: DISH Wireless L.L.C., Littleton, CO (US)

( * ) Notice: Subject to any disclaimer, the term of this patent is extended or adjusted under 35 U.S.C. 154(b) by 410 days.

(21) Appl. No.: 17/834,671

(22) Filed: Jun. 7, 2022

(65) Prior Publication Data

US 2022/0303829 A1   Sep. 22, 2022

Related U.S. Application Data

(63) Continuation of application No. 17/261,149, filed as application No. PCT/US2019/042076 on Jul. 16, 2019, now Pat. No. 11,375,404.

(60) Provisional application No. 62/698,817, filed on Jul. 16, 2018.

(51) Int. Cl.
| | |
|---|---|
| *H04J 3/14* | (2006.01) |
| *H04L 45/44* | (2022.01) |
| *H04W 28/084* | (2023.01) |

(52) U.S. Cl.
CPC ........... *H04L 45/44* (2013.01); *H04W 28/084* (2023.05)

(58) Field of Classification Search
CPC ..... H04L 45/44; H04L 41/122; H04W 28/084
USPC ....................................................... 370/232
See application file for complete search history.

(56) References Cited

U.S. PATENT DOCUMENTS

| | | | |
|---|---|---|---|
| 9,704,122 B2 | 7/2017 | Jung et al. | |
| 10,416,755 B1* | 9/2019 | Erivantcev | ............. G06V 10/82 |
| 10,691,977 B2* | 6/2020 | Kim | ................... G06F 18/2178 |
| 10,714,118 B2* | 7/2020 | Sadri | ....................... G10L 19/00 |
| 11,213,197 B2* | 1/2022 | Wang | ................... G06T 7/0012 |
| 2007/0225944 A1 | 9/2007 | Knutsen | |
| 2007/0288312 A1 | 12/2007 | Wang | |
| 2007/0294129 A1 | 12/2007 | Froseth et al. | |
| 2009/0210325 A1 | 8/2009 | Borom | |

(Continued)

FOREIGN PATENT DOCUMENTS

| | | |
|---|---|---|
| WO | 2001075706 A1 | 10/2001 |
| WO | 2020018589 A1 | 1/2020 |

OTHER PUBLICATIONS

Yang et al., Software-Defined and Virtualized Future Mobile and Wireless Networks: A Survery. Aug. 30, 2014. 12 Pages.

(Continued)

*Primary Examiner* — Chuong T Ho

(74) *Attorney, Agent, or Firm* — Kilpatrick Townsend & Stockton LLP

(57) ABSTRACT

Embodiments of the present invention may provide a decentralized infrastructure including efficient wireless communication, an infrastructureless communication network, a decentralized private network, securely communicating in a decentralized network perhaps using distributed ledger technology (62), named data networking (63), neural networks (85), or the like. Further embodiments may include consensus processing (150), dynamic smart contracts (151), universal artificial neural network multiplex asset class (3), and perhaps even an artificial neural network multiplex identification system.

64 Claims, 18 Drawing Sheets

(56) References Cited

U.S. PATENT DOCUMENTS

| | | | |
|---|---|---|---|
| 2012/0265561 A1 | 10/2012 | Patro | |
| 2013/0073477 A1 | 3/2013 | Grinberg | |
| 2013/0337845 A1* | 12/2013 | Chen | H04W 64/00 |
| | | | 455/456.5 |
| 2014/0086177 A1 | 3/2014 | Adjakple et al. | |
| 2014/0372241 A1 | 12/2014 | Maier | |
| 2015/0287084 A1 | 10/2015 | Gura et al. | |
| 2015/0379397 A1* | 12/2015 | van der Made | G06N 3/08 |
| | | | 706/20 |
| 2016/0093050 A1* | 3/2016 | Kim | G06F 18/217 |
| | | | 382/128 |
| 2016/0212066 A1 | 7/2016 | Ravindran | |
| 2017/0046342 A1 | 2/2017 | Azgin | |
| 2018/0192122 A1 | 7/2018 | Rajapakse | |
| 2018/0288726 A1 | 10/2018 | Azgin | |
| 2018/0306609 A1 | 10/2018 | Agarwal | |
| 2019/0012592 A1* | 1/2019 | Beser | G06N 3/063 |
| 2019/0076098 A1* | 3/2019 | Li | G16H 10/20 |
| 2019/0141495 A1 | 5/2019 | Jha | |
| 2019/0228319 A1* | 7/2019 | Gupta | G06F 8/71 |
| 2019/0324781 A1* | 10/2019 | Ramamurthy | G06F 18/24 |
| 2019/0377819 A1* | 12/2019 | Filliben | G06N 3/084 |
| 2019/0378010 A1* | 12/2019 | Morris | G06F 16/288 |
| 2019/0378049 A1* | 12/2019 | Widmann | G06Q 20/4016 |
| 2019/0378051 A1* | 12/2019 | Widmann | G06N 20/00 |
| 2020/0035350 A1* | 1/2020 | Sullivan | G06T 11/001 |
| 2020/0296572 A1 | 9/2020 | Bachmusky et al. | |
| 2021/0250812 A1 | 8/2021 | Caswell | |
| 2022/0303829 A1* | 9/2022 | Caswell | H04L 45/44 |

OTHER PUBLICATIONS

Figueiredo, Felipe et al., Radio Hardware Virtualization for Software-Defined Wireless Networks. Mar. 26, 2018. Wireless Pers. Commun. (2018) 100:113-126. 14 pages.

Internet Protocol—Wikipedia, https://en.wikipedia.org/wiki/Internet_Protocol, Jul. 12, 2019, 3 pages.

Neural cryptography—Wikipedia, https://en.wikipedia.org/wiki/Neural_cryptography, Jul. 15, 2019, 5 pages.

OSI Model—Wikipedia, https://en.wikipedia.org/wiki/OSI_model, Jul. 12, 2019, 5 pages.

International PCT Application No. PCT/US2019/042076 filed Jul. 16, 2019. First Named Inventor: Caswell.

International PCT Application No. PCT/US2019/042076 filed July 16, 2019. First Named Inventor: Caswell. Written Opinion of the International Searching Authority dated November 8, 2019. 6 pages.

International PCT Application No. PCT/US2019/042076 filed July 16, 2019. First Named Inventor: Caswell. International Search Report dated November 8, 2019. 4 pages.

U.S. Appl. No. 62/698,817, filed July 16, 2018. First Named Inventor: Caswell.

* cited by examiner

METHODS AND SYSTEMS FOR INFRASTRUCTURELESS COMMUNICATION NETWORKS

PRIORITY CLAIM

This application a continuation patent application of U.S. patent application Ser. No. 17/261,149 filed Jan. 18, 2021, which is the United States National Phase of PCT International Patent Application No. PCT/2019/042076 filed Jul. 16, 2019, which claims priority to and the benefit of U.S. Provisional Application No. 62/698,817 filed Jul. 16, 2018 all said applications and any priority case are hereby incorporated by reference herein in its entirety.

FIELD OF THE INVENTION

Embodiments of the present invention relate to decentralized infrastructure methods and systems. More specifically, the invention may relate to efficient wireless communications, creating infrastructureless communication networks, providing a decentralized private network, and perhaps even securely communicating in a decentralized network.

BACKGROUND OF THE INVENTION

Networks that comprise the Internet and the world wide web handle the routing and interpolation of data on a global basis. As technology advances, networks and distributed ledger technologies using blockchain for a multitude of purposes have become more common. For some users, it may be desirable to conduct a network that allows for data routing and interpolation in a more secure and efficient manner than what current network technologies and distributed ledger technologies using blockchain allow.

SUMMARY OF THE INVENTION

Embodiments of the present invention discloses various methods and systems for a spatial infrastructure that may be a purely decentralized communication, artificial intelligence, and even distributed ledger technology that may allow for creation, viewing, interaction, and integration of distributed and even decentralized systems technologies, or the like. Distributed ledger technology and decentralized autonomous organizations may be important aspects of the broader decentralized technology efforts yet may only be part of the complete solution. Many of the benefits of these technologies may be lost due to inefficiencies, disparateness, limitations, and difficulties perhaps when implementing infrastructures that may not be inherently decentralized. Some primary examples could be inefficient CPU usage for mining, disparate blockchains that do not integrate with others, limitation of centralized user interfaces on the current web instead of decentralized user interfaces, and perhaps even the difficulty of proprietary programming languages. The proposed solution to solve these issues, and others, may be an infrastructure that may be designed and engineered for decentralized systems and associated technologies. The use of artificial neural networks, private networking, peer wireless multi-connections, and perhaps even artificial intelligence systems that may work together perhaps to create a decentralized communication system may be the foundation technology layer to the new infrastructure. From this, a virtual spatial system may be overlaid to allow for intelligent routing and connections. The virtual spatial system may permit for a visual user interface to be created, which may allow users to view, interact, create, develop, and perhaps even integrate in a pure decentralized system, or the like. Structures may be created across both layers perhaps to provide core functionality to various user types and applications for the decentralized infrastructure. A new type of digital asset class may be integrated into this infrastructure perhaps to provide the entire system with a way to transact, interact, and even exchange in a public and/or private manner perhaps without any centralized system or trusted third party.

Naturally, further objects, goals and embodiments of the invention are disclosed throughout other areas of the specification, claims, and figures.

BRIEF DESCRIPTION OF THE DRAWINGS

The following descriptions and referenced drawings are for selected embodiments of the present invention. Naturally, changes may be made to the disclosed embodiments while still falling within the scope and spirit of the present invention and the patent granted.

DETAILED DESCRIPTION OF THE PREFERRED EMBODIMENTS

Figure 1:
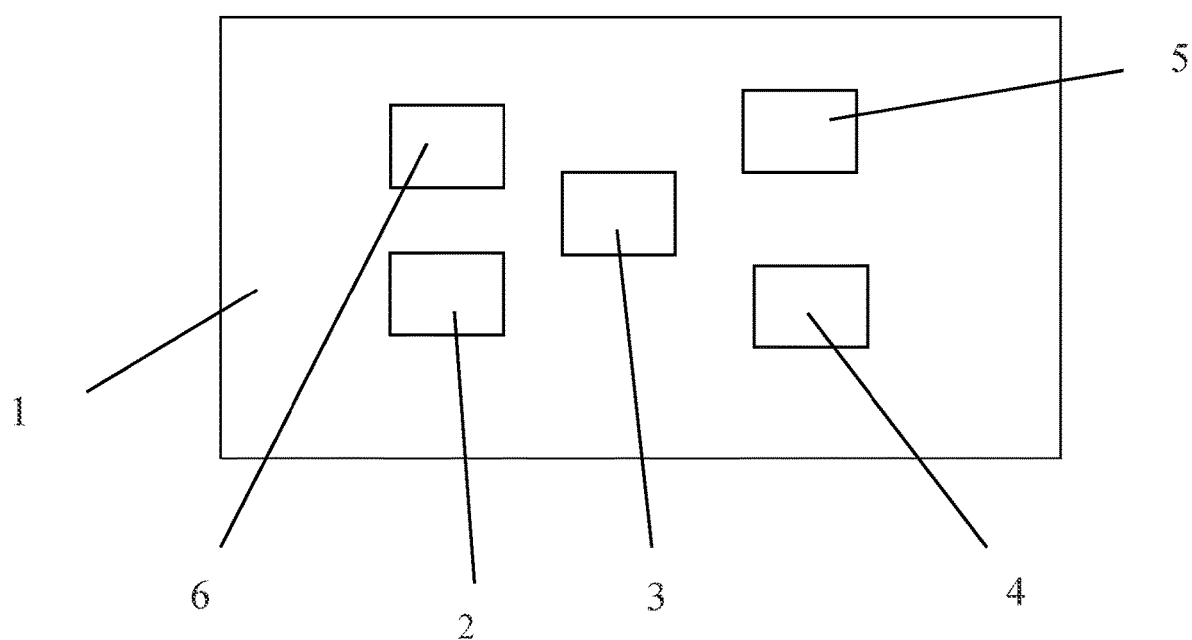
FIG. 1 shows a representative conceptual example of a RevoVerse in accordance with various embodiments of the present invention.

The present invention includes a variety of aspects, which may be combined in different ways. The following descriptions are provided to list elements and describe some of the embodiments of the present invention. These elements are listed with initial embodiments, however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments are not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In embodiments of the present invention, a RevoVerse may be a combination of technologies that can allow users to reconceptualize online and connected perceptions in an entirely new way. This purely decentralized infrastructure may be a new internet with complete privacy for all individuals. It may be an infrastructure that may have been engineered and developed to provide not just better connections, but perhaps real-time limitless connections and even full interoperability for the new decentralized world. The core communications technology may have been integrated with artificial intelligence to make those connections faster and perhaps with more efficiency with every user that connects. The RevoVerse may allow users to spatially view and even interact as a global online and perhaps singularly connected community. It may provide the infrastructure and integration tools that may be required for the new decentralized connected world.

The RevoVerse infrastructure may provide the foundational framework that may allow anyone to create, connect, and interact with decentralized applications (Dapps), distributed ledger technologies (DLT), data systems, artificial intelligence engines, and perhaps even IOT technologies in a decentralized virtual universe. The purpose may be to connect real world assets, identity, and even data at the very place that it exists . . . the individual. The vision of the RevoVerse may be to allow for the redistribution of wealth, knowledge, data, connections, and interactions perhaps via a completely decentralized intelligent global system powered by every individual who may be a part of it. For the first time in history, a RevoVerse can allow every individual to visually see the source of the data they are reading and interacting with in full transparency.

Additionally, a RevoVerse may provide a true decentralized economic system for the new global peer economy. It may include a new type of digital asset class perhaps called Revos that may be designed with high efficiency utility, intelligently-controlled scarcity, and can be used for more than a singular purpose. In other words, it may be a multi-functional digital asset that can be used to purchase, enact contracts, transfer and control assets, process social interactions, and many other purposes. The economic system may allow for other currencies and asset classes to exist within the RevoVerse and may interact with Revos. The RevoVerse economic system and its financial rules may exist without being limited or even controlled by any single institution or entity. Revos within a RevoVerse may provide all the benefits of blockchain but perhaps without transactional limitations and with exponentially more efficiency.

The platforms that may be the first to exist within a RevoVerse may be core to its initial start and may be part of a network of platforms that may exist within the RevoVerse. These decentralized platforms may pave the way for future platforms and may allow for the first users to become familiar with the new spatial user interfaces. Additionally, these platforms may provide real operational models for users and even developers to conceptualize how to create, interact, and even connect within the RevoVerse with its vast capabilities.

Embodiments of the present invention may provide a new revolutionary decentralized platform that may combine and may even integrate a new virtual spatial mapping system, an advanced decentralized communication infrastructure, distributed ledger technology, a new digital asset class, DAPP's & DAO's, decentralized web services, decentralized artificial intelligence; or the like, perhaps all as a service on a decentralized platform. Perhaps put simply, decentralization as a service. In today's technology landscape of decentralization there may be a fundamental problem of disparate and even siloed creation, as well as still using traditional web interfaces and centralized system comingling. Decentralized technology today may not only be disparate and may be siloed but is may also be invisible to users. There may be no simple visual interface to view, interact, create, or even connect in the current decentralized space for users and even businesses. Additionally, the current networking and communication systems may have been built for centralized systems and today's decentralized platforms may rely on traditional communication systems for their networks. These traditional networking and even communication systems may be reaching critical mass as they may not have been built or even designed for a truly decentralized world and may be limiting true decentralization.

A decentralized technology may solve these issues perhaps by providing users and businesses with an easy way to view, interact, create, and even connect in a truly decentralized RevoVerse. This revolutionary decentralized technology may have rebuilt the communication and networking foundation from the ground up perhaps to provide the framework for the needed infrastructure of the RevoVerse. The integration and interoperability pieces may be the missing link for the future of decentralized technology and may be the core innovation and focus of technologies.

A RevoVerse may be described as a new multi-dimensional virtual universe in which all decentralized systems and even users may reside in a spatially mapped virtual universe. It may contain new core technologies, perhaps with integrated multiple underlying technologies, perhaps to create a revolutionary decentralized internet known as the RevoVerse. It may be where users can visually see and even interact with decentralized systems through various interfaces, including virtual reality. It allows for the development, integration, interoperability, and even governance of distributed ledger technologies, decentralized websites and databases, distributed applications, DAO's, decentralized artificial intelligence, decentralized IOT, and other various decentralized systems, or the like. A RevoVerse may provide the infrastructure perhaps for integration of those decentralized systems developed within a RevoVerse and perhaps for integration of third-party decentralized systems. A RevoVerse may be the new decentralized infrastructure that completely replaces the existing internet, cloud, edge computing, and even centralized systems, or the like.

As may be understood in FIG. 1, a RevoVerse (1) may include, but is not limited to, a Net (2), Revos (3), A.I. Interfaces (4), an interstellar interface (5), galaxies (6), or the like. A Net (2) may be a revolutionary network perhaps with decentralized: file systems, databases, file storage, and even a naming system. A RevoNet may contain a Verse Fabric and other core technologies perhaps for intelligent connections, routing, interfacing, and even interactions. This may be a neural network system that may connect everything in the RevoVerse. Revos (3) may be a new revolutionary asset class that may allow for transactions of currency value, asset transfers, dynamic smart contracts, and even asset vaults. This may be a digital currency which may be built into a RevoVerse, Verse Fabric, and even a Net perhaps as an overlay within a public and even private distributed ledger technologies (DTL's). A.I. Interfaces (4) may provide an ability to link to and even access A.I. engines that may be available within a RevoVerse. These interfaces can be used for DTL's and/or other A.I. engines perhaps for deep learning. Interstellar may be a universal interface perhaps to connect and even synchronize between DTL platforms. An interstellar (5) may allow for singularities, A.I. Engines, and even transactions to occur across DTL platforms perhaps using Revos. Cross-platform development may be completed in a single development environment and may leverage a multitude of systems and even platforms. Versioning may allow for scaling and even updates including depreciation of systems perhaps without hard forks or even major versioning. Galaxies (6) may exist within a RevoVerse which may contain a singular star (a core DTL) at its center, planets, satellites, and even singularities. Each galaxy may contain an infinite number and even a combination of planets, satellites, and even singularities. Non-limiting examples of galaxies may include but is not limited to public DTL, Revos private DTL, Bitcoin, Ethereum, or the like.

Embodiments of the present invention may provide mapping a spatial RevoVerse. A difficulty in decentralized systems, and its users, may be to understand where these systems exist and perhaps how to route data based on where it may need to go efficiently and even consistently. Centralized systems may use methods such as static IP addresses, domain name systems, and even routing tables perhaps so users can visually interact with various centralized systems. However, these centralized methods may significantly limit functionality and even the positive benefits of decentralized systems. It may not make sense to use centralized communication, browsers, and user interfaces for decentralized systems. To solve these issues, a purely decentralized infrastructure may be needed: perhaps the RevoVerse.

A foundation piece of this infrastructure may be the virtual mapping system where decentralized systems and users can be spatially located and mapped. This may provide a virtual spatial reference like a static IP address in centralized systems. A second part of this infrastructure may be the dynamic intelligent routing system. Since a RevoVerse may use spatial referencing of systems and even users, there may be a mix of static references for systems and dynamic references for users. To route data for users effectively and even efficiently in a spatial system, perhaps without using centralized methods, a new decentralized method of routing may be integrated into a RevoVerse. Perhaps using two decentralized artificial intelligence engines that may reside at the device level may enable a RevoVerse to provide a true decentralized infrastructure.

For example, decentralized systems and users that are spatially mapped within a RevoVerse may exist within an A.I. spatial universe mapping system. The mapping system may interface directly with an A.I. dynamic intelligent routing system. These two artificial intelligence systems may work together perhaps to provide a more efficient and even scalable decentralized infrastructure perhaps by using virtual spatial IP dynamic routing and even virtual spatial mapping.

A RevoVerse infrastructure may provide truly anonymous, private, and even secure connections perhaps when combined with the additional underlying technology that may been integrated into it. Additionally, the connections on the RevoVerse infrastructure may be unable to be hacked by any known technologies or even methods and may be quantum computing immune. Some of these underlying technologies are discussed in detail herein.

A RevoVerse may allow for a new way to browse, search, develop and even interact with decentralized online assets that may be more natural with a three-dimensional user interface. Since privacy and the control of user data resides with the individual, interactions may be more intelligent for each person and may not be controlled by third parties. Therefore, when a user may search a RevoVerse, the results may be personalized, and the individual may have control over filtering, perhaps opposed to companies or governments. Additionally, a RevoVerse may provide faster connectivity to the online assets the individual may be interacting with and may not be hindered with antiquated networking methods. It may be the revolutionary virtual universe for the new decentralized and even empowered human kind.

Figure 2:
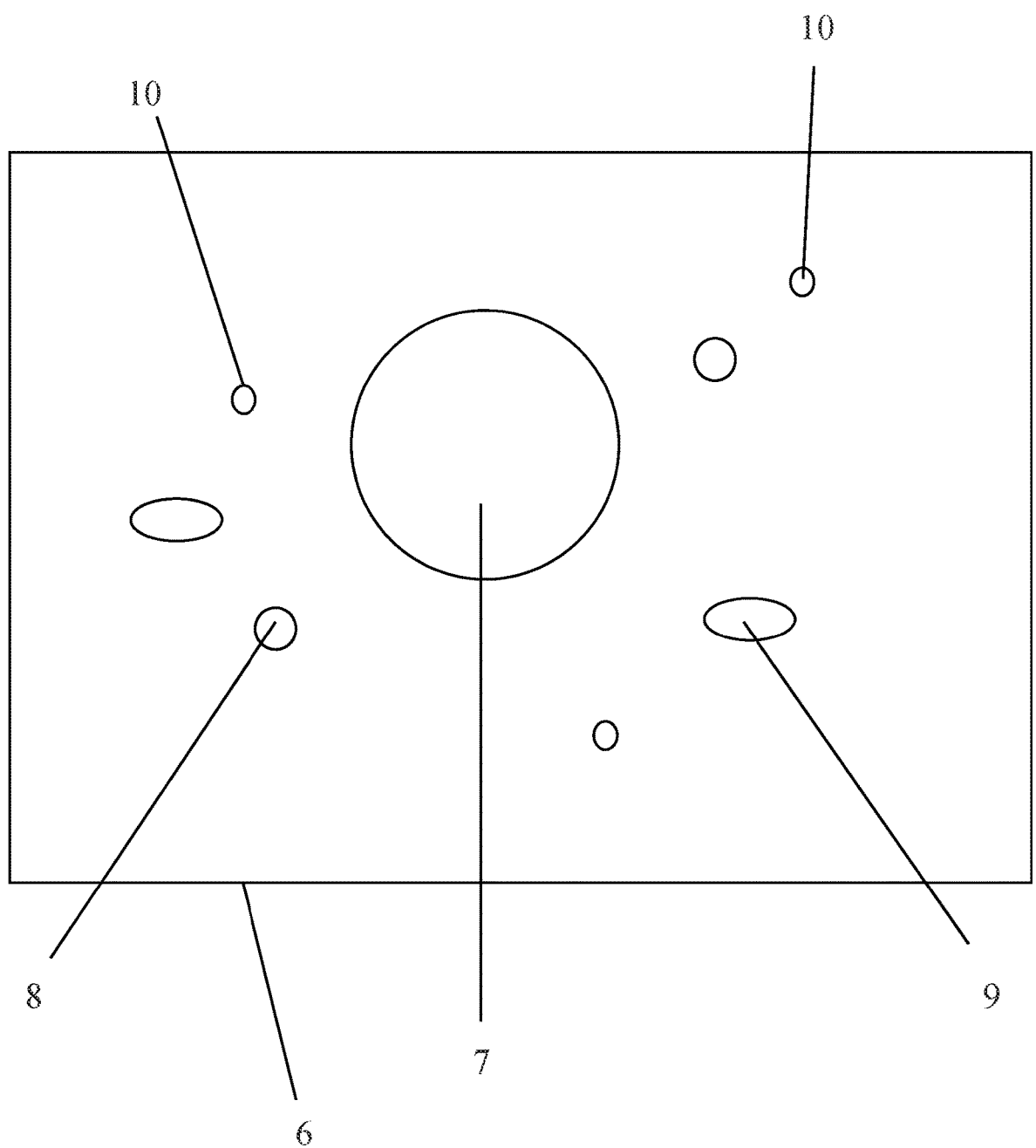
FIG. 2 shows a representative conceptual example of a galaxies in accordance with various embodiments of the present invention.

As mentioned above, embodiments of the present invention may provide galaxies (6). As may be understood in the conceptual representation of FIG. 2, galaxies (6) may be entire decentralized systems that may represent a singular distributed ledger technology (DLT) perhaps within the RevoVerse. Galaxies can be a DLT that may be built using one or even combination of the RevoVerse DLT's, or it may be a third-party DLT that may have been mapped, or the like. This could include the core DLT (which may be conceptually understood as a star (7)) perhaps at its center with perhaps all third-party sidechains (which may be conceptually understood as planets (8)) that may be tied to it perhaps directly. It could also include any additional sidechains (which may be conceptually understood as satellites (9)) that may be tied directly to the third-party sidechain (such as a planet (8)) perhaps leveraging the core DLT (such as a star (7)). Galaxies may include all the users (which may be conceptually understood as singularities (10)) that may be currently connected to and/or interacting with perhaps the core (such as a star (7)) and/or third-party sidechains (such as planets (8) and satellites (9)), or the like.

A distributed ledger technology may be a consensus of replicated, shared, and even synchronized digital data geographically spread across multiple sites, countries, or institutions. There may not be any central administrator or centralized data storage in a DLT. A peer-to-peer network may be required perhaps as well as consensus algorithms to ensure replication across nodes may be undertaken. One past form of a distributed ledger design is the blockchain system, which can be either public or private. A distributed ledger database may be spread across several nodes (e.g., devices) perhaps on a peer-to-peer network, where each may replicate and even save an identical copy of the ledger and updates itself independently. A primary advantage of a DLT may be the lack of central authority. When a ledger update happens, each node may construct the new transaction, and then the nodes may vote by consensus algorithm on which copy may be correct. Once a consensus has been determined, all the other nodes may update themselves with a new, correct copy of the ledger. Security may be accomplished through cryptographic keys and signatures.

A star (7) may represent a core distributed ledger technology perhaps ("DLT") within a singular galaxy. This may include the users (e.g., singularities) that may be currently connected to and/or interacting with a DLT. Planets (8) may represent third-party sidechains that may be tied directly to the core (e.g., star) distributed ledger technology and may include the users (e.g., singularities) that may be currently connected to and/or interacting with this sidechain. Satellites (9) may represent third-party sidechains that may be tied directly to the planets and may interact with only that DLT perhaps to use the core (e.g., star) DLT to which the planet may be tied to. This may also include the users (e.g., singularities) perhaps within the satellite. Singularities (10) may be individual users that may simultaneously exist within various galaxies, planets, and even satellites, or the like.

Initial identification verification may be required when a singularity materializes the first time within a RevoVerse. The identification may be completed by the decentralized A.I. identification system, which may provide that no central authority or even centralized system may contain the singularities identification information.

Each singularity may be assigned a permanent RevoVerse private encrypted and even compressed signature which may be a key that may be created by the singularity and can never be changed or even accessed by anyone else after creation, including an A.I. identification system. An A.I. identification system may permanently burn a corresponding public key perhaps into its core sequencing.

As a non-limiting example, a DLT may be developed using one of the RevoVerse DLT's for vehicle title transfers. From this, a new galaxy could be created and even mapped within a RevoVerse perhaps once it is published and live. This could be the core DLT (e.g., star) of that galaxy. Third-party developers may create sidechains for each state in the United States perhaps to facilitate car title transfers that are legally correct for each state requirements. These could be included in this galaxy as third-party sidechain DLT's (e.g., planets) perhaps because they may be leveraging the core DLT. If a developer would like to offer a witnessing service for the state of California, they could create another sidechain (e.g., satellite) from the California DLT (e.g., planet) for this service. All of these could reside within a singular galaxy.

In this example, two users which may be referred to as singularities may want to transfer a car title after a transaction takes place and the car may be registered in California. Using a RevoVerse user interface (e.g., a browser) they could be able to find this galaxy in the user interface perhaps with a specific result for the service to use. Since a RevoVerse may allow for dynamic smart contracts, the two users may simply enter the agreed price and currency type, the car title and proof of ownership can be set for uploading for witnessing, and perhaps then the dynamic smart contract can be executed. Once one user may place the agreed amount and correct currency type in a holding account, and the second user may upload the required title and ownership documents to a holding account, then the third-party witnessing may take place for both. The dynamic smart contract may then be completed, and the transaction and transfer of title and ownership may take place. Each DLT involved may receive a fee perhaps being paid out of the transaction. This may be built perhaps into each DLT and perhaps even ultimately a dynamic smart contract.

This is one non-limiting example to help envision the possibility for infinite galaxies and the perhaps allows the ability to visually see all aspects while navigating within the RevoVerse. Users can see other users interacting perhaps with each part of a galaxy and perhaps in real time. While you may not know the details of what each user is doing, you may see the developers as other users, the users who are transacting, the star, the planets, satellites, or the like, and may be able to navigate and even search each one freely and easily. Users could also be able to see the percentage or even stage of development of stars, planets, and satellites, or the like as they are being developed and built, perhaps offering full transparency yet anonymity.

As mentioned herein, embodiments of the present invention may provide a Net. A Net (2) may be a revolutionary network that may provide core communication systems for a new decentralized world. It may be any combination of protocols, neural networks, private networking, artificial intelligence engines, semantics-based compilation, decentralized applications, or the like, that may work together perhaps as the core framework and even infrastructure of a RevoVerse. It may integrate a multitude of new and advanced communication systems perhaps to enable truly decentralized connectivity.

A Net may be a decentralized autonomous intelligent network designed with neural networking and artificial intelligence at its core. A Net may provide a solution to modern communication routing perhaps using A.I. dynamic intelligent routing engine with interconnectivity to an A.I. spatial mapping engine. Perhaps combined with a revolutionary protocol and a revolutionary private network, a Net may be the future of connecting humankind.

A Net may provide secure, anonymous, and even private connections perhaps to the RevoVerse for all users. It may have intelligent connectivity and even routing in a virtual spatial communication system infrastructure. This new infrastructure may be called Mapped Extraterrestrial Integrated System ("M.E.T.I.S."). M.E.T.I.S may contain additional capabilities perhaps with a subset of technology for a RevoVerse. These subset technologies of M.E.T.I.S. may include new connectivity perhaps at the physical connection layer for shared connections, a revolutionary neural network protocol for artificial intelligence integration, and perhaps even a Verse Fabric with all its features, or the like. A Verse Fabric may contain additional technology to implement interoperability of distributed ledger technologies and perhaps even associated applications, or the like. Net technologies, perhaps when combined, may be the core framework of the new digital virtual asset class Revos and the public and private distributed ledger technologies.

A Net may utilize a new and even advanced form of communication system perhaps developed for decentralized systems to create connectivity between the following: humans and machines, machines to machines, neural networks to neural networks, and any combination of those instances, or the like. This may be the core communications system that may run within the foundation of the RevoVerse connectivity fabric. This new communication stack may allow for entirely new communication systems and even architectures to be mapped, routed intelligently, communicate, learn, and perhaps even develop over time, or the like. It may also be the core to the new digital asset class Revos and even a public and private distributed ledger technologies architectures within the RevoVerse.

Figure 3:
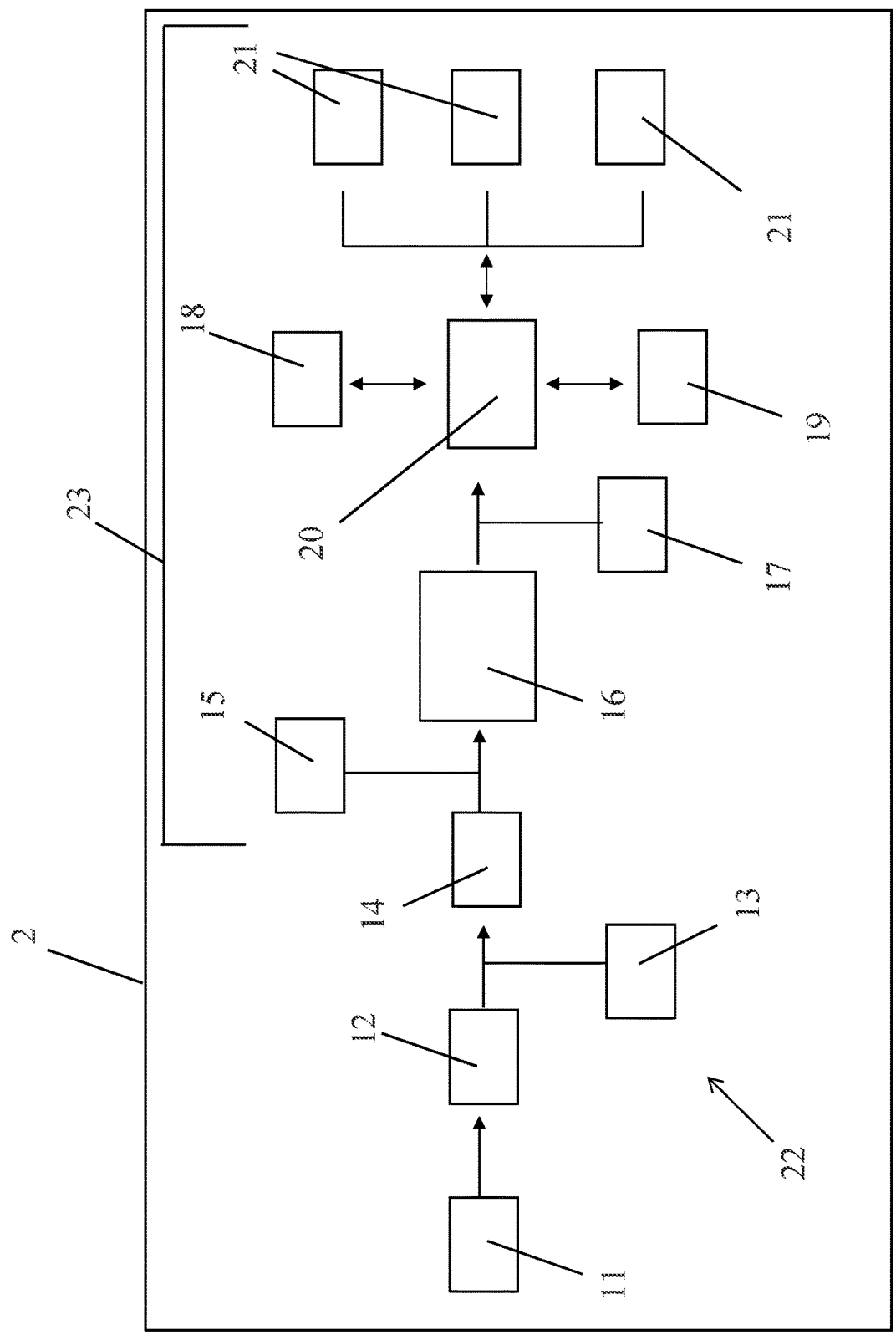
FIG. 3 shows a representative conceptual example of a RevoNet in accordance with various embodiments of the present invention.

As may be understood from the conceptual FIG. 3, a Net (2) may include a user (11), which may access an App (12) which may have a physical connection (13) to access an internet service provider (14) to enter a network and session (15) to a RevoVerse (16). A RevoVerse (16) may include an application layer (17) to an intersteller (20), which may include a public DLT galaxy (18), a private DLT galaxy (19), and perhaps even third party DLT galaxies (21).

Mapped extraterrestrial integrated system (M.E.T.I.S.) (22) may spatially map users and perhaps all distributed ledger technologies within a RevoVerse. While it may route based on physical location within the real world, this may still be done with anonymity for users. This may be achieved by using multiple technologies that may create a seamless transition from the physical world to the virtual RevoVerse. Since M.E.T.I.S. may use decentralized artificial intelligence perhaps at the communication layer for mapping and even routing, and may utilize both a private network and even neural networking, it may provide an extremely secure and private communication infrastructure.

Contained within M.E.T.I.S. may be a subset of systems that create a Verse Fabric (23). A Verse Fabric may exist from the network/session layer to the application layer of a M.E.T.I.S. stack. It may be an interconnectivity from the physical to the virtual and the virtual to virtual. A Verse Fabric may interweave various technology perhaps to create connections and allow for interoperability.

Figure 4:
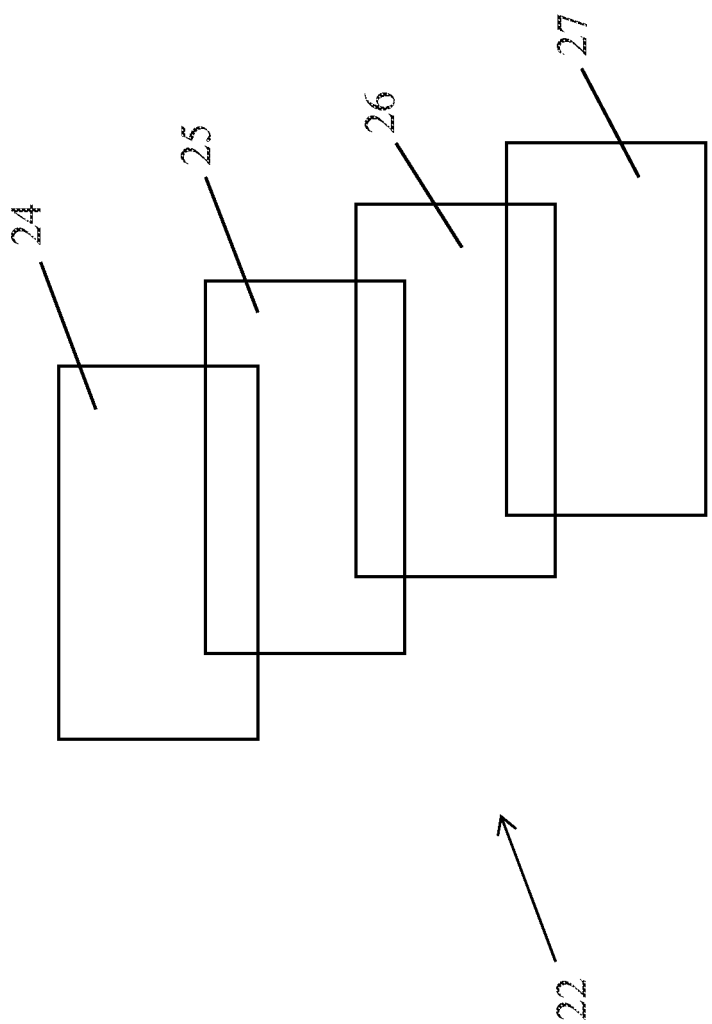
FIG. 4 shows a representative conceptual example of a mapped extraterrestrial integrated system in accordance with various embodiments of the present invention.

As shown conceptually in FIG. 4, a M.E.T.I.S. (22) may have layers that may be used separately or in any combination in the various embodiments of the present invention. One layer may include a physical/data link layer (27). This may include Wi-Fi, Ethernet, Bluetooth, and perhaps even Revo-Fi. Revo-Fi may be a new wireless communication protocol that may allow for any singular device to connect to and even share simultaneous connections perhaps to the following: end devices (e.g., cameras, speakers); wireless internet connected routers; tethering & hot spot (e.g., internet sharing and end device sharing); or the like. Revo-Fi may allow user control of all simultaneous connections and may even provide auto load balancing for bandwidth throughput perhaps based on user active actions.

Embodiments of the present invention may provide efficient wireless communications which may include providing a virtualization technology (67), a wireless network interface controller (78), a communication protocol application (77), and perhaps even a plurality of devices (76). As may be understood by the conceptual representation in FIG. 5, a wireless network interface controller (78) may be a system of rules that may allow user devices to utilize one or more wireless networks and even the internet. A communication protocol application (77) which may be a software program, may be based on a virtualization technology (67) and even a wireless network controller (78). A virtualization technology (67) may create a plurality of virtual wireless network interface controllers (80) that may use at least one shared wireless network interface controller (82) which may even be a shared connection. A shared wireless network interface controller may be a communication protocol application which may be installed into a device. A plurality of devices (76) may be more than two devices that may be part of a network and may include but is not limited to cell phones, smartphones, televisions, smart televisions, cameras, speakers, laptops, printers, system on a chip interfaces, mobile computing devices, or the like. A plurality of devices may include at least some end user devices (73) perhaps wireless end user devices. A wireless network interface controller (78) may be a software based program that may be instituted into at least some devices which may include installing, integrating, physically instituted, or the like of the program to the devices. This may provide a plurality of wireless connections (81) for the devices (73). A plurality of wireless connections may be more than two wireless connections.

By using virtualization technology (67), a wireless network interface controller (78) which may be physically integrated or even installed into devices or system on a chip interfaces, distributed ledger technology (79), and perhaps even named data networking (71), a communication protocol application can be used to provide multiple wireless connections for a single device. Virtualization technology may create software based virtual wireless network interface controllers that may use a shared physical wireless network interface controller, system on a chip interfaces, memory, or other various resources which may be required for each connection. Each virtual wireless network interface controller (80) may use a physical wireless network interface controller as a shared resource for wireless connections and may act as a wireless client, a wireless access point, or both simultaneously. Each virtual wireless network interface controller can connect independently to available wireless connections (81) which may include but is not limited to wireless devices, Wi-Fi access points, hot spots, virtual wireless network interface controller access points, or the like. Each virtual wireless network interface controller (80) can connect perhaps via a connection (68) to wireless devices (76) that may be connected to a system (75) such as but not limited to a wireless network, internet service provider, network service provider, an ad-hoc mode to provide connectivity via any connected network, or the like. Networks (83) which may be the Internet, may use wireless device gateways (74) such as routers. Each virtual wireless network interface controller can use other systems (75) such as other physical wireless network interface controllers perhaps route data or even for additional communications functionality (70) such as cellular connections for internet connectivity, or the like.

Applications, such as the communication protocol application (77) or other applications, can utilize the virtual wireless network interface controllers to control wireless devices, transfer data, share data, share bandwidth, provide connectivity, any combination thereof, or the like. Applications may use a communication protocol for auto load balancing for bandwidth throughput perhaps based on user active actions. Applications can utilize virtual wireless network interface controllers, system on a chip interfaces, and even named data networking to interface with distributed ledger technology (79) that may be integrated into named data networking (71). A distributed ledger technology (79) may be integrated with named data networking (71) and may allow for various applications to provide secure and immutable transmissions (72) such as but not limited to communications, identification, transactions, interactions, and application specific functionality that correlates to any data transfer of any type.

Figure 5:
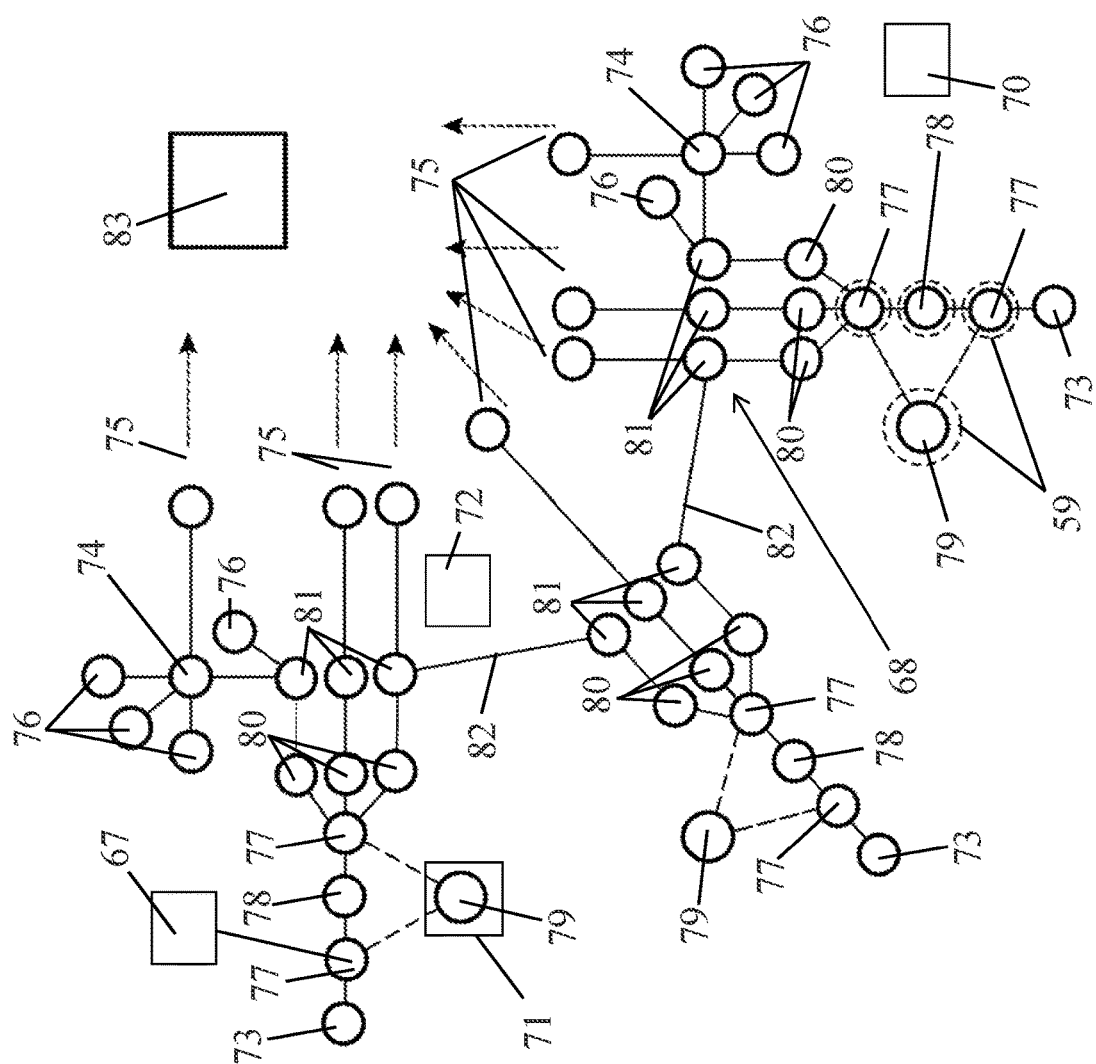
FIG. 5 shows a representative conceptual example of a wireless network interface controller in accordance with various embodiments of the present invention.
Figure 9:
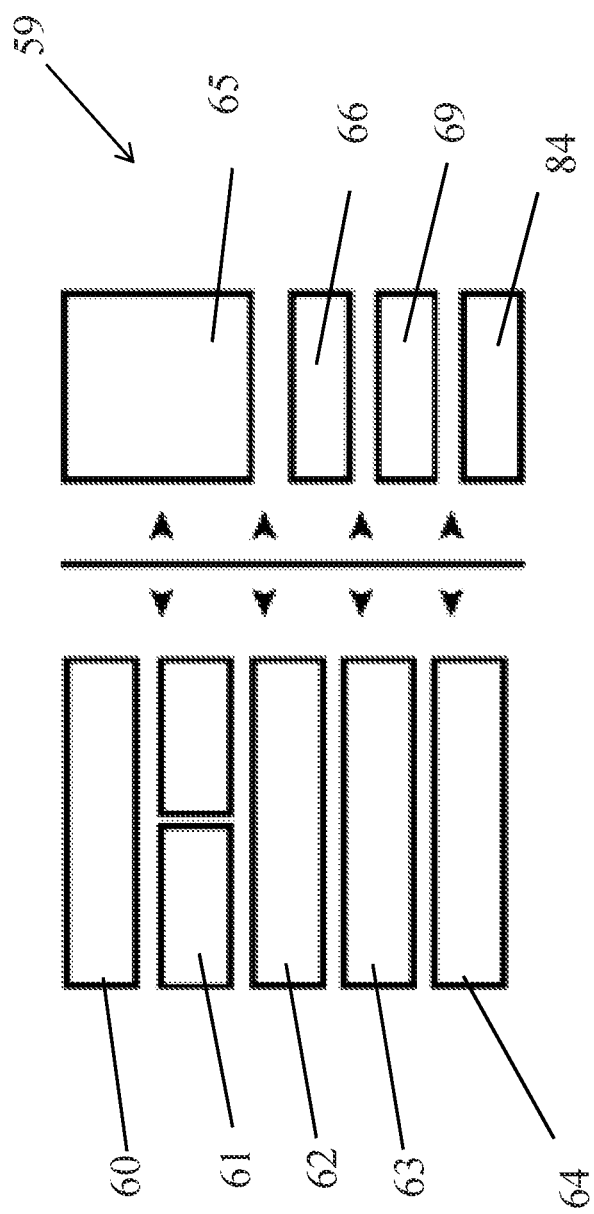
FIG. 9 shows a representative conceptual example of a communication protocol application in accordance with various embodiments of the present invention.

FIGS. 5 and 9 shows a non-limiting example of a conceptual representation of a communication protocol application (59) which may be integrated with virtualization technology, distributed ledger technology, and named data networking. A communication protocol application (59) may include a virtual wireless network interface controller (60), an identification module (61), a distributed ledger technology (62), named data networking (63), virtualization (64), a system (65) such as system on a chip or even a wireless network interface controller, a central processing unit (66), memory (69), and perhaps even communication system interfaces (84). An identification module (61) may include, but is not limited to subscriber identification modules (SIM), virtual SIM, credentials, private keys, public keys, any combination thereof, or the like.

Embodiments of the present invention may provide a method for efficient wireless communication comprising the steps of providing a virtualization technology; providing a wireless network interface controller; providing a communication protocol application based on said virtualization technology and said wireless network interface controller; providing a plurality of devices, wherein said plurality of devices comprises at least some wireless end user devices; instituting said wireless network interface controller into said at least some of said plurality of devices; creating from said virtualization technology a plurality of virtual wireless network interface controllers; using at least one shared wireless network interface controller by said plurality of virtual wireless network interface controllers; and perhaps even providing a plurality of wireless connections for said end user devices from said communication protocol application, said plurality of virtual wireless network interface controllers, and said at least one shared wireless network interface controller. Some embodiments may include an efficient wireless communication environment comprising virtualization technology; a wireless network interface controller; a communication protocol application based on said virtualization technology and said wireless network interface controller; at least one shared wireless network interface controller; a plurality of virtual wireless network interface controllers created by said virtualization technology which use said at least one shared wireless network interface controller; a plurality of devices having at least some wireless end user devices, wherein said plurality of devices have said wireless network interface controller installed therein; and perhaps even a plurality of wireless connections available for said end user devices.

Named data networking may be a content distribution architecture of an Internet instead of using internet protocol addresses. Its premise may be that the Internet is primarily used as an information distribution network, which is not a good match for internet protocol, and that the future Internet's "thin waist" should be based on named data rather than numerically addressed hosts. An underlying principle may be that a communication network should allow a user to focus on the data he or she needs, named content, rather than having to reference a specific, physical location where that data is to be retrieved from, named hosts. A motivation for this may be derived from the fact that a vast majority of current Internet usage (a "high 90% level of traffic") consists of data being disseminated from a source to a number of users. Named-data networking comes with potential for a wide range of benefits such as content caching perhaps to reduce congestion and improve delivery speed, simpler configuration of network devices, and even building security into the network at the data level. Named data networking may have an active code base that may be accessible for various embodiments of the present invention.

A M.E.T.I.S. (22) may include a network/transport layer (26). A network/transport layer may be an advanced communication protocol (perhaps called RevoCol) that may combine neural networking, artificial intelligence, compression, and even encryption. This may create an exponentially more efficient network than any other communication network today. RevoCol networks may become more efficient with every connection that may be added to the network. This may allow for decentralized connectivity over a neural network. This protocol may provide software-based routing driven with A.I. Dynamic Intelligent Routing System that may coincides with the A.I. Spatial Universe Mapping System. RevoCol may be a solution to the communication restrictions of today's networks that are reaching critical mass and may be the base of the Verse Fabric connectivity.

A M.E.T.I.S. (22) may include a session/presentation layer (25) which may be a virtual private network that may allow for connection to a RevoVerse and perhaps all assets within it (perhaps called RevoPN). This may allow for anonymous connectivity and may be the portal for becoming connected to the Verse Fabric. A M.E.T.I.S. may include an application layer (24) which may be a neural network synchronization protocol (RNNSP). A core communication protocol layer may combine NNSP, integrated simultaneous compression and encryption, wireless mesh networking, and integration for the physical/data link connection layer stack, or the like. An application layer may be used on the web or mobile devices. This may be a decentralized file system, database, and even domain name system. This may provide a user allocated hard drive space perhaps on individual devices that can be used by the network and even paid for by other users. This may provide data center allocated file storage space for large and service critical data sets and may even allow for a mixed mode of user allocated and data center allocated file storage or the like.

An application layer (24) may include internet of things (IOT), edge computing, and even device management. An application layer (24) may even include A.I. Autonomous Interfacing which may provide decentralized A.I. engines and applications and even an ability to connect A.I. engines throughout the RevoVerse perhaps for deep learning and exponentially faster learning. An application layer (24) may include an Interstellar which may provide interoperability and even communication between distributed ledger technologies and systems perhaps including DAO's. An application layer (24) may include a Decentralized Application Interface which may allow for the interoperability and even communication perhaps between decentralized applications.

As mentioned herein, embodiments of the present invention may provide a Verse Fabric (23). A Verse Fabric may be base communication protocols perhaps built on the OSI stack that may be combined with artificial intelligence systems and perhaps even additional communication technology, all of which may allow for the connections and even integrations within the RevoVerse. It may be the online and connected primary subsystem of M.E.T.I.S. and may provide intelligent routing for the network, perhaps allowing for all decentralized platforms to integrate at the base communication layers. A Verse Fabric may allow for a new style of network routing that may eliminate the need for routing tables to be stored on each peer or node and may remove the high processing of routing data efficiently on a peer network.

A Verse Fabric may be spatially dynamic and may work with the physical connection layer of M.E.T.I.S. perhaps to intelligently route data based on where a user may be geospatially located, perhaps in the real world and even within the RevoVerse. This may allow for an entirely new network that may be decentralized, exponentially efficient, and can leverage every connected device that may be connected to the RevoVerse, or the like. This may mean that the Verse Fabric may use global computing power perhaps for network routing, bandwidth, throughput, and dynamic intelligent routing for the decentralized A.I. networking systems, or the like. Additionally, decentralized platforms and even applications that may be developed within the RevoVerse could benefit from integrating into the Verse Fabric. The Verse Fabric may provide the communication infrastructure perhaps for all existing and even newly created decentralized platforms such as to integrate, connect, and create in entirely new ways.

Figure 6:
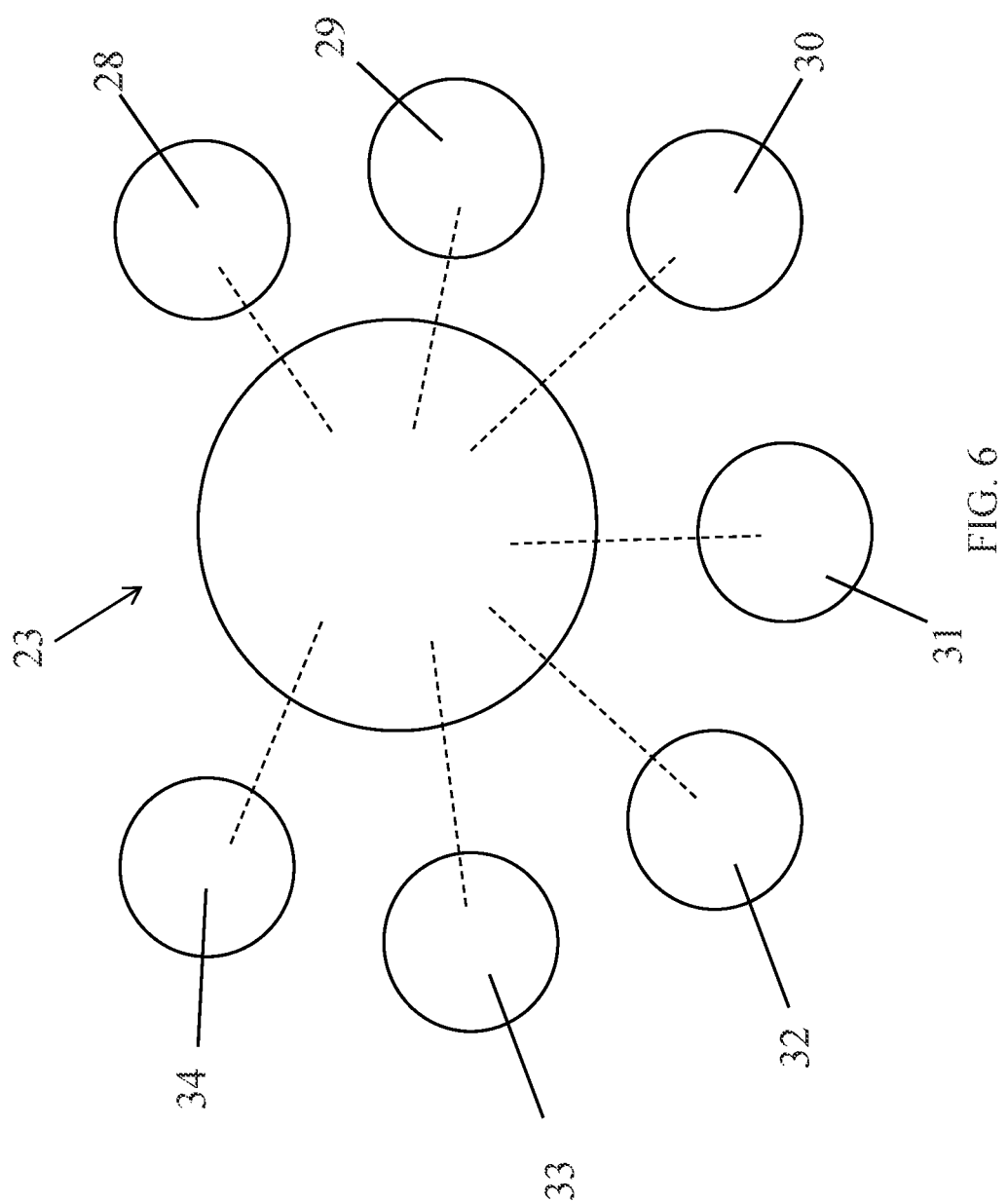
FIG. 6 shows a representative conceptual example of a verse fabric in accordance with various embodiments of the present invention.

A Verse Fabric may contain certain aspects of M.E.T.I.S. from the network, session, and even application layers, or the like. As may be understood in FIG. 6, a verse fabric (23) may include but is not limited to RevoCol (28), RevoPN (29), RNNSP (30), decentralized application interface (31), interstellar (32), A.I. autonomous interface (33), and perhaps even swarms (34). This may provide the required communication protocols and even systems that may connect the physical to the virtual of the RevoVerse. Perhaps by overlaying various technologies, such as RevoCol, RNNSP, or the like, and perhaps by leveraging the artificial intelligence systems within M.E.T.I.S., the outcome may operate as a weaved and even simultaneously connected neural network perhaps with a singular purpose of communication integration. This may have provided the outcome that led to discovery of the RevoVerse Swarms. These peer to peer swarms that may be created may be similar only in name to previous P2P networks. Swarms that may exist within the RevoVerse may owe their creation and even dynamic effects to the Verse Fabric. The Verse Fabric may naturally create these Swarms, and this discovery may be what led to the concept of perhaps leveraging these natural effects to use as the proof of stake validators within the RevoVerse. Swarms may be what validates transactions and even interactions that may take place on the Revos Public and Private Distributed Ledger Technologies perhaps while utilizing the Revos digital asset class.

The technology overlays of the Verse Fabric may provide individual security, privacy, controls, and even selective anonymity, or the like. The RevoNet with M.E.T.I.S. and the Verse Fabric as the subset, may create the first fully decentralized private network perhaps for every individual, and it may become more secure perhaps with every user that may be connected. In other words, it may be the most secure network in existence that no central authority has control over, no central point of failure, and could be un-hackable perhaps even with super computers or quantum computing systems, or the like.

A Verse Fabric may have two core technologies that can work in tandem perhaps to provide the world's first decentralized and even secure network for IOT devices, edge computing, and even their corresponding machine learning neural networks and artificial intelligence engines. All these systems may coexist in a singular domain and can communicate, interact, learn autonomously, and learn exponentially faster, or the like perhaps when compared to any other domain or platforms today. This may mean that all these technologies combined with the technologies of the Verse Fabric could provide the world's first decentralized autonomous artificial intelligent neural network.

Figure 7:
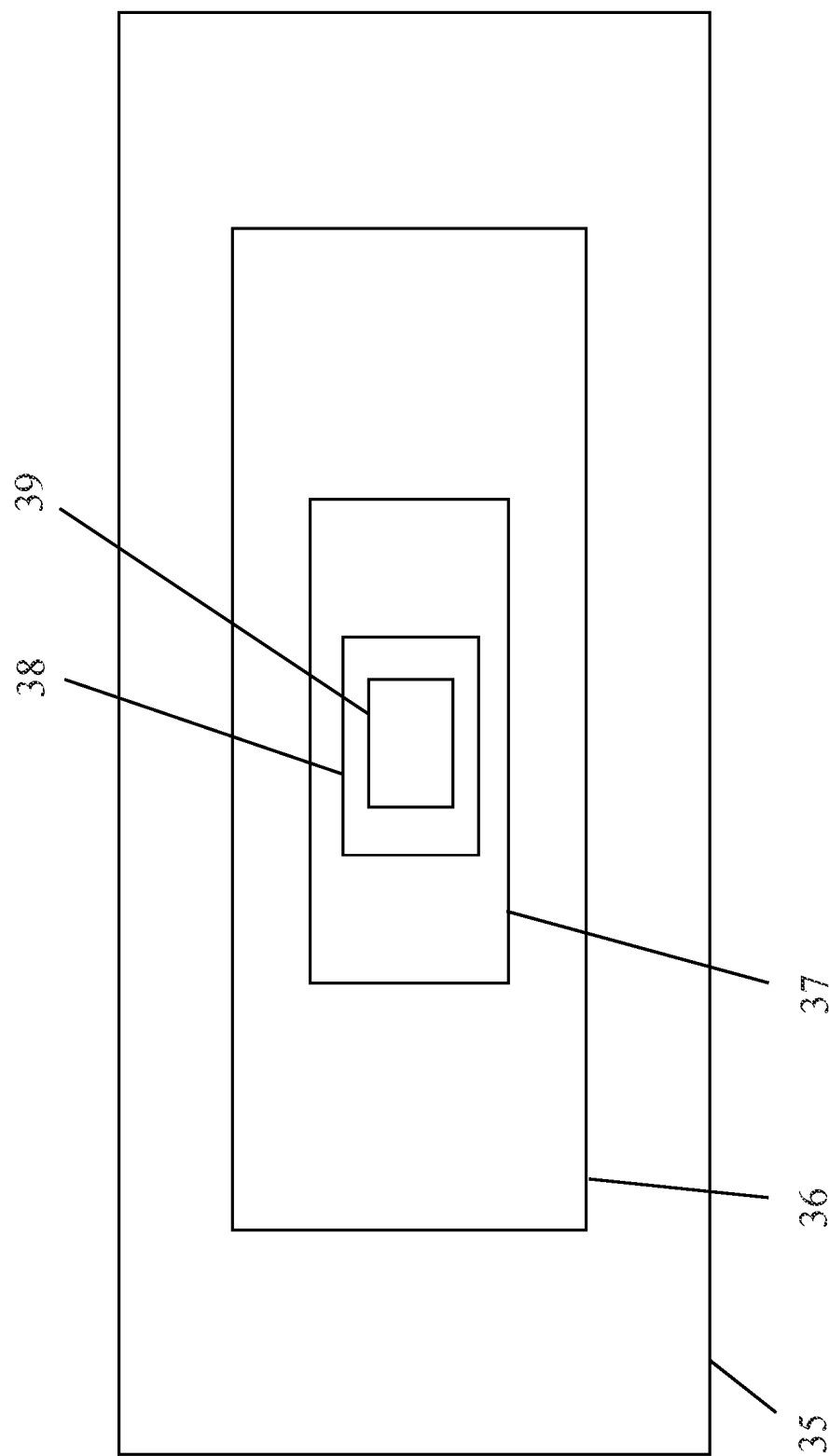
FIG. 7 shows a representative conceptual example of a RevoVerse in accordance with various embodiments of the present invention.

As shown in the conceptual representation in FIG. 7, a RevoVerse (35) may contain an infinite number of galaxies (36), each galaxy may contain an infinite amount of planets (37), satellites and even singularities. Within each planet (37), there may be an infinite number of swarms (38) which may be a concentrated mass of users (39) (e.g., singularities) that may be connected and interacting with a planet. Swarms (38) may be dynamically generated and may be constantly changing perhaps based on various determinations that may be calculated and even evaluated by a Net. A swarm may include an infinite amount of users (39) (perhaps called singularities) which may exist within a small portion of a swarm. The amount of users within a swarm may be dynamically generated and may be constantly changing perhaps based on various determinations that may be calculated and evaluated by a Net.

Swarms may be a unique and even natural creation within a RevoVerse that may exist simultaneously in multiple galaxies, stars, planets, satellites, or the like. Since a Net may allow for new and revolutionary connectivity, a single user (e.g., singularity) and even A.I. engines can potentially exist in a multitude of places within the RevoVerse perhaps at the same time. This Singularity and A.I. phenomenon of existing in multiple spatial locations in the RevoVerse may be what creates Swarms.

Perhaps for a user or singularity to exist within a specific location in the RevoVerse, the user may need to be interacting or even transacting within a specific spatial location, such as a planet or the like. Another way a user may possibly exist within a specific location may be by becoming a swarmer voluntarily for a type of proof-of-stake consensus and may not actually be interacting or transacting. This may mean that singularities can opt-in and even opt-out at any time to be a swarmer perhaps for this purpose. Singularities that volunteer to become a swarmer may be doing so for a type proof-of-stake consensus perhaps known as Swarm Synchronization. This may be a consensus used by Revos and its associated Public and Private Distributed Ledger Technologies. Swarm Synchronization is discussed in more detail herein.

A Verse Fabric may include an additional swarm type and even a layer specific to neural networks that may drive artificial intelligence engines within the RevoVerse. Perhaps due to the RevoKind A.I. Autonomous Interface being integrated into the RevoVerse, neural networks that may be at the core of A.I. engines may be autonomously connected and even learning from each other. Deep learning may become autonomous and may occur exponentially more efficiently than current models. This may also mean that transactions and interactions between A.I. engines may also need to be part of the RevoVerse at the Revos Distributed Ledger Technology layer perhaps to insure secure and even valid transactions and interactions.

As a non-limiting example, two separate singularities may have built decentralized artificial intelligence engines within the RevoVerse for a specific purpose and may use two segregated decentralized data sets for those engines. The first engine may need data from the second engine perhaps to learn and even to become more efficient. The two singularities may implement and may even execute a dynamic smart contract on the Revos DLT. A second singularity may provide access to the second A.I. engine and to the first singularity and the first A.I. engine may return for compensation. Exchange of data may be raw data, learned outputs from engine two, or the like. For this example, the exchange may include both raw data and learned outputs so that via a DLT and the A.I. autonomous interface, engine two may begin to share data and learned outputs to the first engine.

The first engine, perhaps through A.I. creativity and questioning, can learn from the second engine's learned outcomes and even validate these outcomes with the second engine's data sets, perhaps if it chooses to do so. The first engine can essentially learn from the wisdom of the second engine. Additionally, if the second engine is capable, it may be able to integrate the second engine's wisdom into its own neural network and may even process it perhaps providing an almost immediate more intelligent learned result for the first engine and its purpose. While these A.I. interactions are occurring, a DLT may be insuring that all interactions may be secure, may be coming from the correct origin, and perhaps that the second singularity may be compensated per the dynamic smart contract from the first singularity. An infinite number of neural networks may be running A.I. engines within the RevoVerse that may be connected and even interacting autonomously in this manner. This may be what creates A.I. swarms within the RevoVerse. A RevoVerse technology may be the infrastructure, perhaps to allow neural networks of all types, to interface and learn from each other in a revolutionary way. It may also provide all the conditions for individuals (e.g., singularities) the choice to provide data to A.I. engines directly and even be compensated for doing so based on the singularities terms.

Embodiments of the present invention may provide an A.I. autonomous interface which may provide the protocols, integration, and even interoperability with the RevoVerse perhaps to allow artificial intelligence engines access to new tools and communication capabilities while automating learning and other various processes. Artificial intelligence engines can share data, learned outcomes, and even interact with each other while simultaneously interacting with Singularities and various other systems within the RevoVerse.

An A.I. Autonomous interface may provide additional tool sets for parameters and even controls on various interactions. This may allow for strict or even free parameters for operations that may allow for control over how the interactions occur and what may be shared. Additionally, the tool set may provide a way to review and even refine the learned outcomes of these interactions. These parameters and controls can be configured to be completely autonomous or the configuration can be very strict so that every interaction can be reviewed.

An A.I. autonomous interface may be the solution to bring siloed neural networks, artificial intelligent systems, data, and even their learned results into a place that can be shared and connected. It may be a more efficient solution and even use of computing to solve problems globally that has more efficient deep learning capabilities.

Data sharing may be between A.I. Engine to A.I. Engine which may provide a direct communication interface and interoperability between various types of neural networks, which may be at the core of A.I. engines. This may mean that all types of A.I. engines can connect, share, interact, and even learn from each other, or the like. Data sharing may be between singularity and an A.I. Engine which may provide singularities involved a way to connect securely perhaps using DLT's. This may allow for a way to view and even manage the agreed upon interactions between singularities perhaps for sharing or even selling between A.I. engines and other various Dapps, DAO's, and other applications, or the like.

As mentioned herein, embodiments of the present invention may provide an interstellar which may allow for distributed ledger technology, such as blockchain, to become interconnected to other decentralized technologies. One problem that interstellar may solve may be the interoperability and integration of various DLT's. Currently, DLT's may be disparate and siloed. When building or even developing from DLT's, developers may be forced to choose a single DLT for their development. If multiple DLT's may be used, there may be complex development integrations that should be created for this to happen. This may be very costly, both monetarily and the time that it may take.

Interstellar may provide systems, interfaces, communication, and even tools perhaps to integrate a multitude of DLT's in any type of development process. It may be the framework that may allow for decentralized systems, built with any type of distributed ledger technology, perhaps to leverage from other DLT's without the need to build each interface. Additionally, it may provide the tools to control how these interactions occur and to what depth.

Interstellar may be built upon the RevoVerse Verse Fabric and may provide additional benefits to developments that may utilize public and private DLT's. However, it may provide developments that have built DLT's with third party technology a way to interface with the RevoVerse and leverage other third party DLT's and public and private DLT's. Additional benefits can also be realized perhaps by using Interstellar such as security, speed, and other efficiencies because it may be built upon the RevoVerse technologies.

As discussed herein, embodiments of the present invention may provide a decentralized application interface (D.A.I.) which may provide the protocols, interfaces, communication, tools, and the like for decentralized applications ("Dapps") to possibly interface directly and to possibly leverage additional resources within the RevoVerse. A D.A.I. may be the standard for Dapps developed within the RevoVerse that may allow for rapid development, perhaps with access to: Dynamic Smart Contracts, Revos, Interstellar, and any and all other resources that exist within the RevoVerse. Decentralized applications can use the D.A.I. to build and develop with respect to a standard that may allow for other Dapps to leverage or use its technology and possibly be compensated for such use. This may all occur in a decentralized environment and may not have a single point of failure or security risk.

RevoCol, a revolutionary communication protocol, may exist at the transport layer of M.E.T.I.S. and may allow for decentralized connectivity over a neural network. This protocol may be an artificially intelligent routing protocol that may use, for example, a spatial universe mapping system. It may create an entirely new type of network infrastructure within the RevoVerse. RevoCol may be the solution to intelligent data routing by possibly using neural networks in a deep learning environment, possibly while utilizing a variant of long short-term memory within a recurrent neural network.

A RevoCol system may utilize and leverage an extremely light weight artificial intelligence engine to route data in the most efficient way possible. This protocol may have been designed to create dynamic data routing, perhaps based on a new spatial mapping system within the RevoVerse. It may be a communication protocol that exists only within the RevoVerse and completely replaces data routing as defined by traditional networks. Data can be routed more efficiently perhaps because the connections may be direct and routing hops may no longer be required. RevoCol may provide data routing between all users, programs, and artificial intelligence engines; it may be the core for RevoPN and RNNSP functionality. Additionally, it may be the protocol that provides the Revos Public and Private DLT's with the efficiency and speed that may exponentially increase over time. This performance may be accredited to the development of two artificial intelligence technologies that RevoCol may utilize and leverage to increase efficiency and security over time.

An efficiency and security of RevoCol can be realized due the global computing power that can be leveraged from every device that is connected to a Net and even possibly all the systems that are part of M.E.T.I.S. within the RevoVerse. The fractional and shared computing power may also provide for a sustainable communications system that may become more efficient over time, possibly by reducing consumption of energy to route data. RevoCol may redefine the way data is routed, how connections are made, and the way in which systems communicate, as but non-limiting examples, in a completely decentralized infrastructure.

Figure 10:
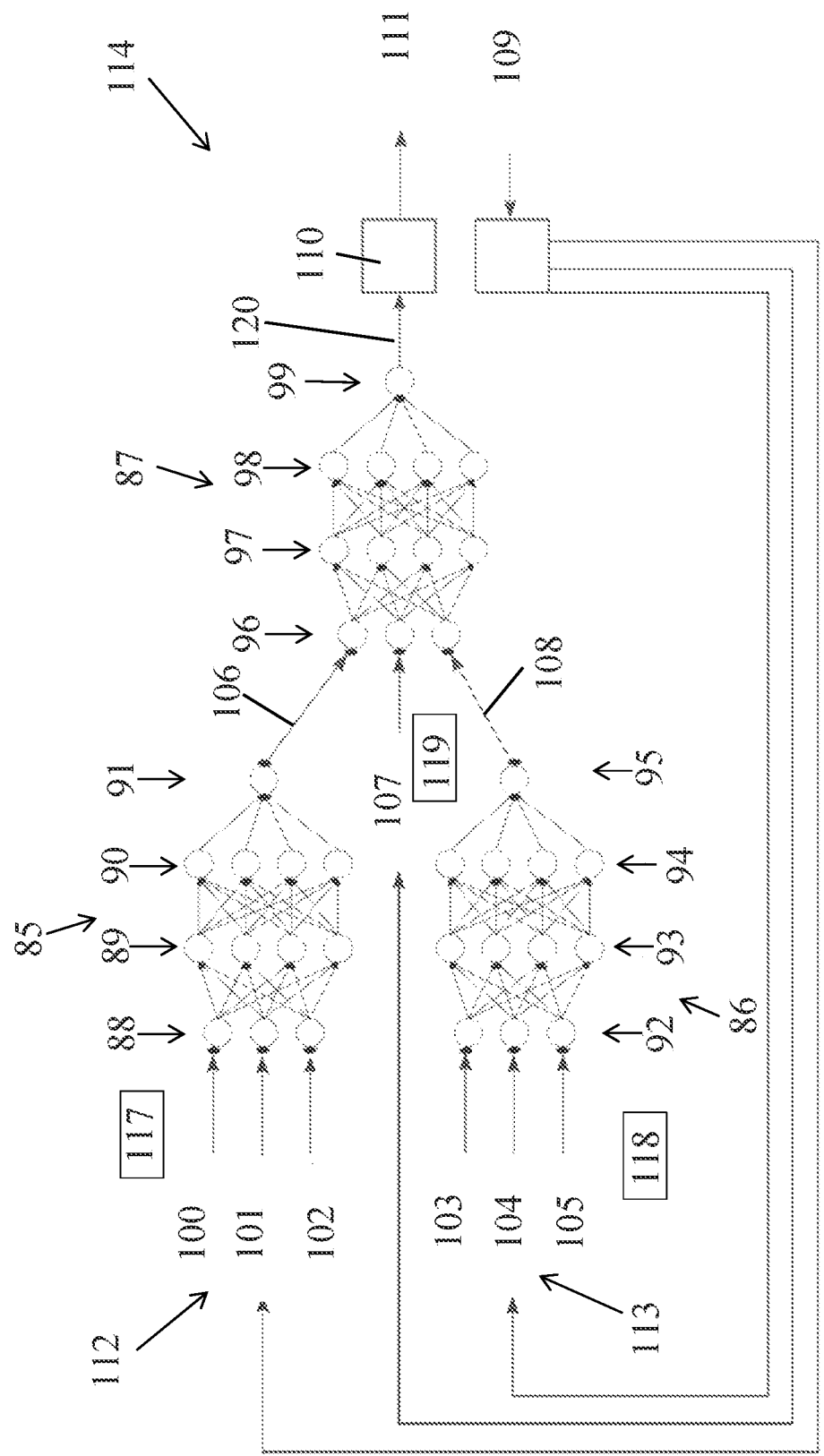
FIG. 10 shows a representative conceptual example of an artificial neural network environment in accordance with various embodiments of the present invention.

Embodiments of the present invention may provide a decentralized and infrastructureless artificial intelligent communication protocol that may use artificial neural networks, deep learning, and even named data networking. FIG. 10 illustrates a non-limiting example of an artificial neural network environment including a first artificial neural network environment (85), a second artificial neural network environment (86), and a third artificial neural network environment (87). A first artificial neural network environment (85) may provide time result data routing perhaps via a time result data routing system (117), a second artificial neural network environment (86) may provide spatial result data routing perhaps via a spatial result data routing system (118), and a third artificial neural network environment (87) may provide combined result data routing network topology optimization perhaps via a combined result data routing network topology optimization system (119). Each of said artificial neural networks may perform deep learning perhaps even continuous deep learning. A network may provide input (109) which may be sent to a first, second, and even third artificial neural network environments.

A time result data routing system (117), a spatial result data routing system (118), and perhaps even a combined result data routing network topology optimization system (119) may be a deep learning system or even a continuously deep learning system.

A first artificial neural network environment (85) may have an input layer (88), a first hidden layer (89), a second hidden layer (90), and an output layer (91). An input layer (88) may receive information (112) such as input from data sends (100), input from a network (101), and perhaps even input from data receives (102). Such information may be processed by a time result data routing system.

A second artificial neural network environment (86) may have an input layer (92), a first hidden layer (93), a second hidden layer (94), and an output layer (95). An input layer (92) may receive information (113) such as input from spatial sends (103), input from a network (104), and perhaps even input from spatial receives (105). Such information may be processed by a spatial result data routing system.

A third artificial neural network environment (87) may have an input layer (96), a first hidden layer (97), a second hidden layer (98), and an output layer (99). An input layer (96) which may act as in input and may receive output (106) from a first artificial neural network environment output (91), input from a network (107), and perhaps even output (108) from a second artificial neural network environment output (95). Such inputs may be processed by a combined result data routing network topology optimization system. A third artificial neural network environment's output layer (99) may provide input (120) such as network input and even interpolation into a named data networking routing (110) of which output thereof may be sent to a network (111) or the like.

Figure 11:
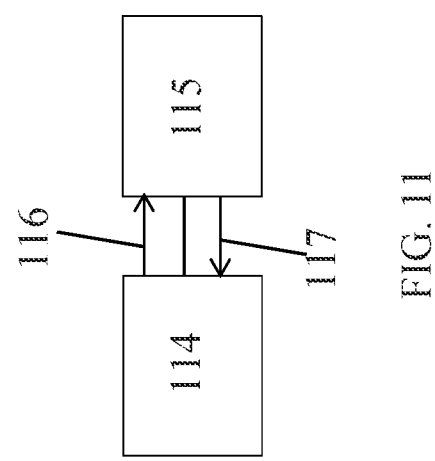
FIG. 11 shows a representative conceptual example of a artificial neural network environment in accordance with various embodiments of the present invention.

By utilizing at least two artificial neural network (ANN) instances that may perform continuous deep learning, then applying the individual output results of each as an input to a third ANN that may perform continuous deep learning, and then applying that output result to the network (111) & transport layers of an open systems interconnection (OSI) model, an artificially intelligent communication protocol (114) may be formed. This three-tiered ANN result may be integrated into named data networking perhaps to create a continuous self-configuring infrastructure-less communication network. As shown in FIG. 11, this may be accomplished by integrating the entire communication protocol (114) stack in a plurality of devices (115) such as at each end device, node (e.g., artificial neuron), resource, or the like on the network. Each end device, node (e.g., artificial neuron), and resource can securely communicate and even share (116) ANN results between each other. The devices may provide additional results (117) perhaps based on ANN results. As a result, the entire network may become decentralized and even autonomous perhaps since all end devices, nodes (artificial neurons), and resources connected to the network may become a collective ANN.

The first ANN may be tasked with continuous deep learning of a network data flow and may be strictly focused on data routing optimization. This ANN may be structured using each physical or even virtual connection that may be sending or even receiving data as the collection of connected units or even nodes that may create artificial neurons. This ANN may utilize deep learning technology perhaps to continuously output results to optimize data routing perhaps based on time results. This ANN may continuously use deep learning technology to analyze internal results at the end device and even shared ANN results from other end devices perhaps to optimize data routing based on time. This ANN may also share its results to other end devices on the network perhaps for ANN input for its deep learning and optimization.

The second ANN may be tasked with continuous deep learning of the devices such as the end devices, nodes (e.g., artificial neurons), and even resources connected to the network and may be focused on spatially referencing of each. This ANN may be structured using the physical spatial position within the physical or virtual network topology of each physical or virtual connection that may be sending or even receiving data as the collection of connected units or nodes that create artificial neurons. This ANN may utilize deep learning technology to continuously output results to optimize data routing perhaps based on spatial results. This ANN may continuously use deep learning technology perhaps to analyze internal results and shared ANN results from other end devices, nodes (artificial neurons), and resources connected to the network to optimize data routing based on spatial results. This ANN may also share its results to other end devices, nodes (artificial neurons), and resources connected to the network on the network perhaps for ANN input for their deep learning and optimization.

The third ANN may be tasked with continuous deep learning using the output or even results of the first and second ANN as its inputs and may be focused on the total data routing optimization of the entire artificial neural network topology. This ANN may be structured using its output as an integrated autonomous dynamic intelligent routing system for named data networking. The ANN may utilize deep learning technology perhaps to continuously output results to optimize total data routing optimization based on both time and spatial results of all end devices, nodes (artificial neurons), and resources connected to the network and may then be interpolated for named data networking networks at the network and even transport layers of an OSI model. The ANN may be continuously using deep learning technology perhaps to analyze internal results and shared ANN results from other end devices, nodes (artificial neurons), and resources connected to the network perhaps to optimize total data routing of the entire artificial neural network topology based on time and spatial results.

Embodiments of the present invention may provide a method for creating an infrastructureless communication network comprising the steps of providing a first artificial neural network; providing an input layer, a first hidden layer, a second hidden layer, and an output layer in said first artificial neural network: inputting information to said input layer of said first artificial neural network; time result data routing of said information in said first artificial neural network; providing a second artificial neural network; providing an input layer, a first hidden layer, a second hidden layer, and an output layer in said second artificial neural network; inputting information to said input layer of said second artificial neural network; spatial result data routing said information in said second artificial neural network; inputting an output from each of said first artificial neural network and said second artificial neural network into a third artificial neural network; providing an input layer, a first hidden layer, a second hidden layer, and an output layer in said third artificial neural network; combined result data routing network topology optimization processing of said output from each of said first artificial neural network and said second artificial neural network; outputting an output from said combined result data routing network topology optimization processing; inputting said output to a network; and perhaps even creating an artificially intelligent communication protocol.

Other embodiments may include an infrastructureless communication network comprising a first artificial neural network; an input layer, a first hidden layer, a second hidden layer, and an output layer in said first artificial neural network; input information for said input layer of said first artificial neural network; a time result data routing system for said information in said first artificial neural network; a second artificial neural network; an input layer, a first hidden layer, a second hidden layer, and an output layer in said second artificial neural network; input information for said input layer of said second artificial neural network; a spatial result data routing system said information in said second artificial neural network; an input for an output from each of said first artificial neural network and said second artificial neural network into a third artificial neural network; an input layer, a first hidden layer, a second hidden layer, and an output layer in said third artificial neural network; a combined result data routing network topology optimization system for said output from each of said first artificial neural network and said second artificial neural network; an output from said combined result data routing network topology optimization system; a network input for said output from said combined result data routing network topology optimization system to a network; and perhaps even an artificially intelligent communication protocol.

An A.I. spatial universe mapping system may be an artificial intelligence engine that may be tasked with, for example, dynamically mapping the RevoVerse in a virtual spatial environment. By creating a spatial mapping system, all the resources that exist within the RevoVerse can be visually mapped in a three-dimensional environment. This visually-created virtual universe may allow singularities to easily interact in a more natural way. The spatial mapping system may also be utilized by RevoCol to assist in tasks, perhaps by efficiently making the most direct connections based on spatial location within the RevoVerse.

An A.I. dynamic intelligent routing system may be an artificial intelligence engine that is tasked with the routing system of the entire RevoVerse. It may control the routing by dynamically and intelligently synchronizing the data routes when interactions and transactions occur. It can also use predictive behavior analysis to increase efficiency of these data routes. RevoCol may leverage this engine and the A.I. spatial universe mapping system simultaneously to perform various communication tasks. These tasks may include: Singularity to Singularity connections, A.I. to A.I. connections, as but a few non-limiting examples, and a multitude of routing that may require dynamic intelligence routing within the RevoVerse. An A.I. dynamic intelligent routing system may replace the need for routing tables in traditional systems and may also be utilized by RevoPN for private and secure connections within the RevoVerse.

Embodiments of the present invention may include a private network (PN). Perhaps one of the most important aspect of decentralized systems may be the privacy of its users, their data, and the security of applications and associated data. A private network (which may be called a RevoPN) may provide a solution to decentralized systems at an infrastructure level within the session layer of M.E.T.I.S., and possibly as part of the Verse Fabric.

RevoPN may provide the private networking communication system as the entry point into the RevoVerse for singularities. All transactions and interactions within the RevoVerse can take place via this private connection. RevoPN may utilize RevoCol for the connections and routing of data to leverage the efficiencies of that protocol. As a result, every interaction and transaction that singularities engage in within the RevoVerse may be completely private, anonymous, and secure, while providing complete control of all data sharing at the discretion of the singularity. It may also mean that applications, regardless of terms and conditions to use that application, may never be able to collect data without the singularities knowledge and consent.

Figure 12:
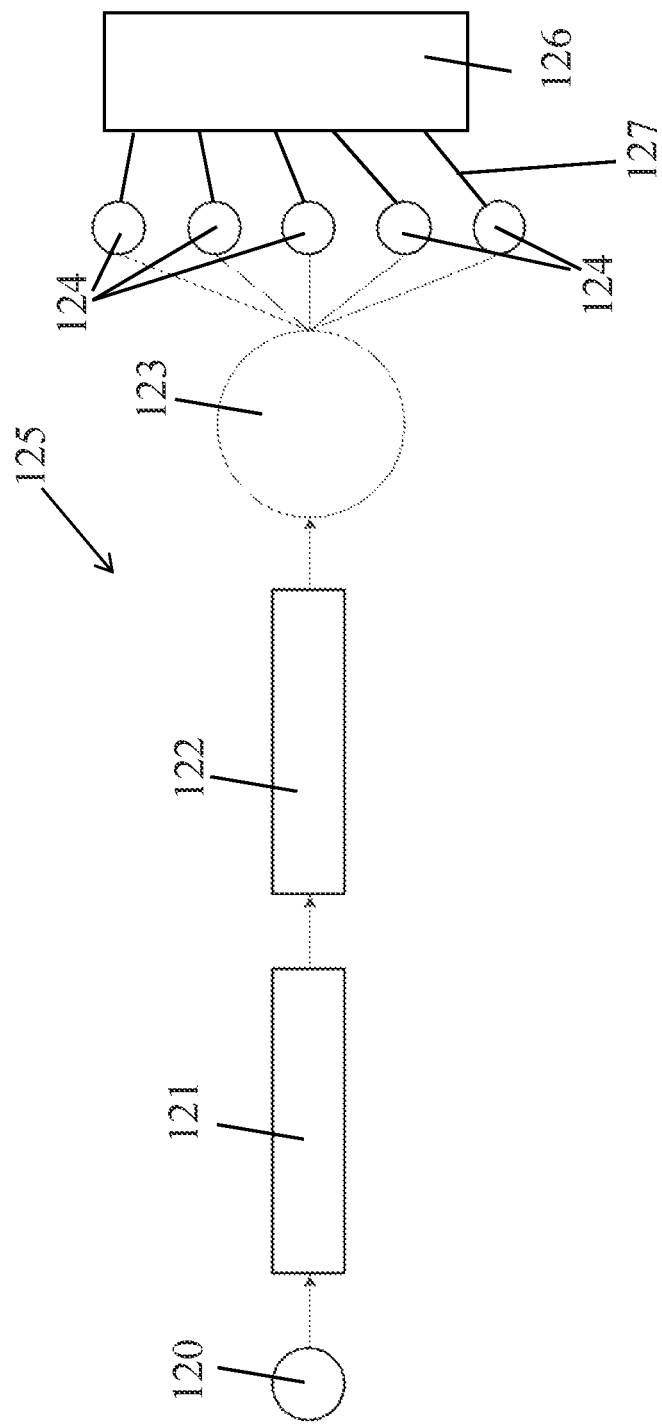
FIG. 12 shows a representative conceptual example of a private network environment in accordance with various embodiments of the present invention.

Embodiments of the present invention may provide a decentralized private network protocol perhaps using a distributed ledger technology and named data networking. FIG. 12 illustrates a non-limiting example of a private network environment which may include an authorized device (120), a distributed ledger technology (121), named data networking (122), a private network (123), and perhaps even authorized connections (124).

An authorized device (120) which may be owned by a user may be validated by a distributed ledger technology (121) perhaps using biometrics, fingerprints, palm veins, face recognition, DNA, palm print, hand geometry, iris recognition, retina, or the like. An authorized device may include but is not limited to cell phones, smartphones, televisions, smart televisions, cameras, speakers, laptops, printers, system on a chip interfaces, mobile computing devices, any combination thereof, or the like. An authorized device or user's encrypted credentials may be interpolated into a named data networking (122) on a network such that named data networking may be capable of accepting encrypted credentials of an authorized device. Authorized connections (124) may be based on user and/or device credentials. Connections may be encrypted from end to end. These connections can be to applications, devices, nodes (e.g., artificial neurons), and resources that may be authorized to be connected to a same network.

By utilizing a distributed ledger technology (121) that may validate (or may be capable of validating) a user and/or user authorized devices perhaps by way of biometrics and/or other means, that may provide access credentials to a network, and that may be integrated with named data networking, a private network protocol (125) that may be decentralized may be established. A private network protocol may allow multiple authorized connections (124) which may be secure connections perhaps simultaneously to other network connected options (126) such as but not limited to applications, end devices, nodes (artificial neurons), resources, or the like that may be connected to the network. A secure communication (126) may exist between an authorized device and at least one other network connected option. Each connection (124) may create an encrypted communication channel.

Embodiments of the present invention may provide a method for providing a decentralized private network comprising the steps of providing an authorized device; providing a distributed ledger technology; providing named data networking; providing a private network; creating a plurality of authorized connections for said authorized device utilizing said distributed ledger technology, named data networking in said private network; and perhaps even securely communicating between said authorized device and at least one other network connected option. Other embodiments may include a decentralized private network comprising an authorized device; a distributed ledger technology; named data networking; a private network; a plurality of authorized connections for said authorized device utilizing said distributed ledger technology, named data networking in said private network; and perhaps even secure communications between said authorized device and at least one other network connected option.

Embodiments of the present invention may include an A.I. dynamic intelligent routing system. A neural network synchronization protocol (NNSP) may be a core communications protocol that may be developed, designed, and engineered to power a RevoVerse, a Verse Fabric, and perhaps even public and private DLT's, as but non-limiting examples. At an application layer of M.E.T.I.S., NNSP may provide an artificial neural networking, compression, encryption, wireless mesh systems, and even synchronization intelligence all perhaps in a singular protocol.

NNSP may provide the base framework for public and private DLT's functionality, perhaps at the communication application layer of M.E.T.I.S. within a Verse Fabric. NNSP may be the communication protocol for, for example, the A.I. Autonomous Interface, Interstellar, and the Decentralized Application Interface. Additionally, NNSP may be the protocol at the application layer that may allow for IOT, Edge Computing, and Device Management, each may be developed and integrated within the RevoVerse.

As mentioned, embodiments of the present invention may provide a spatial neural network synchronization protocol perhaps using distributed ledger technology and even named data networking. A neural network synchronization protocol, abbreviated as NNSP, may be built on the application-level layer of the OSI perhaps upon TCP/IP. Aiming at secure communication, this protocol's design may make use of a neural network synchronization. Server and each connected user may create special type of neural network such as a Tree Parity Machine which may compute outputs of their neural networks and even exchange them in an iterative manner. By learning and exchanging outputs, user's and server's neural networks can be synchronized, such that they may have identical synaptic weights, perhaps after some time. Once synchronization may be achieved, weights of networks may be used for secret key derivation. For the purposes of encryption/decryption of subsequent communication this symmetric key may be used.

Figure 13:
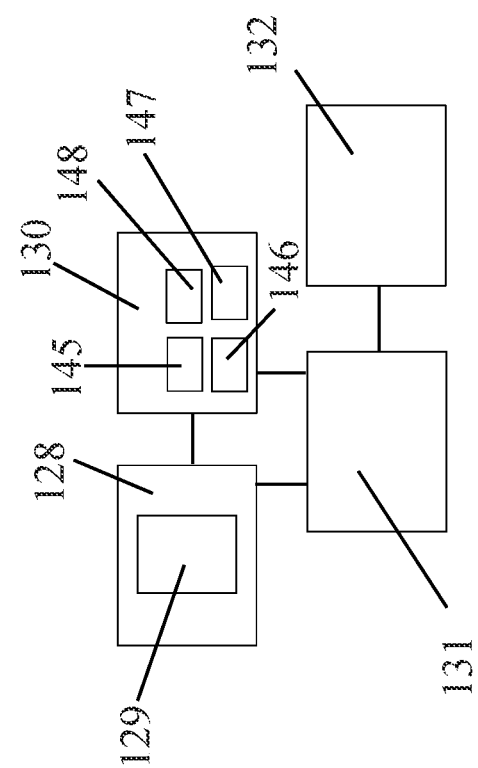
FIG. 13 shows a representative conceptual example of a spatial neural network synchronization environment and functionality in accordance with various embodiments of the present invention.
Figure 14:
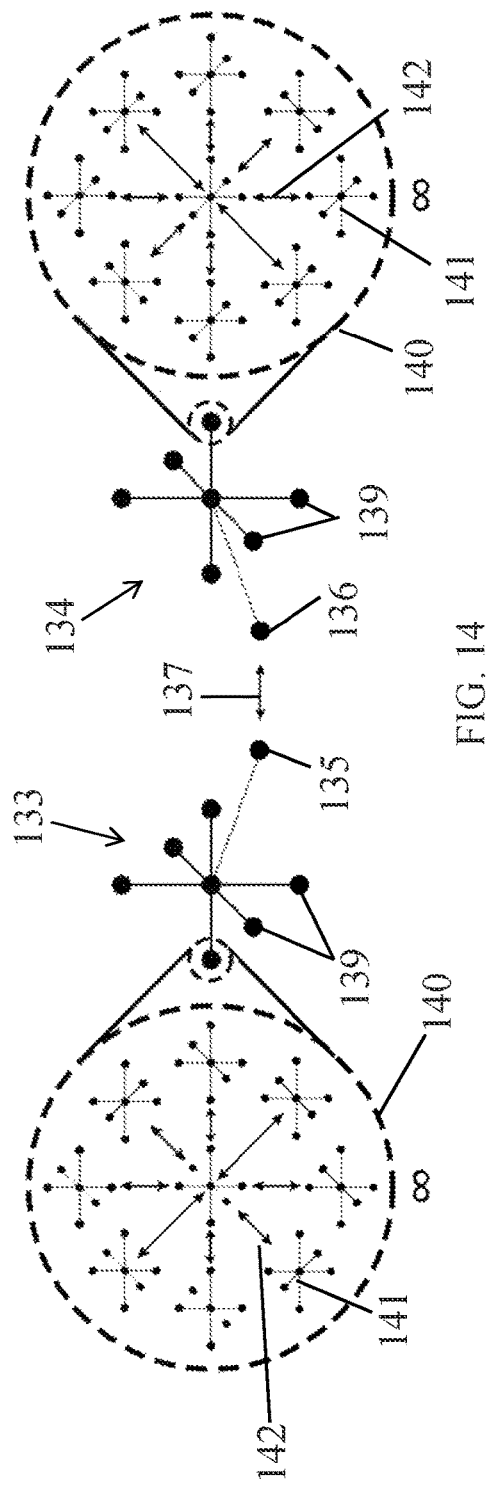
FIG. 14 shows a representative conceptual example of a neural network in accordance with various embodiments of the present invention.
Figure 16:
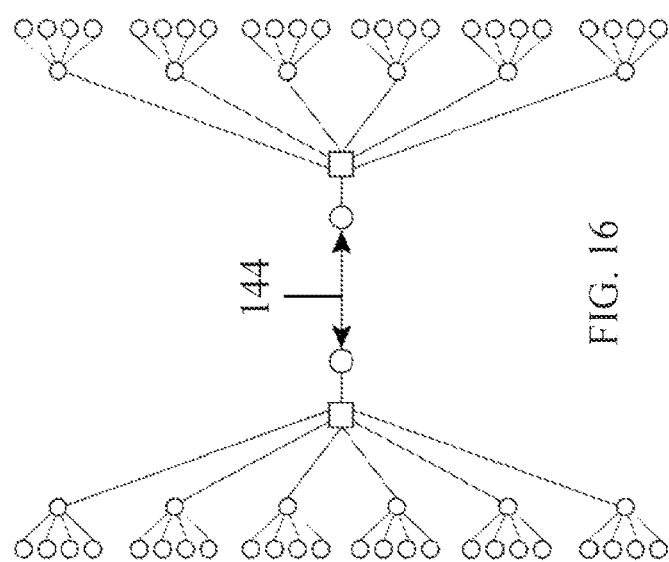
FIG. 16 shows a representative conceptual example of a neural network in accordance with various embodiments of the present invention.
Figure 15:
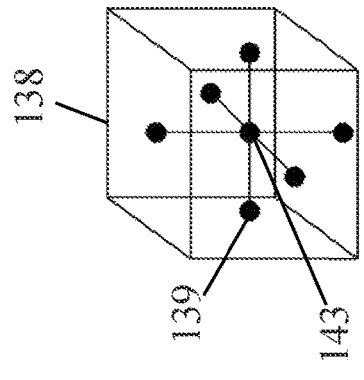
FIG. 15 shows a representative conceptual example of a neuron in accordance with various embodiments of the present invention.

FIGS. 13, 14 and 15 illustrate a non-limiting example of a spatial neural network synchronization environment and functionality. FIG. 13 provides a conceptual representation of a named data networking (128), a distributed ledger technology (129), a spatial neural network sync protocol (130), an authorized device (131), and a neural network (132). Each authorized device may have its own neural network. A spatial neural network sync protocol (130) may provide a validation process (144), a secure communication process (145), a neural network synchronization process (146), and perhaps even a communication interpolating process (147). As may be understood in FIGS. 14 and 15, a neural network may be a tree party machine. In embodiments, an authorized device may have its own tree party machine, namely a first tree party machine (133) which may communicate (137) with a second tree party machine (134). Each tree party may provide an output (135), (136) to each other. A tree party machine may have a neuron (138), perhaps even a spatial neural network synchronization neuron, which may have sub-neurons (139) perhaps even six sub-neurons. A sub-neuron (139) may have an infinite amount of expansion neural networks (141) perhaps to create network branches (142) as may be seen in the exploded view (140) of the sub-neuron in FIG. 14. Each spatial neural network synchronization neuron (138) may have spatial and even time inputs from the six sub-neurons that may be used for the seventh sub-neuron (143) which may be a tree party machine output neuron perhaps at the center as may be understood in FIG. 15. All seven neurons combined may create a singular neuron. Of course, neurons may have any number of sub-neurons and all are meant to be included in this disclosure. FIG. 16 provides a non-limiting example of a spatial neural network synchronization protocol where secured communications (144) such as end to end encrypted communications can be exchanged between networks, devices, and users. A communication interpolating process (147) may provide interpolation of a communication between neural networks.

By utilizing neural key exchange and network synchronization protocol with distributed ledger technology (DLT) that may validate perhaps as a validation process (144) a user and/or user authorized devices perhaps by way of biometrics and/or other means, and that may be integrated with named data networking, an artificial neural network may be created perhaps as an application at layer seven of the Open Systems Interconnection (OSI) model. This application may provide end to end encrypted communications that may create symmetric keys perhaps using a computed hash algorithm and may then be interpolated by named data networking for routing across the network. A multi-layer feedforward neural network, perhaps known as tree parity machines (TPMs), may be used within the process of computing the symmetric hash and even synchronizing secure communications via encrypted keys perhaps with a neural network synchronization process (146). A secure communication process (145) may be configured to secure a communication between neural networks and devices which may include validating, encrypting, or the like. The inputs for the TPMs may correlate to the DLT and may use spatial and time dynamics within the computing of neural keys, symmetric keys, computed hashes, symmetric hashes, or the like. The inputs may further be encrypted perhaps using the NDN routing across the network which may be provided by a communication interpolating process. Using the TPMs, DLT, and NDN within the application may create secure broadcasting of communications of computed hashes that can allow for multi-channel neural network synchronization simultaneously between multiple users and/or user authorized devices. This application can be used for communications (137) such as but not limited to, end to end encrypted communications, point to point communications, point to multi-point communications, and multi-point to multi-point communications, simultaneously, any combination thereof, or the like. Neural networks may be able to receiving communications, decrypt communications, validate communications; and perhaps even send communications to an authorized user.

Embodiments of the present invention may provide a method for securely communicating in a decentralized network comprising the steps of providing named data networking; providing a distributed ledger technology integrated with said named data networking; providing a spatial neural network synchronization protocol; providing an authorized device from a first neural network; validating said authorized device with said distributed ledger technology; providing an authorized device from a second neural network; creating a communication from said authorized device from said first neural network to be sent to said authorized device from said second neural network; securing said communication in said first neural network; neural network synchronizing said communication to said second neural network; and perhaps even interpolating said communication to said second neural network. Other embodiments may include a system for secure communications in a decentralized network comprising named data networking; a distributed ledger technology integrated with said named data networking; a spatial neural network synchronization protocol; an authorized device from a first neural network; a validation process capable of validating said authorized device with said distributed ledger technology; an authorized device from a second neural network; a secure communication process configured to secure a communication between said authorized device from said first neural network and said authorized device from said second neural network; a neural network synchronizing process; and perhaps even a communication interpolating process.

Embodiments of the present invention may provide a Revolutionary Asset Class. Revos may be a new revolutionary digital asset class that may allow for transactions of, as non-limiting examples: currency value, asset transfers, Dynamic Smart Contracts, asset vaults, or the like. This digital currency may be built into RevoVerse, a Net, and perhaps even the Verse Fabric, possibly as an overlay within the Public and Private DLT's. Revos may utilize an artificial intelligence engine perhaps called Revos A.I. that may be modeled after natural resources (e.g., gold, silver, platinum, diamonds) and other cryptocurrencies, possibly to create a revolutionary new way to mimic those combined assets as a new revolutionary asset class. A Revos A.I. can create, reward, and even control the environment and artificial intelligent world in which Revos exist. This may mean that all Revos may be created at the initial start of the RevoVerse within the Revos A.I. and perhaps only the Revos A.I. may ever know how much is available. There may be a finite amount of Revos, however it's possible that only the Revos A.I. will have the specific number. To mimic natural resources and other cryptocurrencies, a discovery event may occur. This may be when Revos is first discovered in the RevoVerse by a Singularity and the reward may be obtained by that first Singularity. This discovery event may only occur once and may produce a significant reward of Revos to the discovering Singularity.

A Revos A.I. may fundamentally cause a paradigm shift in how Revos may be awarded and how proof of stake may be completed on the Revos DLT's perhaps within the RevoVerse. Revos asset class may use NNSP (Revo Neural Network Synchronization Protocol) at its core and may leverage the technology within M.E.T.I.S. and the Verse Fabric. Revos may exist as an overlay layer, possibly within the RevoVerse. It may be a core distributed ledger technology for any and all transactions and interactions that occur within a RevoVerse perhaps on both public DLT and private DLTs. It may interface directly with all other A.I. engines and Interstellar to possibly provide the final underlying technology layer of the RevoVerse. All transactions and interactions may be required to utilize Revos within the RevoVerse, as it may be directly integrated into all systems.

Embodiments of the present invention may provide decentralized transactions and even interactions. Singularities may become directly connected for all transactions and interactions within the RevoVerse, possibly by utilizing a Net. During transaction and/or interaction sessions, all parties involved may also be connected to an A.I. simultaneously.

Once a transaction or interaction occurs, a hash from each singularity may be sent to the an A.I. for confirmation. The A.I. may validate that all required singularities are connected, that the singularities are valid singularities with the identification A.I. engine, and that all singularities are synchronized, as but a few non-limiting examples. Each hash from all singularities may then be combined into a singular hash within the A.I., that full hash may then be split into however the singularities may be synchronized. The hash pieces may then be randomly sent back to each singularity, perhaps to be broadcast to a swarm perhaps for swarm synchronization.

Embodiments of the present invention may provide swarm synchronization. Swarms may exist everywhere in the Verse and may be dynamically created by an A.I. dynamic intelligent routing system and/or an A.I. spatial universe mapping system. The swarms may be constantly changing based on a multitude of scenarios. As a non-limiting example, a swarm may be a group of singularities that may be currently materialized within a specific planet, satellite, or galaxy and may be randomly assigned to a swarm that only the A.I. systems are cognizant of. These swarms may be synchronized via the RNNSP when they are assigned to a specific swarm. This may only be at the spatial and communication layers of the M.E.T.I.S. stack. To utilize swarms and their phenomenal distributed power within the RevoVerse, a new proof-of-stake consensus may be implemented and it may be called swarm synchronization.

During a transaction or interaction on a public and/or private DLT's, the singularities that are involved may go through an isolation process within the swarm. These singularities may then be surrounded by individual swarms that may essentially be assigned to only those singularities and only that specific transaction/interaction.

While it is possible to be assigned to more than one swarm simultaneously, it may be impossible to receive hash pieces within a swarm if you are a broadcaster of hash pieces within that same swarm. This can be one of many layers of security that may protect the authenticity of the verification. When a hash piece may be broadcasted from the broadcast singularity within a swarm, the rest of the swarm may receive that hash piece. The singularities that have received the hash piece may then synchronize that hash with other singularities within the swarm. In other words, multiple singularities within the swarm may all receive the same hash piece, possibly via broadcast from the broadcast singularity. Once received, those singularities may then insure that the hash piece matches with the other singularities that may have received the hash piece, and that it matches with the broadcast singularity. This specific step in a swarm synchronization consensus may be called swarm consensus. Once a swarm consensus may be reached, this may validate the hash piece, possibly within that specific Swarm only.

Once all swarms involved in the transaction or interaction complete a swarm consensus process within that specific swarm, a swarm synchronization process may occur. The individual swarms that have reached a swarm consensus may now synchronize their hash piece with the other swarms, perhaps by broadcasting as a swarm back to an A.I. engine. The A.I. engine may confirm that the original pieces sent to the singularity and broadcast to the individual swarm's match with the hash pieces received from each swarm. An A.I. may then send the combined hash created earlier to a DLT and may create a new ledger entry. That entry may then be synchronized to all swarms within a DLT, therefore possibly updating the entire RevoVerse.

Figure 8:
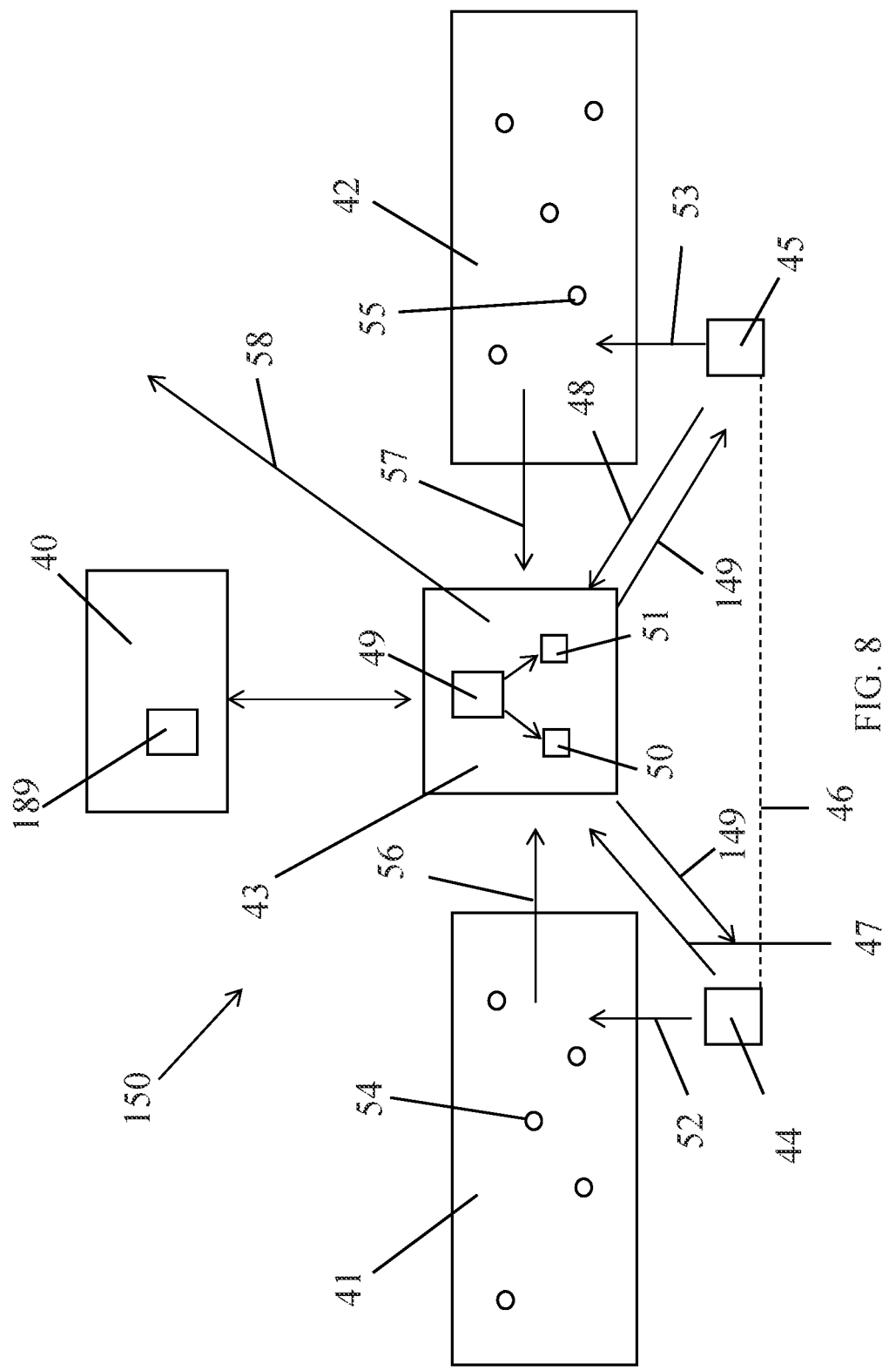
FIG. 8 shows a representative conceptual example of a consensus process in accordance with various embodiments of the present invention.
Figure 17:
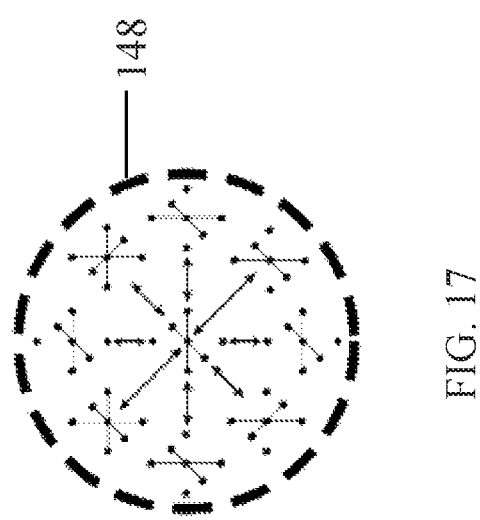
FIG. 17 shows a representative conceptual example of a swarm in accordance with various embodiments of the present invention.

FIG. 8 provides a non-limiting example of a consensus process (150) including an identification authorization system for credential verification (40) such as an A.I. system, a swarm A (41), a swarm B (42), a distributed ledger technology (43), a user A (44), and a user B (45). In first step, users A (44) and B (45) may perform an event (46) such as a transaction or even an interaction. A hash piece (47), (48) may be sent from each user's device to a DLT (43) perhaps for confirmation of the initiation of the transaction or interaction users via a spatial neural network synchronization protocol. The hash piece (47), (48) from each user may contain a record of the transaction or interaction, user credentials, processing information, and any other information that may pertain to the transaction or interaction that may be required for processing. The DLT may use the hash for authorization perhaps to access the records that may be encrypted from each user and from any other additional record sources on the network that may pertain to the transaction or interaction. In a next step, an identification and authorization system (40) may validate the user's credentials. Synchronization of the users, the DLT, and the identification and authorization system may be done via a spatial neural network synchronization protocol. Once synchronization may be complete and perhaps after all of the requirements have been met for the transaction or even interaction, a DLT may create a new computed hash piece (149). This computed hash piece may be a combination of the two hash pieces from each user. The computed hash piece may be randomly split by the DLT into two pieces (50) and (51). The randomization may be computed using chaotic dynamics that may exist within the artificial neural network of RevoCol and even a NNSP. The split pieces (50), (51) of the computed hash may be sent (149) to each user. User A may receive one piece and user B may receive the other. Each user (44), (45) may be isolated within a network and may be individually assigned to a randomly generated swarm (52), (53). The randomization of the swarm participants may be computed using chaotic dynamics that may exist within an artificial neural network perhaps of RevoCol and/or NNSP. Each user may then broadcast its hash piece (50), (51) to their assigned swarm. Swarmer participants (54) may receive the hash piece, such as the split computed hash piece, in swarm A (51) from user A (44) and swarmer participants (55) may receive a hash piece, such as the split computed hash piece, in swarm B (42) from user B (45). Each swarm may verify that all participants in the swarm have the same hash piece. This may be done using a spatial neural network synchronization protocol that may utilizing a RevoCol or even named data networking. Once all swarm participants may have validated the hash piece, the piece may be swarm synchronized. Swarm A (41) and swarm B (42) may broadcast each of the swarm synchronized validated hash pieces (56), (57) back to the DTL (43). A DLT (43) may validate the swarm synchronized hash pieces by comparing each piece of the original hash pieces sent to each user and that all swarm participants that were selected have broadcasted a validated piece back to the DLT. A DLT may then send a new combined hash (58) and even an associated record of the transaction or interaction perhaps created earlier to DLT as a new ledger entry. The new combined hash (58) and new ledger entry may be synchronized with all of the authorized swarms and participants in DLT network perhaps completing a swarm synchronization protocol consensus process. Of course, these steps may be in any combination or permutation or as a single step in various embodiment of the present invention. Each user may use its own neural network such as a tree party machine or the like. A conceptual representation of a swarm (148) is provided in the non-limiting example in FIG. 17.

An identification authorization system for credential verification (40) may be an artificial neural network multiplex identification (ANNMI) system which may provide virtual replication set of a user's unique biometrics (189) as discussed herein.

By utilizing RevoCol, RevoPN, NNSP, and perhaps even named data networking, a consensus methodology for distributed ledger technology can be formed. By creating a communications network built using RevoCol, RevoPN, NNSP, and even NDN, a procedure for processing immutable transactions or interactions can be constructed for various types of distributed ledger technologies. This procedure may use each of the technologies as a combined protocol perhaps to process immutable transactions or interactions. These transactions or interactions can take place between any of the following on the communications network: users to users, users to machines, machines to machines, neural networks to neural networks, and any combination of those instances. Each user, end device, node (e.g., artificial neuron), and resource connected to the network could be identified and authenticated during the connection process via a private network. All data communications of each user, end device, node (e.g., artificial neuron), and resource connected to the network may use RevoCol, NNSP, and even NDN. By leveraging the spatial neural network synchronization protocol of NNSP, a peer network functionality called swarms may be used to create groups of users, end devices, nodes (e.g., artificial neurons), or even resources that may be connected to the network. These swarms may be randomly generated perhaps by using the spatial, time, and even total network topology optimization functions of RevoCol perhaps combined with the spatial neural network synchronization protocol that may use tree parity machine neurons. These swarms may then be leveraged as part of a method to process transactions or interactions and provide consensus of those transactions or interactions that then may become immutable records within a distributed ledger technology.

Embodiments of the present invention may provide a public distributed ledger. A public distributed ledger technology (DLT) may allow for completely anonymous Singularity interactions within a RevoVerse. Some examples of core interactions may include cryptocurrency and fiat currency exchanges on the RevoXchange, connecting fiat banking systems for currency exchanges, Multi-One payments, direct peer to peer currency sends/receives, and other various interactions that do not require complex business logic, and the like. All interactions on a Public DLT may or may not require the cryptocurrency Revos, and in some cases, there may be additional benefits to using the core Revos cryptocurrency. These interactions may include third party DLT functionality, although certain limitations may exist and may depend upon that third party DLT platform. A Public DLT has the capability to interact with A.I. systems for specific purposes and allows for many of the functionalities of RevoNet.

Embodiments of the present invention may provide a private distributed ledger. A permissioned private distributed ledger technology (DLT) may allow for pseudo anonymous interactions for Singularities when complex logic may be possibly required. This may include interactions and even interoperability with third party DLT's to complete the logic. Additionally, a Private DLT may allow for third party application development, perhaps by using a proprietary programming user interface for building Dynamic Smart Contracts. These Dynamic Smart Contracts may enable Singularities to use a set of pre-defined logic libraries to easily create Dynamic Smart Contracts, possibly without programming the actual contract. This may mean that individual Dynamic Smart Contracts can be created on a per-Singularity basis, perhaps based on the needs of the Singularity for specific requirements. Additionally, a Private DLT may allow for transactional logic to be built into the Dynamic Smart Contracts, possibly for asset exchanges and/or asset ownership transfers. Therefore, only the Singularities involved or interacting with a specific Dynamic Smart Contract may have direct access to that contract once it may be created and even initiated. Once the Dynamic Smart Contract may be initiated and may be completed (perhaps after meeting all logic of that contract) then a core DLT may contain a record of that completed contract. A Private DLT may also have the capability to interact with A.I. systems for specific purposes. A Private DLT may allow for many of the functionalities of RevoNet.

Embodiments of the present invention may provide dynamic smart contracts (180). A private DLT may integrate a Dynamic Smart Contracts technology perhaps to allow for pure decentralized and autonomous interactions. Dynamic Smart Contracts can be smart contracts that may allow for users to easily setup processes and complex logic without any programming. It may provide developers and users sets of predefined libraries that may be created for specific industries and purposes to implement and use for rapid development. Dynamic Smart Contracts may also provide further customization, perhaps by using popular programming languages to make it easier for developers to design specific logic. Using semantics-based compilation, that may be built into the RevoVerse, a Private DLT may allow for the interoperability and integration of various popular programming languages for development of Dynamic Smart Contracts.

By utilizing RevoCol (which may be an infrastructureless communication network), RevoPN, NNSP, and even Named Data Networking (NDN) to create a distributed ledger technology network, and perhaps by using Swarm Synchronization Protocol for the consensus processing of immutable transaction or interactions, a dynamic smart contract apparatus for a distributed ledger technology can be formed perhaps using predefined construct libraries of serialized structured data using protocol buffers and even similar remote procedure call (RPC) systems. By creating this system for dynamic smart contract construction, the compiled and even generated contract can be constructed for various types of distributed ledger technologies to include interoperability interfaces with existing technologies.

Figure 19:
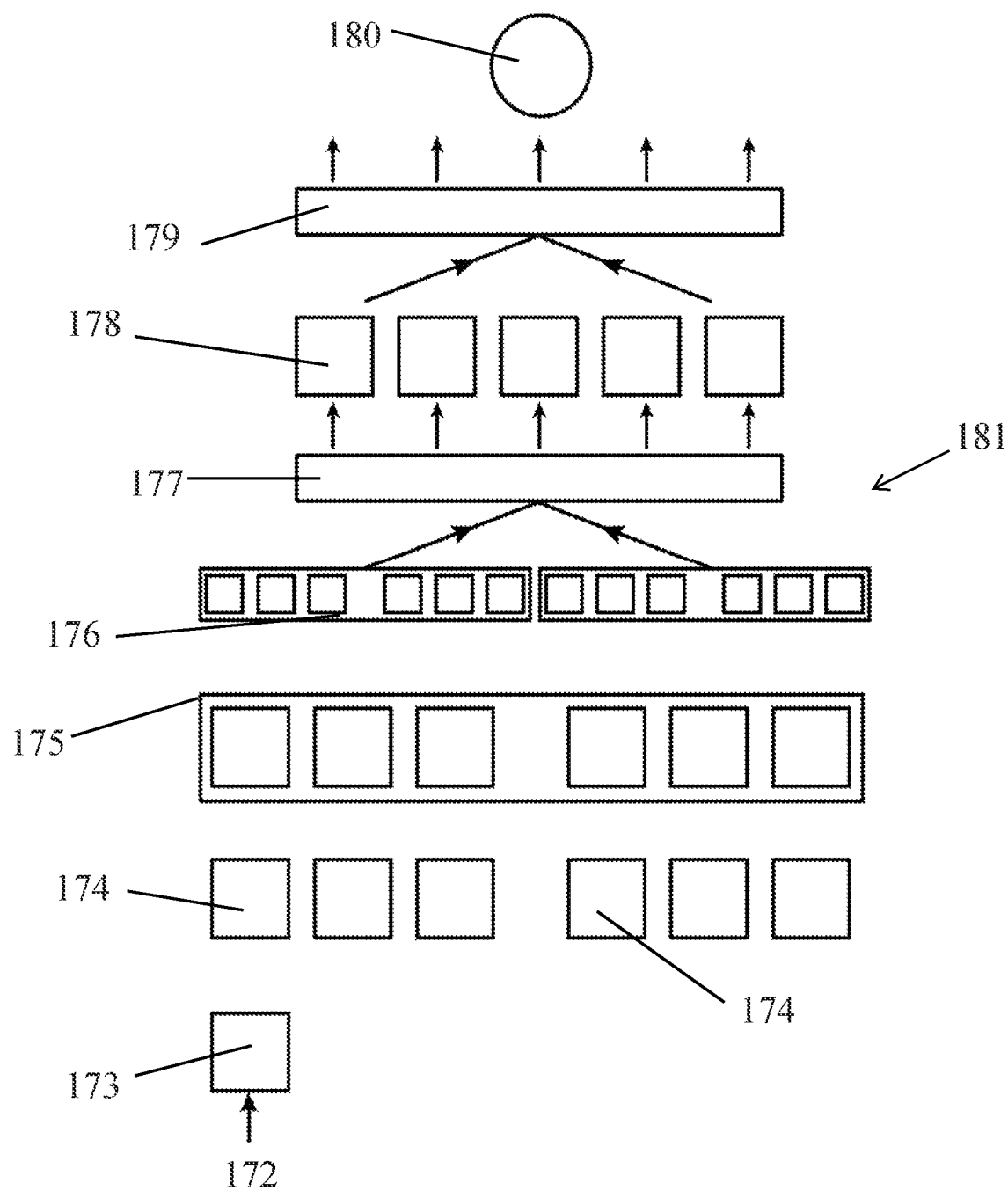
FIG. 19 shows a representative conceptual example of a dynamic smart contract in accordance with various embodiments of the present invention.

As may be understood from FIG. 19, a dynamic smart contract (180) may be developed using a contract logic (181) which may include contract constructs (172) perhaps created using protocol buffers or similar remote procedure call (RPC) systems or the like; individual predefined contract constructs (173); groups of predefined contract constructs (174); individual libraries of predefined contract constructs (175); library groups of predefined contract constructs (176); a code generator (177); a plurality of programming language libraries (178); and perhaps even a software development kit or integrated development environment (179); or the like. A dynamic smart contact may be created using contract constructs, a code generator, programming language library; software development kit and may even allow a user to selected contract constructs from libraries of predefined contract constructs.

A dynamic smart contract procedure may use each of the technologies as a combined procedure in order to process immutable transactions or interactions that contain contract logic. A contract logic may be based on real world contractual processes and constructs that can typically form a contract. A contract logic may be created by using various predefined constructs that can be applied to the construction of the contract. The predefined constructs can include a variety of prebuilt libraries of contractual processes, languages, and other resources that could be required in order to construct any type of contract. The predefined constructs could be assembled in various programmatic languages and forms for compatibility and mobility. The predefined constructs could allow for modifications to provide customized constructs for specific or specialized construct libraries. Predefined constructs could be created using protocol buffers and similar remote procedure call (RPC) systems perhaps to form serialized data structures that can be used to generate source code in various programming languages using semantic-based compilation and/or code generators. These predefined constructs could be able to perform inter-machine communication using binary wire format perhaps when deployed upon the network after being compiled.

Individual predefined constructs could be assembled into specific groups perhaps to create libraries that can then be used for development and even creation of dynamic smart contracts. These libraries could be part of a software development kit (SDK), integrated development environment (IDE), a software development environment, or could be compiled into specific programming language libraries for use in SDK's, IDE's, or perhaps even software development environments. Applications developed using SDK's, IDE's, or even software development environments, that may utilize the dynamic smart contract constructs could allow for user interface features to create contracts, deploy the contracts to a distributed ledger technology network, edit or modify deployed contracts prior to execution, administer contract ecosystems and networks, audit and test contracts prior to deployment, and even delete or destroy contracts prior to execution, or the like. Applications developed using SDK's, IDE's, or software development environments, that can utilize the dynamic smart contract constructs could allow for user interface features to also develop specialized or even custom functionality that may be predefined as a plugin or similar for the development environment. These plugins or similar for the development environment could allow for interfaces to other distributed ledger technologies, interfaces for other software and applications, and other features as developed for use within the application, or the like. These applications perhaps with user interface features could allow for users to create contracts without any knowledge of any programming languages perhaps since the predefined constructs and associated libraries could be grouped in learned sequence combinations perhaps by the underlying dynamic smart contract constructs.

These learned sequence combinations could be formed using artificial neural network deep learning techniques and technology or the like. The techniques could include deep structured learning perhaps based on the predefined dynamic smart contract constructs themselves combined with hierarchical learning based on all possible combinations of the predefined dynamic smart contract constructs. The two combined techniques could be used in a combined machine learning model. The model could be used for the creation of predefined constructs themselves for use in contract building, modeling, auditing, testing, and other functions as they relate to creating the constructs. The model could be used via the software development environment, SDK's, or IDE's, that are used for the development of dynamic smart contract software applications in order to model, audit, test, generate, compile, or provide other functionality as it relates to the application development. The model could be used by end users for generating dynamic smart contracts via the applications user interface within an application for predictive building, suggestion on format, pre-built contracts or templates, error correction, and other features that include automation, security, auditing, administration, deployments, alerts, interfaces for other distributed ledger technologies, interfaces for other software and applications, and other features as developed for use within applications, or the like.

A creation of a dynamic smart contract that has been generated and even deployed to a distributed ledger technology network could be initially pending approval for acceptance by all parties that may be programmed into the contract, such as users, entities, machines, artificial neural networks, or the like, and in any combination. Each party could be authorized perhaps using distributed ledger technology systems for identification and credentials on that network to which the contract may have been deployed. The deployment of the contract could notify each party using the distributed ledger technology network functionality via an application user interface. Each party could have features, including real time and collaborative, via an application user interface to edit or modify the contract with change tracking history, re-deploy after editing or modifying with party approval request, acceptance of edits or modifications, acceptance of contract and execution via distributed ledger technology identification credential signing, and other features as developed for use within applications to complete approval processing. After each and all parties involved may have accepted the contract, the distributed ledger technology may then execute the contract on the network. The contract may now await fulfillment perhaps via all programmed requirements. The programmed requirements may be a combination of various contract constructs that have been implemented within the contract during creation, deployment, and execution. Contract fulfillment may occurs when all contract constructs have been verified and/or authenticated as having met all criteria of each construct. Construct verification and/or authentication could include being processed as an individual transaction or interaction, as a group of transactions or interactions, or any combination of construct processing to authenticate and verify the transaction(s) or interaction(s) in accordance with how the dynamic smart contract has been created, deployed, and executed. This may provide that contract constructs could also be other dynamic smart contracts that may have been created, deployed, executed, and fulfilled on a DLT network or other accessible DLT networks. Constructs could also include other criteria after the execution that could allow for halting fulfillment based on security, safety, or any construct that may be used for contract creation, deployment, execution, and fulfillment. Dynamic smart contracts could allow for contracts to be changed in status from execution back to deployment and from deployment back to creation, so long as the contract constructs allow for this after execution and/or deployment.

Embodiments of the present invention may provide third party distributed ledgers. Any existing or future third party distributed ledger technologies (DLT's), that do not utilize a public or private DLT's, can also be accessed and interacted, possibly by using the Interstellar protocol that is part of the Verse Fabric. These third party DLT's may be mapped and exist within the RevoVerse and can still benefit from a programmatic level utilizing the core technologies of the RevoVerse. However, since these may be third party DLT's, constraints that exist on or within those systems may still be applicable, such as transaction rates, fees, and other various constraints.

Embodiments of the present invention may provide Rewards. For example, rewards may be to Singularities and Swarmers. Since an A.I. may work directly with the A.I. Dynamic Intelligent Routing System, the A.I. Spatial Universe Mapping System, and the Identification A.I. System, it may know which Singularities to reward Revos, perhaps based on if they participated in a Swarm Synchronization process. Participating as a Swarmer may be an opt-in and opt-out choice that Singularities can choose through an App user interface. Opt-in may automatically reward a singularity directly within an App, which may contain a cryptocurrency wallet that may support a multitude of crypto and tethered fiat currencies. The Singularity may be rewarded in Revos.

An A.I. may intelligently reward swarmers for participating in a Swarm Synchronization process. The reward may be based on a multitude of inputs that may be learned about that Swarmer over time, and how it may apply to its own artificial resource environment. For example, a Swarmer who has consistently verified pieces of hashes over a long period of time may be rewarded differently than a new Swarmer.

Another example of Rewards may include Rewards to Singularities perhaps as contributors. Singularities may be rewarded based on other contributions such as data sharing, publishing, data storage, as but non-limiting examples, and various other contributions that may add to the RevoVerse. Singularities that may contribute as developers and create programs, applications, DLT connections and interfaces, and various other types of development work that may add to the RevoVerse may be rewarded with Revos, which can be exchanged for other currencies. Singularities may have complete control and even anonymity to their own contributions. Only singularities may be able to choose what they contribute and to whom. However, core data that may be vital for the RevoVerse to function, including for example, core A.I. systems, may collect data as needed, but may always be anonymous or pseudo-anonymous, perhaps depending on the DLT transactions and interactions. Any data collected may not be accessible by other systems within the RevoVerse or A.I. systems perhaps unless the Singularity chooses to share this anonymous data for rewards or possibly for no rewards.

Embodiments of the present invention may provide transactional and interaction rates. The entire RevoVerse may operate on a neural network protocol that may rely on synchronization of all singularities within it. Thus, transactional and even interaction rates may be only limited to the physical connection (e.g., bandwidth of connection) to the Verse Fabric, the individual device communication hardware/firmware processing, the individual device processing capabilities, and any limitations of third party systems, as but non-limiting examples, or the like.

Since the following conditions may be integrated into the RevoVerse: singularities may be intelligently synchronized at the communication layers; consensus may be reached through a swarm synchronization process; rewards may be generated via an A.I. system; and perhaps even low level requirements, possibly upon individual devices, it may be inferred that transactional/interaction rates may directly correlate to only the stated limitations and, because of the conditions above, rates may be exponentially more efficient in both speed and cost than perhaps any other existing client-server systems and/or current DLT's at the time of this writing. Exponential efficiency can be stated since the entire RevoVerse may provide next to no limitations in ability on its own, and all technologies that may interface within it may be exponentially themselves becoming more efficient.

Embodiments of the present invention may solve power consumption. Revos may be a fundamental paradigm shift in how the cryptocurrency functions as an asset class and distributed ledger technology. Revos may provide a solution to all existing power consumption issues of current DLT's, including but not limited to blockchains that may require intensive processing power to "mine" the blockchain.

Embodiments of the present invention may provide mining pools and their control may be deprecated. Revos may remove a need for mining pools to be matched to the difficulty of the blockchain and may rely instead on a more efficient and scalable technology.

An influence of mining pools being able to control and possess a majority of a single asset class may be an unintended consequence of current blockchains and DLT's. It may represent a conundrum that may be the exact opposite of the intention of DLT's and blockchain technology to be decentralized and equal for all participants. Revos may remove this issue, perhaps by using a fundamentally more efficient system that may deprecate mining pools and any potential possibility of inequality.

Embodiments of the present invention may provide less fees. Revos core technology may allow it to be more efficient, and thus can be reflected in the overall cost for various types of fees. Typical fees of existing DLT's, which may include various blockchains, may vary greatly and some may even become increasingly more expensive overtime. Revos may provide the opposite of this existing model. It may be low cost from the start and may be exponentially become less expensive over time.

Embodiments of the present invention may provide an application and user interface. For most users (which may be known as singularities) of the RevoVerse, an application may be a primary entry point and may provide most, if not all, user interfaces that may be needed for general use. This application may provide all the integrated system stacks, to possibly allow easy initial identification and even personalization. Additionally, it may have core features and functionality, possibly to allow for ease of use perhaps when navigating, contributing, transacting, and even interacting in the RevoVerse. The following is a non-limiting list of core features that may be integrated: (1) connection such as RevoPN (Revo Private Network) Integration or A.I. Dynamic Intelligent Routing System; (2) RevoVerse user interface which may allow for viewing, searching, and interacting with a 3-dimensional user interface and may include VR capabilities; (3) A.I. interfaces which may include an identification A.I. system, an A.I. spatial universe mapping system, or even an A.I. system; (4) financial which may include a cryptocurrency wallet which may support for various currencies, Xchange perhaps for direct crypto and even fiat tethered exchanges, multi-one payment interface, direct fiat currency account linking, and even an accounting features set; (5) a direct RevoVerse platforms interface; (6) subset features for machine learning, edge computing, and even A.I. data collection; (7) data vault with device synchronization which may allow users to have complete control of all their data and even the ability to view rewards for various contributions; (8) data storage sharing and allocation which may allow users to allocate and even control how much core data may be stored on individual devices and may provide back up functionality across various devices and personal storage, and may allow user to opt-in/opt-out for rewards to share unused data storage space on individual devices and/or across various devices with unused hard drive space; (9) Revo-Fi interface which may control with a user interface perhaps for all Revo-Fi features and functionality; and perhaps even (10) a user can also allow access to other users for unused bandwidth and be paid in exchange for this usage; or the like.

Embodiments of the present invention may also include a network. A RevoVerse may include three initial decentralized platforms for users to possibly begin interfacing with. These can be created, developed, and implemented as an initial network within a RevoVerse. The three platforms may represent three diverse but interconnected industries that may include as non-limiting examples: commerce, logistics, and financial. Additional platforms may be developed within the network and may become interconnected systems within the RevoVerse. Although the first two of the three platforms may be independent, they may also be integrated with numerous decentralized features and may provide interoperability as well as governance. These platforms and their features may allow for additional third-party development and integration, which may allow for further demonstrating the RevoVerse infrastructure.

Two of the three platforms may represent live and active businesses that may be the first to allow for real world use-cases of traditional systems converting and integrating into the RevoVerse. This conversion may allow users, developers, and many others to visually see the process as it happens and perhaps to understand the significant advantages the RevoVerse provides. These two platforms may be focused within the commerce and logistics vertical market spaces and have significant integration and interoperability.

The third platform may be built entirely within the RevoVerse and may serve as a use case for a business that can be built within the RevoVerse. This platform may be focused entirely on financial and accounting vertical market spaces for the RevoVerse. It may provide the first two platforms with for example: payment systems, transaction processing, accounting, currency exchange systems, and various other features to serve as a globally decentralized banking system. This third platform may provide these services to additional users, businesses, developers, and the like within the RevoVerse.

A network may offer distinct advantages for users and developers. It may provide an easy and simple way to leverage from additional developed decentralized technology within the RevoVerse, such as, for example, Multi-One Payments, Dynamic Smart Contracts, Real World Value A.I. Engine, and A.T.L.A.S. (Advanced Transportation & Logistics Analysis System), and the like. This may allow for rapid development for decentralized applications, websites, databases, artificial intelligence engines, and various other technologies, as but a few non-limiting examples, that want to leverage development from a network.

Embodiments of the present invention may provide a grow platform Grow may be a social marketplace for local food, where people and businesses can directly buy and sell food and related goods, possibly without the need for middlemen in the supply chain. Localized food production may be inherently decentralized, and grow may be the technology to support the local food industry. From small scale organic farms to large commercial food businesses, a grow platform may offer enterprise level solutions for current and future exchanges of goods. Grow may be the first live and functioning platform built with traditional systems to convert and integrate into the RevoVerse. Grow may leverage various technologies and may be developed perhaps by using both the public and even private distributed ledger technologies.

Embodiments of the present invention may also include food traceability and sourcing. Grow may provide transparency and traceability to users who may make purchases from producers on the platform. By possibly using IOT connected devices that are integrated into the RevoVerse, grow may be a decentralized local food marketplace that may allow users the ability to know where their food is sourced from before they buy it and may validate it all the way to delivery. Multiple data sets may be captured including but not limited to: geographic location, date and time, temperature, soil composition, and more.

Embodiments of the present invention may provide an engine. A decentralized artificial intelligence engine may offer intelligence for local food producers perhaps to give insight into products that may be selling within marketplaces across the world. It may allow the producer to set prices dynamically based on real world values of their products. For example, a farmer growing carrots in Colorado can utilize data from the A.I. engine to set prices perhaps based on current supply and demand from commodity prices in the Eastern US. The engine may compare products in various geographic regions and may offer the buyer dynamic pricing perhaps based on thresholds set by the producer for their products. This may allow producers selling on the grow platform a powerful insight to assist in their competitive edge in the industrialized and distributor-controlled food industry.

A real world value A.I. engine may be integrated within the RevoVerse and may provide interoperability with Dynamic Smart Contracts, Multi-One Payment System, and may direct interfacing with other A.I. engines using the RevoKind A.I. Autonomous Interface.

Embodiments of the present invention may provide RevoGo. RevoGo may be a decentralized logistics platform with a focus on local and even last-mile delivery systems, multi-modal logistics, freight brokerage, freight management, warehousing, and even specialty freight/delivery services, or the like. RevoGo can interface with traditional systems such e-commerce platforms and EDI (electronic data interchange) systems, or the like. RevoGo may be the second platform to convert and even integrate into the RevoVerse and implement various RevoKind technologies. RevoGo cab leverage the capabilities of the RevoKind Dynamic Smart Contracts and the Multi-One Payment System. RevoGo may be developed using both the Revos Public and Private Distributed Ledger Technologies.

Embodiments of the present invention may provide an advanced transportation and logistics analysis system (A.T.L.A.S.). A.T.L.A.S. may be a decentralized artificially intelligent logistics engine that may provide insight for optimal routes, reduction of partial loads, advanced notifications of road and transport delays and closures, fuel optimization, autonomous controls and interactions for integrated systems, and perhaps advanced analysis of transportation systems on a global scale, or the like.

A.T.L.A.S. may feature decentralized machine learning and IOT connected intelligence perhaps for shipment temperature-controlled verification, source traceability, bills of lading to reduce denial of entry, and even various data to increase efficiency of global logistics systems, or the like. It may be integrated within the RevoVerse and may provide interoperability with Dynamic Smart Contracts, Multi-One Payment System, and even direct interfacing with other A.I. engines perhaps using the RevoKind A.I. Autonomous Interface.

Embodiments of the present invention may provide a multi-one payment system (171). A multi-one payment system may provide decentralized platforms the ability to accept multiple currency types per transaction. Additionally, it may allow for various transaction types, such as chained payment transactions, split payment transactions, custom payment transactions, and any combination of these types, or the like. A multi-one payment system may be integrated directly with a dynamic smart contracts technology perhaps for additional functionality when transactions may be tied to business logic. It may also be integrated with an Xchange platform perhaps to provide the full benefits of that platform.

Figure 18:
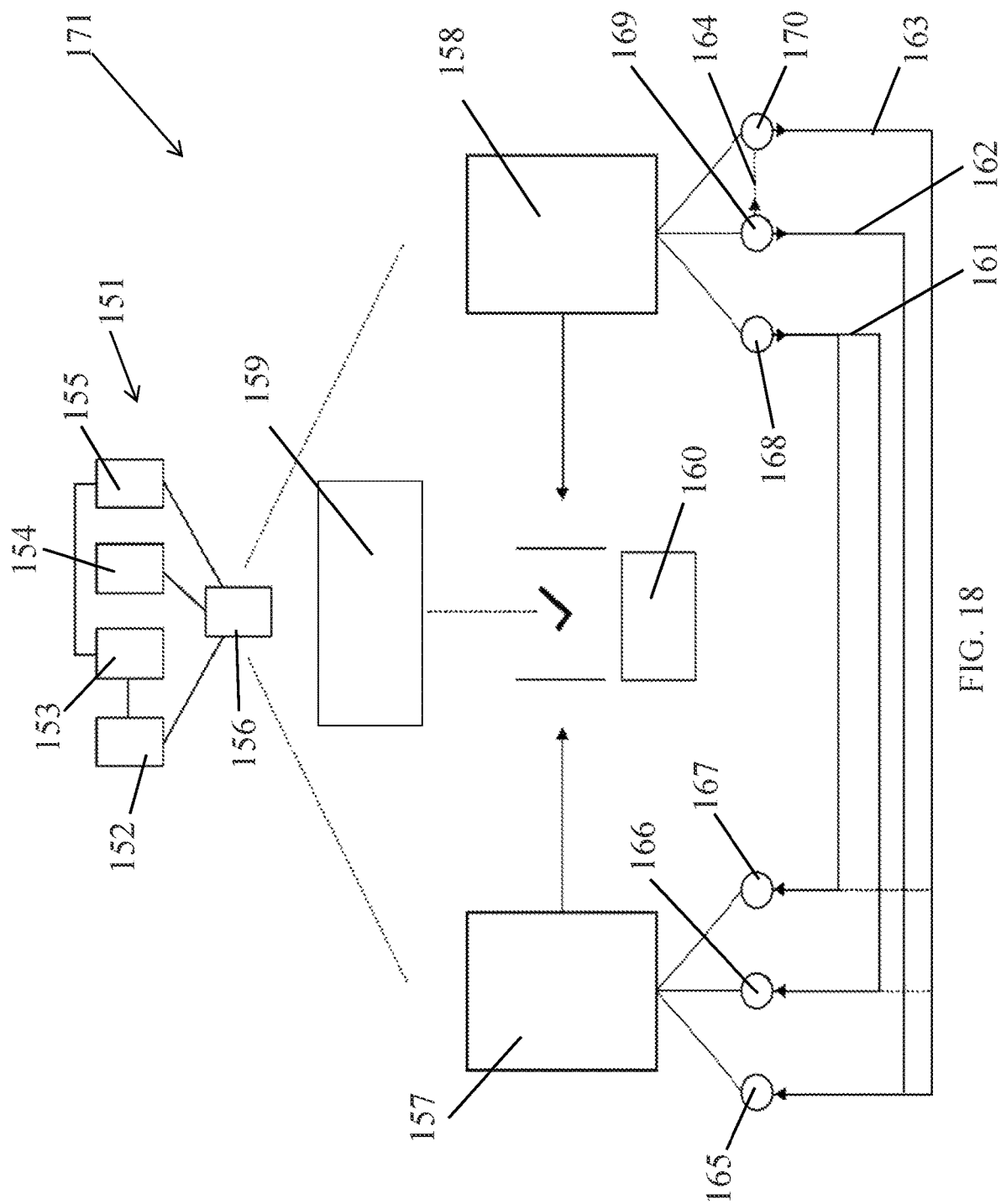
FIG. 18 shows a representative conceptual example of a neural network in accordance with various embodiments of the present invention.

FIG. 18 provides a non-limiting example of a multi-one payment system (171). A multi-one payment system may be a universal currency multiplex payment environment. Dynamic smart contracts (151) may be utilized in a multi-one payment system. There may be different dynamic smart contracts, such as dynamic smart contract V (152), dynamic smart contract W (153), dynamic smart contract Y (154), dynamic smart contract Z (155), and perhaps even dynamic smart contract X (156). A plugin may allow for an unlimited number of multiplex transaction constructs within a dynamic smart contract, such as shown in X (156) or even a group of dynamic smart contracts such as V (152), W (153), Y (154), and Z (155) where multiplex payments may be based on the contract constructs and logic for execution and fulfillment. Different kinds of payments may be made such as but not limited to split payments, single payments, chained payments, or the like. A dynamic smart contract X may have at least two parties (157) and (158). As non-limiting examples, a split payment (161) may include where user D (168) pays users B (166) and C (167) perhaps within the terms of smart contract X (156) with a split payment. A single payment (162) may allow user E (169) to pay user A (165) in a single payment perhaps within the terms of smart contract X (156). A split payment (163) may allow a user F (170) to pay users A (165), B (166), and C (167) perhaps within the terms of smart contract X in a split payment. A chained payment (164) may allow user E (169) to pay users A (165), B (166), and C (167) through user F (170) perhaps within the terms of smart contract X in a chained payment.

By utilizing RevoCol, RevoPN, RNNSP, and perhaps even Named Data Networking (NDN) to create a distributed ledger technology network (160), and using Swarm Synchronization Protocol (159) such as DLT consensus swarm synchronization, for the consensus processing of immutable transaction or interactions of Dynamic Smart Contracts, a universal currency multiplex payment process apparatus for distributed ledger technology can be formed using predefined construct libraries of serialized structured data using protocol buffers and similar remote procedure call (RPC) systems. By creating this system for a universal currency multiplex payment process, the compiled and generated apparatus can be constructed for various types of distributed ledger technologies to include interoperability interfaces with existing technologies.

This procedure may use each of the technologies as a combined procedure in order to process immutable transactions that may be agnostic of the currency and may have a multiplex functionality. The transactions may based on the contract logic of dynamic smart contracts that may have real world contractual processes and constructs that typically form a contract with the constructs being specifically related to transactional logic and processes. The transaction contract logic may be created by using various predefined constructs that can be applied to the construction of the transaction contract. The predefined constructs can include a variety of prebuilt libraries of transaction based contractual processes, languages, and other resources that could be required in order to construct any type of transaction contract. The predefined constructs could be assembled in various programmatic languages and forms for compatibility and mobility. The predefined constructs could allow for modifications to provide customized constructs for specific or specialized construct libraries. Predefined constructs could be created using protocol buffers and similar remote procedure call (RPC) systems to form serialized data structures that can be used to generate source code in various programming languages using semantic-based compilation and/or code generators. These predefined constructs could be able to perform inter-machine communication using binary wire format when deployed upon the network after being compiled.

The individual predefined constructs could be assembled into specific groups to create libraries that can then be used for development and creation of a dynamic smart contract's plugin. The plugin could be used in a software development kit (SDK), integrated development environment (IDE), a software development environment, and could be compiled into specific programming language libraries for use in SDK's, IDE's, or software development environments, or the like. Applications developed using SDK's, IDE's, or software development environments, that may utilize the plugin could allow for user interface features to create transactional constructs for use in dynamic smart contracts. This plugin could allow for multiplex transaction constructs such as chained payments, split payments, custom payments, or any payment type construct combination while transacting with any type of currency and/or multiple currencies within a single transaction. The plugin could allow for an unlimited number of multiplex transaction constructs within a dynamic smart contract or a group of dynamic smart contracts where the multiplex payments may be based on the contract constructs and logic for execution and fulfillment. This plugin could allow for interfaces to other distributed ledger technologies, interfaces for other software and applications, and other features as developed for use within the application. These applications with user interface features could allow for users to create transactional contracts without any knowledge of any programming languages since the predefined constructs and associated libraries would be grouped in learned sequence combinations by the underlying dynamic smart contract constructs.

These learned sequence combinations could be formed using artificial neural network deep learning techniques and technology. The techniques could include deep structured learning based on the predefined dynamic smart contract transaction constructs themselves combined with hierarchical learning based on all possible combinations of the predefined dynamic smart contract transaction constructs. The two combined techniques could be used in a combined machine learning model. The model could be used for the creation of predefined transactional constructs themselves for use in contract building, modeling, auditing, testing, and other functions as they relate to creating the transaction constructs. The model could be used via the software development environment, SDK's, or IDE's, that may be used for the development of dynamic smart contract software applications in order to model, audit, test, generate, compile, or provide other functionality as it may relate to the application development. The model could be used by end users for generating dynamic smart contracts via the applications user interface within an application for predictive building, suggestion on format, pre-built transactional contracts or templates, error correction, and other features that include automation, security, auditing, administration, deployments, alerts, interfaces for other distributed ledger technologies, interfaces for other software and applications, and other features as developed for use within applications, or the like.

Embodiments of the present invention may provide a Xchange. Xchange may be a first multi-faceted currency exchange system perhaps built entirely on a decentralized distributed ledger technology (DLT). It can allow users in the RevoVerse to transact, exchange, transfer, and even receive currencies directly within the RevoVerse. Xchange may interface directly with a multi-one payment system which may allow for various currencies to be used in a single transaction for payments. Additionally, it may allow for micro transactions, exchanges, trades, sends, and even receives, or the like. Xchange may be integrated into dynamic smart contracts perhaps to allow for interoperability and even leveraging of that technology. Xchange may be developed using the public and even private distributed ledger technologies.

Embodiments of the present invention may include a decentralized artificially intelligent trading and exchange engine perhaps built for decentralized systems. It may provide the insight into global currency and even asset class markets in a singular place. One of the main difficulties to digital and fiat currencies in a decentralized system may be that the trading fees and even sending fees may be disparate from one exchange to another, and even the value of the currencies from one exchange platform to another can also vary greatly. This engine may allow insight into many exchanges around the world and may allow thresholds for more intelligent exchanges and trading. It may be integrated into an Xchange platform and may have direct interfacing with other A.I. engines perhaps using an A.I. Autonomous Interface.

Figure 20:
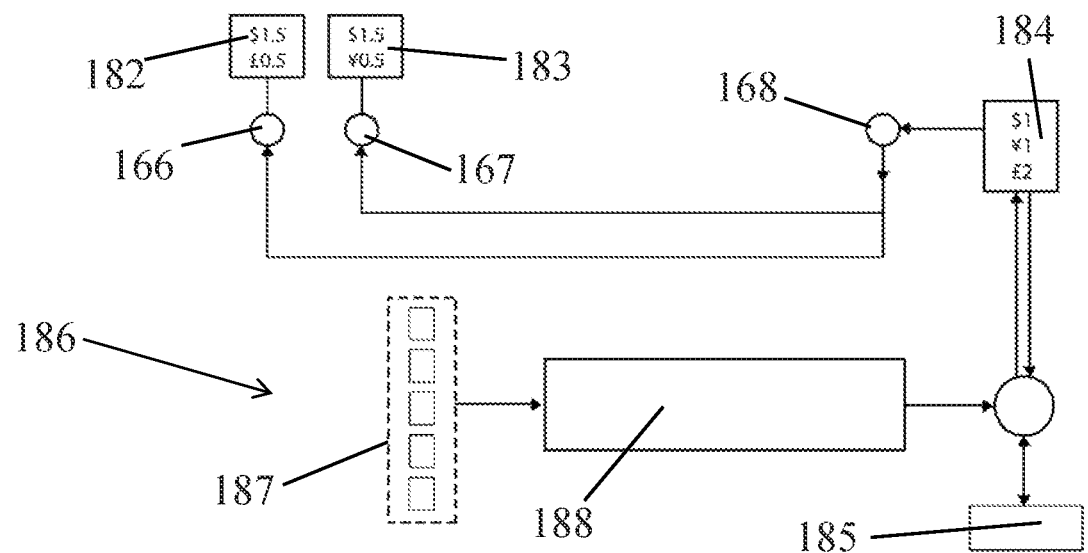
FIG. 20 shows a representative conceptual example of a universal currency multiplex exchange environment in accordance with various embodiments of the present invention.

FIG. 20 provides a non-limiting example of universal currency multiplex exchange environment such as an Xchange system. A set of users may be involved in a transaction, perhaps through a dynamic smart contract. User B (166) may have an account containing various currencies (182), user C (167) may have an account containing various currencies (183), and perhaps even user D (168) may have an account containing various currencies (184). An exchange (185) may occur between the users via a multiplex exchange process (186) which may allow a simple transaction between different currencies. This may include a currency exchange rates from various exchanges (187) and even an average calculation from all of the sampled exchanges for each specific currency to be exchanged (188).

By utilizing RevoCol, RevoPN, NNSP, and perhaps even Named Data Networking (NDN) to create a distributed ledger technology network, and using swarm synchronization protocol perhaps for the consensus processing of immutable transaction or interactions of dynamic smart contracts, a universal currency multiplex exchange process apparatus for distributed ledger technology can be formed perhaps using predefined construct libraries of serialized structured data using protocol buffers and even similar remote procedure call (RPC) systems. By creating a system for a universal currency multiplex exchange process, the compiled and generated apparatus can be constructed for various types of distributed ledger technologies to include interoperability interfaces with existing technologies.

This procedure may use each of the technologies perhaps as a combined procedure in order to process immutable exchanges that may be agnostic of the currency and has multiplex functionality. The exchanges may be based on the contract logic of dynamic smart contracts that have real world contractual processes and constructs that can typically form a contract with the constructs being specifically related to exchange logic and processes. The exchange contract logic may be created by using various predefined constructs that can be applied to the construction of the exchange contract. The predefined constructs can include a variety of prebuilt libraries of exchange based contractual processes, languages, and other resources that could be required in order to construct any type of exchange contract. The predefined constructs could be assembled in various programmatic languages and forms for compatibility and mobility. The predefined constructs could allow for modifications to provide customized constructs for specific or specialized construct libraries. Predefined constructs would be created using protocol buffers and similar remote procedure call (RPC) systems to form serialized data structures that can be used to generate source code in various programming languages using semantic-based compilation and/or code generators. These predefined constructs could be able to perform inter-machine communication using binary wire format when deployed upon the network after being compiled.

Individual predefined constructs could be assembled into specific groups to create libraries that can then be used for development and creation of a dynamic smart contract's plugin. A plugin could be used in a software development kit (SDK), integrated development environment (IDE), a software development environment, and could be compiled into specific programming language libraries for use in SDK's, IDE's, or software development environments, or the like. Applications developed using SDK's, IDE's, or software development environments, or the like that may utilize the plugin could allow for user interface features to create exchange constructs for use in dynamic smart contracts. This plugin could allow for multiplex exchange constructs such as chained exchanges, split exchanges, custom exchanges, or any exchange type construct combination while exchanging with any type of currency and/or multiple currencies within a single exchange. The plugin could allow for an unlimited number of multiplex exchange constructs within a dynamic smart contract or a group of dynamic smart contracts where the multiplex exchanges are based on the contract constructs and logic for execution and fulfillment. This plugin could allow for interfaces to other distributed ledger technologies, interfaces for other software and applications, and other features as developed for use within the application. These applications with user interface features could allow for users to create exchange contracts without any knowledge of any programming languages since the predefined constructs and associated libraries would be grouped in learned sequence combinations by the underlying dynamic smart contract constructs.

Learned sequence combinations could be formed using artificial neural network deep learning techniques and technology. The techniques could include deep structured learning based on the predefined dynamic smart contract exchange constructs themselves combined with hierarchical learning based on all possible combinations of the predefined dynamic smart contract exchange constructs. The two combined techniques could be used in a combined machine learning model. The model could be used for the creation of predefined exchange constructs themselves for use in contract building, modeling, auditing, testing, and other functions, or the like as they may relate to creating the exchange constructs. The model could be used via the software development environment, SDK's, or IDE's, that may be used for the development of dynamic smart contract software applications in order to model, audit, test, generate, compile, or provide other functionality as it may relate to the application development. The model could be used by end users for generating dynamic smart contracts perhaps via the applications user interface within an application for predictive building, suggestion on format, pre-built exchange contracts or templates, error correction, and other features that include automation, security, auditing, administration, deployments, alerts, interfaces for other distributed ledger technologies, interfaces for other software and applications, and other features as developed for use within applications, or the like.

Embodiments of the present invention may provide a universal multiplex interface apparatus perhaps for distributed ledger technologies. By utilizing RevoCol, PN, NNSP, and perhaps even Named Data Networking (NDN) to create a distributed ledger technology network, and perhaps by using Swarm Synchronization Protocol for the consensus processing of immutable transaction or interactions of dynamic smart contracts, a universal multiplex interface process apparatus for distributed ledger technology can be formed using predefined construct libraries of serialized structured data using protocol buffers and similar remote procedure call (RPC) systems. By creating this system for a universal multiplex interface process, a compiled and generated apparatus can be constructed for various types of distributed ledger technologies to include interoperability interfaces with existing technologies which may provide a predefined interface interaction construct (5) which may be understood as an interstellar.

This procedure may use each of the technologies perhaps as a combined procedure in order to process immutable interface interactions that may be agnostic of the distributed ledger technology and has multiplex functionality. The interface interactions may be based on the contract logic of dynamic smart contracts that may have real world contractual processes and constructs that typically form a contract with the constructs being specifically related to interface interaction logic and processes. The interface interaction contract logic may be created by using various predefined constructs that can be applied to the construction of the interface interaction contract. Predefined constructs can include a variety of prebuilt libraries of interface interaction based contractual processes, languages, and other resources that could be required in order to construct any type of interface interaction contract. Predefined constructs could be assembled in various programmatic languages and forms for compatibility and mobility. Predefined constructs could allow for modifications to provide customized constructs for specific or specialized construct libraries. Predefined constructs could be created using protocol buffers and similar remote procedure call (RPC) systems to form serialized data structures that can be used to generate source code in various programming languages using semantic-based compilation and/or code generators, or the like. Predefined constructs could be able to perform inter-machine communication using binary wire format when deployed upon the network after being compiled.

Individual predefined constructs could be assembled into specific groups to create libraries that can then be used for development and creation of a dynamic smart contract's plugin. The plugin could be used in a software development kit (SDK), integrated development environment (IDE), a software development environment, and could be compiled into specific programming language libraries for use in SDK's, IDE's, or software development environments. Applications developed using SDK's, IDE's, or software development environments, that utilize the plugin could allow for user interface features to create interface interaction constructs for use in dynamic smart contracts. This plugin could allow for multiplex interface interaction constructs such as chained interface interactions, split interface interactions, custom interface interactions, or any interface interaction type construct combination while interacting with any type of distributed ledger technology and/or multiple distributed ledger technologies within a single interface interaction. The plugin could allow for an unlimited number of multiplex interface interaction constructs within a dynamic smart contract or a group of dynamic smart contracts where the multiplex interface interactions are based on the contract constructs and logic for execution and fulfillment. This plugin could allow for interfaces to other distributed ledger technologies, interfaces for other software and applications, and other features as developed for use within the application. These applications with user interface features could allow for users to create interface interaction contracts without any knowledge of any programming languages since the predefined constructs and associated libraries would be grouped in learned sequence combinations by the underlying dynamic smart contract constructs.

These learned sequence combinations could be formed using artificial neural network deep learning techniques and technology. The techniques could include deep structured learning based on the predefined dynamic smart contract interface interaction constructs themselves combined with hierarchical learning based on all possible combinations of the predefined dynamic smart contract interface interaction constructs. The two combined techniques could be used in a combined machine learning model. The model could be used for the creation of predefined interface interaction constructs (5) themselves for use in contract building, modeling, auditing, testing, and other functions, or the like as they may relate to creating the interface interaction constructs. The model could be used via the software development environment, SDK's, or IDE's, that may be used for the development of dynamic smart contract software applications in order to model, audit, test, generate, compile, or provide other functionality as it relates to the application development, or the like. The model could be used by end users for generating dynamic smart contracts via the applications user interface within an application for predictive building, suggestion on format, pre-built interface interaction contracts or templates, error correction, and other features that include automation, security, auditing, administration, deployments, alerts, interfaces for other distributed ledger technologies, interfaces for other software and applications, and other features as developed for use within applications, or the like.

Embodiments of the present invention may provide a universal artificial neural network multiplex asset class apparatus perhaps with a real time artificial neural network asset virtual environment such as for distributed ledger technologies.

By utilizing RevoCol, PN, NNSP, and perhaps even Named Data Networking (NDN) to create a distributed ledger technology network, and perhaps using Swarm Synchronization Protocol (SSP) for the consensus processing of immutable transactions or interactions to include those of dynamic smart contracts, a universal artificial neural network multiplex asset class (UANNMAC) apparatus which may be understood as Revos (3) for distributed ledger technology (DLT) can be formed using predefined construct libraries of serialized structured data using protocol buffers and similar remote procedure call (RPC) systems. By creating this system for a UANNMAC apparatus, a compiled and generated apparatus can be constructed for various types of distributed ledger technologies to include interfaces with existing technologies. This procedure may use each of the technologies perhaps as a combined procedure in order to process immutable transactions and/or interactions occurring on a DLT network using the UANNMAC and its multiplex functionality. Transactions or interactions could be based on the contract logic of dynamic smart contracts that may have real world contractual processes and constructs that can typically form a contract with the constructs being specifically related to transactions or interactions logic and processes that include the UANNMAC in the construct. The UANNMAC transactions or interactions contract logic is created by using various predefined constructs that can be applied to the construction of the UANNMAC transactions or interactions contract. Predefined constructs can include a variety of prebuilt libraries of UANNMAC transactions or interactions based contractual processes, languages, and other resources that could be required in order to construct any type of UANNMAC transactions or interactions contract. Predefined constructs could be assembled in various programmatic languages and forms for compatibility and mobility. Predefined constructs could allow for modifications to provide customized constructs for specific or specialized construct libraries. Predefined constructs could be created using protocol buffers and similar remote procedure call (RPC) systems to form serialized data structures that can be used to generate source code in various programming languages using semantic-based compilation and/or code generators. Predefined constructs could be able to perform inter-machine communication using binary wire format when deployed upon the network after being compiled.

Individual predefined constructs could be assembled into specific groups to create libraries that can then be used for development and creation of a UANNMAC plugin that has integrated DSC features. The plugin could be used in a software development kit (SDK), integrated development environment (IDE), a software development environment, and could be compiled into specific programming language libraries for use in SDK's, IDE's, or software development environments, or the like. Applications developed using SDK's, IDE's, or software development environments, that can utilize the plugin could allow for user interface features to create UANNMAC transactions or interactions constructs for use on a DLT network and/or in dynamic smart contracts. This plugin could allow for UANNMAC constructs such as chained transactions and/or interactions, split transactions and/or interactions, custom transactions and/or interactions, or any transaction and/or interaction type construct combination while interacting and/or transacting with any type of distributed ledger technology and/or multiple distributed ledger technologies within a single transaction or interaction. The plugin could allow for an unlimited number of UANNMAC multiplex transaction and/or interaction constructs within a dynamic smart contract and/or a group of dynamic smart contracts where the multiplex transaction and/or interaction are based on the contract constructs and logic for execution and fulfillment. This plugin could allow for UANNMAC multiplex transaction and/or interaction interfaces to other distributed ledger technologies, interfaces for other software and applications, and other features as developed for use within the application. These applications with user interface features could allow for users to create UANNMAC multiplex interface transaction and/or interaction contracts without any knowledge of any programming languages since the predefined constructs and associated libraries would be grouped in learned sequence combinations by the underlying dynamic smart contract constructs.

These learned sequence combinations could be formed using artificial neural network deep learning techniques and technology. The techniques could include deep structured learning based on the predefined dynamic smart contract UANNMAC multiplex interface transaction and/or interaction constructs themselves combined with hierarchical learning based on all possible combinations of the predefined dynamic smart contract UANNMAC multiplex interface transaction and/or interaction constructs. The two combined techniques could be used in a combined machine learning model. The model could be used for the creation of predefined UANNMAC multiplex interface transaction and/or interaction constructs themselves for use in contract building, modeling, auditing, testing, and other functions as they relate to creating the UANNMAC multiplex interface transaction and/or interaction constructs, or the like. The model could be used via the software development environment, SDK's, or IDE's, that are used for the development of dynamic smart contract software applications in order to model, audit, test, generate, compile, or provide other functionality as it relates to the application development. The model could be used by end users for generating dynamic smart contracts via the applications user interface within an application for predictive building, suggestion on format, pre-built UANNMAC multiplex interface transaction and/or interaction contracts or templates, error correction, and other features that include automation, security, auditing, administration, deployments, alerts, interfaces for other distributed ledger technologies, interfaces for other software and applications, and other features as developed for use within applications, or the like.

A UANNMAC supply may be created by using artificial neural network deep learning techniques and technology. The techniques could include deep structured learning based on the properties of real-world natural resources, currencies, cryptocurrencies, and even assets perhaps combined with hierarchical learning based on all possible combinations of their associated markets, history, values, supply, and other characteristics that have influenced each. The two combined techniques could be used in a combined machine learning model. The model could be used for the creation of a real time artificial neural network asset virtual environment (RTANNAVE) that creates, administers, and controls the UANNMAC on the DLT network or networks to which is integrated and interfaced. All transactions and interactions of the UANNMAC could be interfaced with the RTANNAVE. A RTANNAVE could reside on the DLT network or networks to which may be integrated and interfaced for the operation and processes of the UANNMAC functionality. The RTANNAVE could be interfaced with using the same or similar constructs of the UANNMAC using protocol buffers and similar remote procedure call (RPC) systems to form serialized data structures that can be used to generate source code in various programming languages using semantic-based compilation and/or code generators. These constructs could be able to perform inter-machine communication using binary wire format when deployed upon the network after being compiled. These interfaces creating using this construct methodology could allow for interfaces for other distributed ledger technologies, interfaces for other software and applications, and other features as developed for use within applications.

Embodiments of the present invention may provide an artificial neural network multiplex identification system perhaps for distributed ledger technologies. By utilizing RevoCol, PN, NNSP, and perhaps even Named Data Networking (NDN) to create a distributed ledger technology network, and perhaps by using Swarm Synchronization Protocol (SSP) for the consensus processing of immutable transactions or interactions to include those of Dynamic Smart Contracts (DSC), an artificial neural network multiplex identification (ANNMI) system for distributed ledger technology (DLT) can be formed using predefined construct libraries of serialized structured data using protocol buffers and similar remote procedure call (RPC) systems. By creating this system for an ANNMI apparatus, compiled and generated apparatus can be constructed for various types of distributed ledger technologies to include interfaces with existing technologies.

This procedure may use each of the technologies as a combined procedure in order to create a virtual replication set of a user's unique biometrics, perhaps as a singularity, for identification authentication or credential interfacing used to process immutable transactions and/or interactions, and for various communication and data routing functionality occurring on a DLT network using an ANNMI and its multiplex functionality. Transactions or interactions could be based on the contract logic of dynamic smart contracts that have real world contractual processes and constructs that can typically form a contract with the constructs being specifically related to transactions or interactions logic and processes that include the ANNMI in the construct. ANNMI transactions or interactions contract logic may be created by using various predefined constructs that can be applied to the construction of the ANNMI transactions or interactions contract. Predefined constructs can include a variety of prebuilt libraries of ANNMI transactions or interactions based contractual processes, languages, and other resources that could be required in order to construct any type of ANNMI transactions or interactions contract. Predefined constructs could be assembled in various programmatic languages and forms for compatibility and mobility. Predefined constructs could allow for modifications to provide customized constructs for specific or specialized construct libraries. Predefined constructs could be created using protocol buffers and similar remote procedure call (RPC) systems to form serialized data structures that can be used to generate source code in various programming languages using semantic-based compilation and/or code generators. Predefined constructs could be able to perform inter-machine communication using binary wire format when deployed upon the network after being compiled.

Individual predefined constructs could be assembled into specific groups to create libraries that can then be used for development and creation of an ANNMI plugin that has integrated DSC features. The plugin could be used in a software development kit (SDK), integrated development environment (IDE), a software development environment, and could be compiled into specific programming language libraries for use in SDK's, IDE's, or software development environments, or the like. Applications developed using SDK's, IDE's, or software development environments, that can utilize the plugin could allow for user interface features to create ANNMI transactions or interactions constructs for use on a DLT network and/or in dynamic smart contracts. This plugin could allow for ANNMI constructs such as chained transactions and/or interactions, split transactions and/or interactions, custom transactions and/or interactions, or any transaction and/or interaction type construct combination while interacting and/or transacting with any type of distributed ledger technology and/or multiple distributed ledger technologies within a single transaction or interaction, or the like. The plugin could allow for an unlimited number of ANNMI multiplex transaction and/or interaction constructs within a dynamic smart contract and/or a group of dynamic smart contracts where the multiplex transaction and/or interaction may be based on the contract constructs and logic for execution and fulfillment. This plugin could allow for ANNMI multiplex transaction and/or interaction interfaces to other distributed ledger technologies, interfaces for other software and applications, and other features as developed for use within the application. These applications perhaps with user interface features could allow for users to create ANNMI multiplex interface transaction and/or interaction contracts without any knowledge of any programming languages since the predefined constructs and associated libraries would be grouped in learned sequence combinations by the underlying dynamic smart contract constructs.

These learned sequence combinations could be formed using artificial neural network deep learning techniques and technology. The techniques could include deep structured learning based on the predefined dynamic smart contract ANNMI multiplex interface transaction and/or interaction constructs themselves combined with hierarchical learning based on all possible combinations of the predefined dynamic smart contract ANNMI multiplex interface transaction and/or interaction constructs. The two combined techniques could be used in a combined machine learning model. The model could be used for the creation of predefined ANNMI multiplex interface transaction and/or interaction constructs themselves for use in contract building, modeling, auditing, testing, and other functions as they relate to creating the ANNMI multiplex interface transaction and/or interaction constructs. The model could be used via the software development environment, SDK's, or IDE's, that are used for the development of dynamic smart contract software applications in order to model, audit, test, generate, compile, or provide other functionality as it relates to the application development. The model could be used by end users for generating dynamic smart contracts via the applications user interface within an application for predictive building, suggestion on format, pre-built ANNMI multiplex interface transaction and/or interaction contracts or templates, error correction, and other features that include automation, security, auditing, administration, deployments, alerts, interfaces for other distributed ledger technologies, interfaces for other software and applications, and other features as developed for use within applications, or the like.

An ANNMI singularity, which may be (a virtual replication set of a user's unique biometrics can be created by using various human to machine interfaces and/or other various methodologies that can convert human biometrics into digital data files. These individual biometric data files could exist as individual files or in groups that form the virtual replication set of a user's unique biometrics for creating a singularity construct. The singularity construct could use cryptographic hash function technology in a process to compute a cryptographic hash of the construct. This cryptographic construct could then be stored in or exist within the ANNMI apparatus. The ANNMI could reside on the DLT network or networks to which it may be integrated and interfaced for the operation and processes of the singularity functionality. The ANNMI could contain an unlimited number of singularity constructs. The ANNMI could interface directly with the DLT network at the RNNSP layer for various communication and even data routing functionality that requires identification authentication or credentials. The ANNMI could be interfaced with using the same or similar constructs of the DLT using protocol buffers and similar remote procedure call (RPC) systems to form serialized data structures that can be used to generate source code in various programming languages using semantic-based compilation and/or code generators. These constructs could be able to perform inter-machine communication using binary wire format when deployed upon the network after being compiled. These interfaces created using this construct methodology could allow for interfaces for other distributed ledger technologies, interfaces for other software and applications, and other features as developed for use within applications, or the like.

Examples of clauses may include:

Clause 1. A method for efficient wireless communication comprising the steps of:
 providing a virtualization technology;
 providing a wireless network interface controller;
 providing a communication protocol application based on said virtualization technology and said wireless network interface controller;
 providing a plurality of devices, wherein said plurality of devices comprises at least some wireless end user devices;
 instituting said wireless network interface controller into said at least some of said plurality of devices;
 creating from said virtualization technology a plurality of virtual wireless network interface controllers;
 using at least one shared wireless network interface controller by said plurality of virtual wireless network interface controllers; and providing a plurality of wireless connections for said end user devices from said communication protocol application, said plurality of virtual wireless network interface controllers, and said at least one shared wireless network interface controller.

Clause 2. The method as described in clause 1 or any other clause wherein said plurality of devices is selected from a group consisting of cell phones, smartphones, televisions, smart televisions, cameras, speakers, laptops, printers, system on a chip interfaces, mobile computing devices, any combination thereof.

Clause 3. The method as described in clause 1 or any other clause wherein said at least one shared network controller comprises a communication protocol application installed in said device.

Clause 4. The method as described in claim 1 or any other clause wherein said virtual wireless network interface controllers comprises software based virtual wireless network interface controllers Clause 5. The method as described in clause 1 or any other clause wherein said step of creating said plurality of virtual wireless network interface controllers and using said at least one shared wireless network interface controller comprises a step of providing a wireless client, wireless access point, or both.

Clause 6. The method as described in clause 1 or any other clause and further comprising a step of connecting each of said plurality of virtual wireless network interface controllers independently to available wireless connections.

Clause 7. The method as described in clause 5 or any other clause wherein said available wireless connections are selected from a group consisting of wireless devices, WI-FI access points, hot spots, virtual network interface controller access points.

Clause 8. The method as described in clause 1 or any other clause and further comprising a step of connecting each of said plurality of virtual wireless network interface controllers to at least some of said plurality of devices.

Clause 9. The method as described in clause 8 or any other clause wherein said at least some of said plurality of devices are connected to a system selected from a group consisting of wireless network, ad-hoc mode connectivity, internet service provider, network service provider.

Clause 10. The method as described in clause 1 or any other clause and further comprising a step of using other physical network interface controllers to route data with said plurality of virtual wireless network interface controllers.

Clause 11. The method as described in clause 1 or any other clause and further comprising a step of using other physical network interface controllers for additional communications functionality with said plurality of virtual wireless network interface controllers.

Clause 12. The method as described in clause 11 or any other clause wherein said additional communications functionality comprises cellular connections for internet connectivity.

Clause 13. The method as described in clause 1 or any other clause and further comprising a step of providing an application which can utilize said virtual wireless network interface controllers.

Clause 14. The method as described in clause 13 or any other clause wherein said step of providing an application which can utilize said virtual wireless network interface controllers is selected from a step consisting of:
providing an application which can utilize said virtual wireless network interface controllers to control wireless devices;
providing an application which can utilize said virtual wireless network interface controllers to transfer data;
providing an application which can utilize said virtual wireless network interface controllers to share data;
providing an application which can utilize said virtual wireless network interface controllers to share bandwidth; and
providing an application which can utilize said virtual wireless network interface controllers to provide connectivity.

Clause 15. The method as described in clause 1 or any other clause and further comprising a step of providing an application utilizing said network communication protocol for auto load balancing of bandwidth throughput.

Clause 16. The method as described in clause 1 or any other clause and further comprising a step of providing named data networking.

Clause 17. The method as described in clause 1 or 16 or any other clause and further comprising a step of providing a distributed ledger technology Clause 18. The method as described in clause 17 or any other clause and further comprising a step of utilizing said plurality of virtual wireless network interface controllers to interface with said distributed ledger technology.

Clause 19. The method as described in clause 17 or any other clause and further comprising a step of integrating said distributed ledger technology with named data networking.

Clause 20. The method as described in clause 19 or any other clause and further comprising a step of providing secure and immutable transmissions.

Clause 21. The method as described in clause 20 or any other clause wherein said secure and immutable transmissions are selected from a group consisting of communication, identification, transactions, interactions, and data transfer.

Clause 22. An efficient wireless communication environment comprising:
virtualization technology;
a wireless network interface controller;
a communication protocol application based on said virtualization technology and said wireless network interface controller;
at least one shared wireless network interface controller;
a plurality of virtual wireless network interface controllers created by said virtualization technology which use said at least one shared wireless network interface controller;
a plurality of devices having at least some wireless end user devices, wherein said plurality of devices have said wireless network interface controller installed therein; and
a plurality of wireless connections available for said end user devices.

Clause 23. The environment as described in clause 22 or any other clause wherein said plurality of devices is selected from a group consisting of cell phones, smartphones, televisions, smart televisions, cameras, speakers, laptops, printers, system on a chip interfaces, mobile computing device, any combination thereof.

Clause 24. The environment as described in clause 22 or any other clause wherein said at least one shared network controller comprises a communication protocol application installed in said device.

Clause 25. The environment as described in clause 22 or any other clause wherein said virtual wireless network interface controllers comprises software based virtual wireless network interface controllers.

Clause 26. The environment as described in clause 22 or any other clause wherein said plurality of virtual wireless network interface controllers which use said at least one shared wireless network interface controller is selected from a group consisting of a wireless client, wireless access point, or both.

Clause 27. The environment as described in clause 22 or any other clause and further comprising an independent connection between each of said plurality of virtual wireless network interface controllers to available wireless connections.

Clause 28. The environment as described in clause 26 or any other clause wherein said available wireless connections is selected from a group consisting of wireless devices, WI-FI access points, hot spots, virtual network interface controller access points.

Clause 29. The environment as described in clause 22 or any other clause and further comprising a connection between each of said plurality of virtual wireless network interface controllers and at least some of said plurality of devices.

Clause 30. The environment as described in clause 29 or any other clause wherein said at least some of said plurality of devices are connected to a system selected from a group consisting of wireless network, ad-hoc mode connectivity, internet service provider, and network service provider.

Clause 31. The environment as described in clause 22 or any other clause and further comprising other physical network interface controllers.

Clause 32. The environment as described in clause 31 or any other clause wherein said other physical network interface controller are capable of routing data with said plurality of virtual wireless network interface controllers.

Clause 33. The environment as described in clause 22 or any other clause wherein said other physical network interface controllers are capable of providing additional communications functionality with said plurality of virtual wireless network interface controllers.

Clause 34. The environment as described in clause 33 or any other clause wherein said additional communications functionality comprises cellular connections for internet connectivity.

Clause 35. The environment as described in clause 22 or any other clause and further comprising an application which can utilize said virtual wireless network interface controllers.

Clause 36. The environment as described in clause 35 or any other clause wherein said application which can utilize said virtual wireless network interface controllers is selected from a group consisting of: controlling wireless devices: transfer data; share data; share bandwidth; and provide connectivity.

Clause 37. The environment as described in clause 11 or any other clause and further comprising an application utilizing said network communication protocol for auto load balancing of bandwidth throughput.

Clause 38. The environment as described in clause 11 or any other clause and further comprising named data networking.

Clause 39. The environment as described in clause 11 or 39 or any other clause and further comprising a distributed ledger technology integrated.

Clause 40. The environment as described in clause 39 or any other clause and further comprising an interface between said plurality of virtual wireless network interface controllers and said distributed ledger technology.

Clause 41. The environment as described in clause 39 or any other clause wherein said named data networking is integrated with said distributed ledger technology.

Clause 42. The environment as described in clause 41 or any other clause and further comprising secure and immutable communications.

Clause 43. The environment as described in clause 42 or any other clause wherein said secure and immutable transmissions are selected from a group consisting of communication, identification, transactions, interactions, and data transfer.

Clause 44. A method for creating an infrastructureless communication network comprising the steps of:
providing a first artificial neural network;
providing an input layer, a first hidden layer, a second hidden layer, and an output layer in said first artificial neural network;
inputting information to said input layer of said first artificial neural network;
time result data routing of said information in said first artificial neural network;
providing a second artificial neural network;
providing an input layer, a first hidden layer, a second hidden layer, and an output layer in said second artificial neural network;
inputting information to said input layer of said second artificial neural network;
spatial result data routing said information in said second artificial neural network;
inputting an output from each of said first artificial neural network and said second artificial neural network into a third artificial neural network;
providing an input layer, a first hidden layer, a second hidden layer, and an output layer in said third artificial neural network;
combined result data routing network topology optimization processing of said output from each of said first artificial neural network and said second artificial neural network;
outputting an output from said combined result data routing network topology optimization processing;
inputting said output to a network; and
creating an artificially intelligent communication protocol.

Clause 45. The method as described in clause 44 or any other clause wherein step of inputting input to said input layer of said first artificial neural network comprises a step of inputting input from data sends, input from a network, and input from data receives into said input later of said first artificial neural network.

Clause 46. The method as described in clause 44 or any other clause wherein said step of inputting input to said input layer of said second artificial neural network comprises a step of inputting input from spatial sends, input from a network, and input from spatial receives into said input later of said second artificial neural network.

Clause 47. The method as described in clause 44 or any other clause and further comprising a step of performing deep learning in said first and second artificial neural networks.

Clause 48. The method as described in clause 47 or any other clause wherein said step of step of performing deep learning in said first and second artificial neural networks comprises a step of step of performing continuous deep learning in said first and second artificial neural networks.

Clause 49. The method as described in clause 44 or any other clause wherein said step of inputting said output to a network comprises a step of inputting said output from said combined result data routing network topology optimization processing to transport layers of an open systems interconnection model.

Clause 50. The method as described in clause 44 or any other clause wherein said step of inputting said output to a network comprises a step of inputting said output from said combined result data routing network topology optimization processing to a named data networking.

Clause 51. The method as described in clause 44 or any other clause and further comprising a step of integrating said artificially intelligent communication protocol in a plurality of devices on said network.

Clause 52. The method as described in clause 51 or any other clause wherein said plurality of devices is selected from a group consisting of end devices, nodes, and resources.

Clause 53. The method as described in clause 51 or any other clause and further comprising a step of sharing said output from said combined result data routing network topology optimization processing between said plurality of devices.

Clause 54. The method as described in clause 53 or any other clause and further comprising a step of analyzing internal results from said devices based on said shared output by said first artificial neural network.

Clause 55. The method as described in clause 54 or any other clause and further comprising a step of optimizing said time result data routing of said information in said first artificial neural network based on said step of analyzing internal results at said end devices based on said shared output by said first artificial neural network.

Clause 56. The method as described in clause 51 or any other clause wherein said step of spatial result data routing said information in said second artificial neural network comprises a step of spatially referencing said plurality of devices.

Clause 57. The method as described in clause 51 or any other clause and further comprising a step of optimizing said spatial result data routing said information in said second artificial neural network based on spatial results from said devices.

Clause 58. The method as described in clause 51 or any other clause wherein said step of combined result data routing network topology optimization processing of said output from each of said first artificial neural network and said second artificial neural network comprises a step of optimizing total data routing based on time and spatial results from said devices.

Clause 59. An infrastructureless communication network comprising:
a first artificial neural network;
an input layer, a first hidden layer, a second hidden layer, and an output layer in said first artificial neural network;
input information for said input layer of said first artificial neural network;
a time result data routing system for said information in said first artificial neural network;
a second artificial neural network;
an input layer, a first hidden layer, a second hidden layer, and an output layer in said second artificial neural network;
input information for said input layer of said second artificial neural network;
a spatial result data routing system said information in said second artificial neural network;
an input for an output from each of said first artificial neural network and said second artificial neural network into a third artificial neural network;
an input layer, a first hidden layer, a second hidden layer, and an output layer in said third artificial neural network;
a combined result data routing network topology optimization system for said output from each of said first artificial neural network and said second artificial neural network;
an output from said combined result data routing network topology optimization system;
a network input for said output from said combined result data routing network topology optimization system to a network; and
an artificially intelligent communication protocol.

Clause 60. The network as described in clause 59 or any other clause wherein said input information for said input layer of said first artificial neural network is selected from a group consisting of input from data sends, input from a network, and input from data receives.

Clause 61. The network as described in clause 59 or any other clause wherein said input information for said input layer of said second artificial neural network is selected from a group consisting of input from spatial sends, input from a network, and input from spatial receives.

Clause 62. The network as described in clause 59 or any other clause and further comprising a deep learning system in said first and second artificial neural networks.

Clause 63. The network as described in clause 62 or any other clause wherein said deep learning system comprises a continuous deep learning system.

Clause 64. The network as described in clause 59 or any other clause wherein said network input for said output from said combined result data routing network topology optimization system to said network comprises said network input for said output from said combined result data routing network topology optimization system to transport layers of an open systems interconnection model.

Clause 65. The network as described in clause 59 or any other clause wherein said network input for said output from said combined result data routing network topology optimization system to said network comprises wherein said network input for said output from said combined result data routing network topology optimization system to a named data networking.

Clause 66. The network as described in clause 59 or any other clause wherein said artificially intelligent communication protocol is integrated into a plurality of devices on said network.

Clause 67. The network as described in clause 66 or any other clause wherein said plurality of devices is selected from a group consisting of end devices, nodes, and resources.

Clause 68. The network as described in clause 66 or any other clause wherein said plurality of devices receive said output from said combined result data routing network topology optimization system.

Clause 69. The network as described in clause 68 or any other clause wherein said first artificial neural network is capable of analyzing internal results from said devices which have received said output from said combined result data routing network topology optimization system.

Clause 70. The network as described in clause 69 or any other clause wherein said first artificial neural network is capable of optimizing said time result data routing system based on analyzed internal results from said devices.

Clause 71. The network as described in clause 66 or any other clause wherein said second artificial neural network is capable spatially referencing said plurality of devices.

Clause 72. The network as described in clause 66 or any other clause wherein said second artificial neural network is capable of optimizing said spatial result data routing system based on spatial results from said devices.

Clause 73. The network as described in clause 66 or any other clause wherein said third artificial neural network is capable of optimizing said combined result data routing network topology optimization system based on time and spatial results from said devices.

Clause 74. A method for providing a decentralized private network comprising the steps of:
providing an authorized device;
providing a distributed ledger technology;
providing named data networking;
providing a private network;
creating a plurality of authorized connections for said authorized device utilizing said distributed ledger technology, named data networking in said private network; and
securely communicating between said authorized device and at least one other network connected option.

Clause 75. The method as described in clause 74 or any other clause wherein said authorized device is selected from a group consisting of cell phones, smartphones, televisions, smart televisions, cameras, speakers, laptops, printers, system on a chip interfaces, mobile computing devices, and any combination thereof.

Clause 76. The method as described in clause 74 or any other clause and further comprising a step of validating said authorized device with said distributed ledger technology.

Clause 77. The method as described in clause 76 or any other clause wherein said step of validating said authorized device with said distributed ledger technology comprises a step of validating with a system selected from a group consisting of biometrics, fingerprints, palm veins, face recognition, DNA, palm print, hand geometry, iris recognition, retina, and any combination thereof.

Clause 78. The method as described in clause 74 or any other clause and further comprising a step of interpolating encrypted credentials of said authorized device into said named data networking.

Clause 79. The method as described in clause 74 or any other clause and further comprising a step of encrypting said authorized connections.

Clause 80. The method as described in clause 74 or any other clause wherein said at least one other network connected option is selected from a group consisting of applications, devices, nodes, and resources.

Clause 81. The method as described in clause 74 or any other clause and further comprising a step of providing access credentials to said authorized device with said distributed ledger technology.

Clause 82. The method as described in clause 74 or any other clause and further comprising a step of integrating said distributed ledger technology with said named data networking.

Clause 83. The method as described in clause 74 or any other clause wherein said step of creating a plurality of authorized connections for said authorized device comprises a step of creating a plurality of secured connections simultaneously for said authorized device.

Clause 84. The method as described in clause 74 or any other clause wherein said authorized connection comprises an encrypted communication channel.

Clause 85. A decentralized private network comprising:
an authorized device;
a distributed ledger technology;
named data networking;
a private network;
a plurality of authorized connections for said authorized device utilizing said distributed ledger technology, named data networking in said private network; and
secure communications between said authorized device and at least one other network connected option.

Clause 86. The network as described in clause 85 or any other clause wherein said authorized device is selected from a group consisting of cell phones, smartphones, televisions, smart televisions, cameras, speakers, laptops, printers, system on a chip interfaces, mobile computing devices, and any combination thereof.

Clause 87. The network as described in clause 85 or any other clause wherein said distributed ledger technology is capable of validating said authorized device.

Clause 88. The network as described in clause 87 or any other clause wherein said distributed ledger technology is capable of validating said authorized device with a system selected from a group consisting of biometrics, fingerprints, palm veins, face recognition, DNA, palm print, hand geometry, iris recognition, retina, and any combination thereof.

Clause 89. The network as described in clause 85 or any other clause wherein said named data networking is capable of accepting encrypted credentials of said authorized device.

Clause 90. The network as described in clause 85 or any other clause wherein said authorized connections comprises encrypted connections.

Clause 91. The network as described in clause 85 or any other clause wherein said at least one other network connected option is selected from a group consisting of applications, devices, nodes, and resources.

Clause 92. The network as described in clause 85 or any other clause and further comprising access credentials created from said distributed ledger technology for said authorized device.

Clause 93. The network as described in clause 85 or any other clause wherein said distributed ledger technology is integrated with said named data networking.

Clause 94. The network as described in clause 85 or any other clause wherein said plurality of authorized connections comprises a step of a plurality of simultaneously secured connections.

Clause 95. The network as described in clause 85 or any other clause wherein said authorized connection comprises an encrypted communication channel.

Clause 96. A method for securely communicating in a decentralized network comprising the steps of:
providing named data networking;
providing a distributed ledger technology integrated with said named data networking;
providing a spatial neural network synchronization protocol;
providing an authorized device from a first neural network;
validating said authorized device with said distributed ledger technology;
providing an authorized device from a second neural network;
creating a communication from said authorized device from said first neural network to be sent to said authorized device from said second neural network;
securing said communication in said first neural network;
neural network synchronizing said communication to said second neural network; and
interpolating said communication to said second neural network.

Clause 97. The method as described in clause 96 or any other clause and further comprising the steps of:
receiving said communication in said second neural network;
decrypting said communication in said second neural network;
validating said communication in said second neural network; and
sending said communication to said authorized user in said second neural network.

Clause 98. The method as described in clause 96 or any other clause and further comprising the steps of:
creating a communication from said authorized user in said second neural network;
securing said communication in said second neural network;
neural network synchronizing said communication to said first neural network; and
interpolating said communication to said first neural network.

Clause 99. The method as described in clause 96 or any other clause and further comprising a step of creating a symmetric key from said synchronization.

Clause 100. The method as described in clause 99 or any other clause and further comprising a step of encrypting and decrypting communication with said symmetric key Clause 101. The method as described in clause 96 or any other clause wherein said step of validating said authorized device with said distributed ledger technology comprises validating with a system selected from a group consisting of biometrics, fingerprints, palm veins, face recognition, DNA, palm print, hand geometry, iris recognition, retina, and any combination thereof.

Clause 102. The method as described in clause 96 or any other clause wherein said neural network comprises a tree parity machine.

Clause 103. The method as described in clause 102 or any other clause wherein said tree parity machine comprises spatial neural network synchronization neurons.

Clause 104. The method as described in clause 103 or any other clause wherein said neurons comprises six sub-neurons.

Clause 105. The method as described in clause 103 or any other clause wherein said neurons comprises six spatial and time inputs neurons and one output neuron.

Clause 106. The method as described in clause 104 or any other clause wherein said sub-neurons comprises expansion neural networks.

Clause 107. The method as described in clause 104 or any other clause wherein said sub-neurons comprises neural network branches.

Clause 108. The method as described in clause 96 or any other clause wherein said step of securing said communication in said first neural network comprises a step of turning said communication into a hash with a hash algorithm.

Clause 109. The method as described in clause 108 or any other clause and further comprising a step of creating a computed hash.

Clause 110. The method as described in clause 96 or any other clause wherein said step of neural network synchronizing said communication to said second neural network comprises a step of interpolating said communication using named data networking to route across network.

Clause 11. The method as described in clause 96 or any other clause and further comprising a step of providing communications between said first and second neural networks.

Clause 112. The method as described in clause 111 or any other clause wherein said communications are selected from a group consisting of end to end encrypted communications, point to point communications, point to multi-point communications, multi-point to multi-point communications, and simultaneous communications.

Clause 113. A system for secure communications in a decentralized network comprising:
named data networking;
a distributed ledger technology integrated with said named data networking;
a spatial neural network synchronization protocol;
an authorized device from a first neural network;
a validation process capable of validating said authorized device with said distributed ledger technology;
an authorized device from a second neural network;
a secure communication process configured to secure a communication between said authorized device from said first neural network and said authorized device from said second neural network;
a neural network synchronizing process; and
a communication interpolating process.

Clause 114. The system as described in clause 113 or any other clause wherein said first and second neural networks are configured to operate selected from a group consisting of receive communications; decrypt communications; validate communication; and send communications.

Clause 115. The system as described in clause 113 or any other clause and further comprising a symmetric key created from said neural network synchronizing process.

Clause 116. The system as described in clause 113 or any other clause wherein said validation process is selected from a group consisting of a system selected from a group consisting of biometrics, fingerprints, palm veins, face recognition, DNA, palm print, hand geometry, iris recognition, retina, and any combination thereof.

Clause 117. The system as described in clause 113 or any other clause wherein said neural network comprises a tree parity machine.

Clause 118. The system as described in clause 117 or any other clause wherein said tree parity machine comprises spatial neural network synchronization neurons.

Clause 119. The system as described in clause 118 or any other clause wherein said neurons comprises six sub-neurons.

Clause 120. The system as described in clause 118 or any other clause wherein said neurons comprises six spatial and time inputs neurons and one output neuron.

Clause 121. The system as described in clause 119 or any other clause wherein said sub-neurons comprises expansion neural networks.

Clause 122. The system as described in clause 119 or any other clause wherein said sub-neurons comprises neural network branches.

Clause 123. The system as described in clause 113 or any other clause wherein said secure communication process comprises a hash algorithm and a hash.

Clause 124. The system as described in claim 123 or any other clause and further comprising a computed hash.

Clause 125. The system as described in clause 113 or any other clause wherein said communication interpolating process utilizes named data networking to route across a network.

Clause 126. The system as described in clause 113 or any other clause and further comprising secure communications between said first and second neural networks.

Clause 127. The system as described in clause 126 or any other clause wherein said communications are selected from a group consisting of end to end encrypted communications, point to point communications, point to multi-point communications, multi-point to multi-point communications, and simultaneous communications.

Clause 128. The method as described in clause 1, 44, 74, or 96 or any other clause and further comprising a step of providing a consensus process for an event Clause 129. The method as described in clause 128 or any other clause wherein said consensus process comprises an identification authorization system for credential verification, a swarm, and a distributed ledger technology.

Clause 130. The method as described in clause 129 or any other clause wherein said event comprises a transaction or interaction between at least two users.

Clause 131. The method as described in clause 130 or any other clause and further comprising a step of sending a hash piece each from said user's devices to said distributed ledger technology.

Clause 132. The method as described in clause 131 or any other clause wherein said hash piece comprises a record of said event, user credentials, and processing information.

Clause 133. The method as described in clause 131 or any other clause and further comprising a step of authorizing said hash pieces in said distributed ledger technology.

Clause 134. The method as described in clause 133 or any other clause and further comprising a step of validating user credentials contained in said hash piece.

Clause 135. The method as described in clause 134 or any other clause and further comprising a step of synchronizing said users, said distributed ledger technology, and said identification authorization system with a spatial neural network synchronization protocol.

Clause 136. The method as described in clause 131 or any other clause and further comprising a step of creating a computed hash piece combining each of said user's hash pieces.

Clause 137. The method as described in clause 136 or any other clause and further comprising a step of randomly splitting said computed hash piece.

Clause 138. The method as described in clause 137 or any other clause and further comprising a step of sending at least on of said split computed hash pieces to a first user and sending at least one other split computed hash piece to a second user.

Clause 139. The method as described in clause 138 or any other clause and further comprising a step of broadcasting said split computed hash piece to a swarm.

Clause 140. The method as described in clause 139 or any other clause and further comprising a step of verifying said split computed hash piece by swarmer participants in said swarm.

Clause 141. The method as described in clause 140 or any other clause and further comprising a step of swarm synchronizing said split computed hash piece in said swarm to create a validated hash piece.

Clause 142. The method as described in clause 141 or any other clause and further comprising a step of broadcasting said validated hash piece to said distributed ledger technology.

Clause 143. The method as described in clause 142 or any other clause and further comprising a step of sending a combined hash from said distributed ledger technology as new ledger entry.

Clause 144. The method as described in clause 143 or any other clause and further comprising a step of synchronizing said combined hash and said new ledger entry with authorized swarms.

Clause 145. The method as described in clause 1, 44, 74, or 96 or any other clause and further comprising a step of a providing dynamic smart contracts.

Clause 146. The method as described in clause 145 or any other clause wherein said dynamic smart contracts utilize an infrastructureless communication network, a neural network system, named data networking, distributed ledger technology, and swarm synchronization protocol.

Clause 147. The method as described in clause 145 or any other clause and further comprising a step of creating said dynamic smart contracts with contract constructs, a code generator, programming language library, and a software development kit.

Clause 148. The method as described in clause 147 or any other clause and further comprising a step of creating said contract constructs using protocol buffers.

Clause 149. The method as described in clause 147 or any other clause and further comprising a step of selecting said contract constructs from library groups of predefined contract contructs.

Clause 150. The method as described in clause 1, 44, 74, or 96 or any other clause and further comprising a step of providing a multi-one payment system.

Clause 151. The method as described in clause 150 or any other clause and further comprising a step of integrating said multi-one payment system into a dynamic smart contract technology.

Clause 152. The method as described in clause 150 or any other clause and further comprising a step of providing a transaction in said multi-one payment system selected from a group consisting of split payments, single payments, and chained payments.

Clause 153. The method as described in clause 150 or any other clause and further comprising a step of utilizing different currencies in said multi-one payment system.

Clause 154. The method as described in clause 153 or any other clause wherein said currencies comprises distributed ledger technologies.

Clause 155. The method as described in clause 1, 44, 74, or 96 or any other clause and further comprising a step of providing a multiplex exchange process.

Clause 156. The method as described in clause 155 or any other clause and further comprising a step of sampling currency exchange rates from various exchanges and providing an average calculation form said sampled exchanges for each specific currency in a transaction.

Clause 157. The method as described in clause 1, 44, 74, or 96 or any other clause and further comprising a step of providing a predefined interface interaction construct.

Clause 158. The method as described in clause 1, 44, 74, or 96 or any other clause and further comprising a step of providing a universal artificial neural network multiplex asset class.

Clause 159. The method as described in clause 1, 44, 74, or 96 or any other clause and further comprising a step of providing an artificial neural network multiplex identification system.

Clause 160. The method as described in clause 159 or any other clause wherein said artificial neural network multiplex identification system comprises creating a virtual replication of a set of a user's unique biometrics.

As can be easily understood from the foregoing, the basic concepts of the present invention may be embodied in a variety of ways. It involves both infrastructure techniques as well as devices to accomplish the appropriate infrastructure. In this application, the infrastructure techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "encryption" should be understood to encompass disclosure of the act of "encrypting"—whether explicitly discussed or not—and, conversely, were there effectively disclosure of the act of "encrypting", such a disclosure should be understood to encompass disclosure of a "encryption" and even a "means for encrypting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the below list of references or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. NON-PATENT LITERATURE

Internet Protocol—Wikipedia, https://en.wikipedia.org/wiki/Internet_Protocol, Jul. 12, 2019, 3 pages.
Neural cryptography—Wikipedia, https://en.wikipedia.org/wiki/Neural_cryptography, Jul. 15, 2019, 5 pages.
OSI Model—Wikipedia, https://en.wikipedia.org/wiki/OSI_model, Jul. 12, 2019, 5 pages.

Thus, the applicant(s) should be understood to have support to claim and make a statement of invention to at least: i) each of the infrastructure devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

In addition and as to computer aspects and each aspect amenable to programming or other electronic automation, it should be understood that in characterizing these and all other aspects of the invention—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of invention to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent inventions, and xxxiii) the various combinations of each of the above and of any aspect, all without limiting other aspects in addition.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for creating an infrastructureless communication network comprising the steps of:
    providing a first artificial neural network;
    inputting information to an input layer of said first artificial neural network;
    time result data routing of said information in said first artificial neural network;
    providing a second artificial neural network;
    inputting information to an input layer of said second artificial neural network;
    spatial result data routing said information in said second artificial neural network;
    performing deep learning in said first and second artificial neural networks;
    inputting an output from each of said first artificial neural network and said second artificial neural network into a third artificial neural network;
    combined result data routing network topology optimization processing of said output from each of said first artificial neural network and said second artificial neural network;
    outputting an output from said combined result data routing network topology optimization processing;
    inputting said output to a network; and
    creating an artificially intelligent communication protocol.

2. The method as described in claim 1 wherein step of inputting input to said input layer of said first artificial neural network comprises a step of inputting input from data sends, input from a network, and input from data receives into said input later of said first artificial neural network.

3. The method as described in claim 1 wherein said step of inputting input to said input layer of said second artificial neural network comprises a step of inputting input from spatial sends, input from a network, and input from spatial receives into said input later of said second artificial neural network.

4. The method as described in claim 1 wherein said step of performing deep learning in said first and second artificial neural networks comprises a step of performing continuous deep learning in said first and second artificial neural networks.

5. The method as described in claim 1 wherein said step of inputting said output to a network comprises a step of inputting said output from said combined result data routing network topology optimization processing to transport layers of an open systems interconnection model.

6. The method as described in claim 1 wherein said step of inputting said output to a network comprises a step of inputting said output from said combined result data routing network topology optimization processing to a named data networking.

7. The method as described in claim 1 and further comprising a step of integrating said artificially intelligent communication protocol in a plurality of devices on said network.

8. The method as described in claim 7 wherein said plurality of devices is selected from a group consisting of end devices, nodes, and resources.

9. The method as described in claim 7 and further comprising a step of sharing said output from said combined result data routing network topology optimization processing between said plurality of devices.

10. The method as described in claim 9 and further comprising a step of analyzing internal results from said devices based on said shared output by said first artificial neural network.

11. The method as described in claim 10 and further comprising a step of optimizing said time result data routing of said information in said first artificial neural network based on said step of analyzing internal results at said end devices based on said shared output by said first artificial neural network.

12. The method as described in claim 7 wherein said step of spatial result data routing said information in said second artificial neural network comprises a step of spatially referencing said plurality of devices.

13. The method as described in claim 7 and further comprising a step of optimizing said spatial result data routing said information in said second artificial neural network based on spatial results from said devices.

14. The method as described in claim 7 wherein said step of combined result data routing network topology optimization processing of said output from each of said first artificial neural network and said second artificial neural network comprises a step of optimizing total data routing based on time and spatial results from said devices.

15. An infrastructureless communication network comprising:
- a first artificial neural network;
- input information for an input layer of said first artificial neural network;
- a time result data routing system for said information in said first artificial neural network;
- a second artificial neural network, wherein deep learning is performed in said first and second artificial neural networks;
- input information for an input layer of said second artificial neural network;
- a spatial result data routing system said information in said second artificial neural network;
- an input for an output from each of said first artificial neural network and said second artificial neural network into a third artificial neural network;
- a combined result data routing network topology optimization system for said output from each of said first artificial neural network and said second artificial neural network;
- an output from said combined result data routing network topology optimization system;
- a network input for said output from said combined result data routing network topology optimization system to a network; and
- an artificially intelligent communication protocol.

16. The network as described in claim 15 wherein said input information for said input layer of said first artificial neural network is selected from a group consisting of input from data sends, input from a network, and input from data receives.

17. The network as described in claim 15 wherein said input information for said input layer of said second artificial neural network is selected from a group consisting of input from spatial sends, input from a network, and input from spatial receives.

18. The network as described in claim 15 and further comprising a deep learning system in said first and second artificial neural networks.

19. The network as described in claim 18 wherein said deep learning system comprises a continuous deep learning system.

20. The network as described in claim 15 wherein said network input for said output from said combined result data routing network topology optimization system to said network comprises said network input for said output from said combined result data routing network topology optimization system to transport layers of an open systems interconnection model.

21. The network as described in claim 15 wherein said network input for said output from said combined result data routing network topology optimization system to said network comprises wherein said network input for said output from said combined result data routing network topology optimization system to a named data networking.

22. The network as described in claim 15 wherein said artificially intelligent communication protocol is integrated into a plurality of devices on said network.

23. The network as described in claim 22 wherein said plurality of devices is selected from a group consisting of end device, nodes, and resources.

24. The network as described in claim 22 wherein said plurality of devices receive said output from said combined result data routing network topology optimization system.

25. The network as described in claim 24 wherein said first artificial neural network is capable of analyzing internal results from said devices which have received said output from said combined result data routing network topology optimization system.

26. The network as described in claim 25 wherein said first artificial neural network is capable of optimizing said time result data routing system based on analyzed internal results from said devices.

27. The network as described in claim 22 wherein said second artificial neural network is capable of spatially referencing said plurality of devices.

28. The network as described in claim 22 wherein said second artificial neural network is capable of optimizing said spatial result data routing system based on spatial results from said devices.

29. The network as described in claim 22 wherein said third artificial neural network is capable of optimizing said combined result data routing network topology optimization system based on time and spatial results from said devices.

30. The method as described in claim 1 and further comprising a step of providing a consensus process for an event.

31. The method as described in claim 30 wherein said consensus process comprises an identification authorization system for credential verification, a swarm, and a distributed ledger technology.

32. The method as described in claim 31 wherein said event comprises a transaction or interaction between at least two users.

33. The method as described in claim 32 and further comprising a step of sending a hash piece each from said user's devices to said distributed ledger technology.

34. The method as described in claim 33 wherein said hash piece comprises a record of said event, user credentials, and processing information.

35. The method as described in claim 33 and further comprising a step of authorizing said hash pieces in said distributed ledger technology.

36. The method as described in claim 35 and further comprising a step of validating user credentials contained in said hash piece.

37. The method as described in claim 36 and further comprising a step of synchronizing said users, said distributed ledger technology, and said identification authorization system with a spatial neural network synchronization protocol.

38. The method as described in claim 33 and further comprising a step of creating a computed hash piece combining each of said user's hash pieces.

39. The method as described in claim 38 and further comprising a step of randomly splitting said computed hash piece.

40. The method as described in claim 39 and further comprising a step of sending at least one of said split computed hash pieces to a first user and sending at least one other split computed hash piece to a second user.

41. The method as described in claim 40 and further comprising a step of broadcasting said split computed hash piece to a swarm.

42. The method as described in claim 41 and further comprising a step of verifying said split computed hash piece by swarmer participants in said swarm.

43. The method as described in claim 42 and further comprising a step of swarm synchronizing said split computed hash piece in said swarm to create a validated hash piece.

44. The method as described in claim 43 and further comprising a step of broadcasting said validated hash piece to said distributed ledger technology.

45. The method as described in claim 44 and further comprising a step of sending a combined hash from said distributed ledger technology as new ledger entry.

46. The method as described in claim 45 and further comprising a step of synchronizing said combined hash and said new ledger entry with authorized swarms.

47. The method as described in claim 1 and further comprising a step of providing dynamic smart contracts.

48. The method as described in claim 47 wherein said dynamic smart contracts utilize an infrastructureless communication network, a neural network system, named data networking, distributed ledger technology, and swarm synchronization protocol.

49. The method as described in claim 47 and further comprising a step of creating said dynamic smart contracts with contract constructs, a code generator, programming language library, and a software development kit.

50. The method as described in claim 49 and further comprising a step of creating said contract constructs using protocol buffers.

51. The method as described in claim 49 and further comprising a step of selecting said contract constructs from library groups of predefined contract constructs.

52. The method as described in claim 1 and further comprising a step of providing a multi-one payment system.

53. The method as described in claim 52 and further comprising a step of integrating said multi-one payment system into a dynamic smart contract technology.

54. The method as described in claim 52 and further comprising a step of providing a transaction in said multi-one payment system selected from a group consisting of split payments, single payments, and chained payments.

55. The method as described in claim 52 and further comprising a step of utilizing different currencies in said multi-one payment system.

56. The method as described in claim 55 wherein said currencies comprises distributed ledger technologies.

57. The method as described in claim 1 and further comprising a step of providing a multiplex exchange process.

58. The method as described in claim 57 and further comprising a step of sampling currency exchange rates from various exchanges and providing an average calculation form said sampled exchanges for each specific currency in a transaction.

59. The method as described in claim 1 and further comprising a step of providing a predefined interface interaction construct.

60. The method as described in claim 1 and further comprising a step of providing a universal artificial neural network multiplex asset class.

61. The method as described in claim 1 and further comprising a step of providing an artificial neural network multiplex identification system.

62. The method as described in claim 61 wherein said artificial neural network multiplex identification system comprises creating a virtual replication of a set of a user's unique biometrics.

63. The method as described in claim 1 and further comprising an identification module.

64. The method as described in claim 63 wherein said identification module is chosen from a subscriber identification module, a virtual SIM, credentials, private keys, public keys, and any combination thereof.

* * * * *